(12) United States Patent
Kukharev

(10) Patent No.: US 11,361,874 B2
(45) Date of Patent: Jun. 14, 2022

(54) METHODS FOR USING KUKHAREV REGIONS IN THE ATMOSPHERE, IN SPACE, AND AT THE LEVEL OF THE EARTH'S SURFACE TO OBTAIN ANTIMATTER

(71) Applicant: Vadim Kukharev, Moscow (RU)

(72) Inventor: Vadim Kukharev, Moscow (RU)

(*) Notice: Subject to any disclaimer, the term of this patent is extended or adjusted under 35 U.S.C. 154(b) by 0 days.

(21) Appl. No.: 17/558,964

(22) Filed: Dec. 22, 2021

(65) Prior Publication Data

US 2022/0139589 A1 May 5, 2022

Related U.S. Application Data

(63) Continuation-in-part of application No. 17/146,832, filed on Jan. 12, 2021, now Pat. No. 11,262,379, which is a continuation-in-part of application No. 16/991,624, filed on Aug. 12, 2020.

(60) Provisional application No. 63/054,923, filed on Jul. 22, 2020.

(51) Int. Cl.
*G21K 1/00* (2006.01)
*G21B 1/17* (2006.01)

(52) U.S. Cl.
CPC ................... *G21K 1/00* (2013.01); *G21B 1/17* (2013.01)

(58) Field of Classification Search
CPC .................... G21K 1/00; G21B 1/17

USPC ............................ 250/281, 282, 283; 850/15
See application file for complete search history.

(56) References Cited

U.S. PATENT DOCUMENTS

| | | | | |
|---|---|---|---|---|
| 5,118,950 A * | 6/1992 | Bahns | ................... | H01J 49/424 376/127 |
| 6,414,331 B1 * | 7/2002 | Smith | ...................... | G21F 5/10 376/127 |
| 6,813,330 B1 * | 11/2004 | Barker | ................... | G21K 1/003 250/493.1 |
| 2010/0012864 A1 * | 1/2010 | Smith | ...................... | H01J 3/40 250/506.1 |
| 2012/0212375 A1 * | 8/2012 | Depree, IV | ........ | H01Q 15/0086 977/762 |

* cited by examiner

*Primary Examiner* — Nicole M Ippolito
(74) *Attorney, Agent, or Firm* — Nadya Reingand; Yan Hankin

(57) ABSTRACT

Based on determined locations of Kukharev (K) regions, and the estimated times of their formation on Earth, in the atmosphere, and in space, antimatter may be produced and collected, as described by the present invention. Due to jumps in the gravitational field, various standing waves are formed from the resonances of the gravitational tides. A wave of charged particles is formed within the K region and can be setup to collide with targets comprising heavy metal atoms (or other equivalents), the colliding thereby creating antimatter particles. These antimatter particles can then be stored in various traps and used for various purposes, e.g., energy formation.

20 Claims, 31 Drawing Sheets

- - - - - - Barycenter-observer distance
- - - - Phase of the moon
———— Barycenter depth
- - - Earth-Moon Distance
● Min/ Max
○ Moment of resonance

Kamioko

——— Barycenter-observer distance

- - - - Earth-Moon Distance

............... Phase of the moon

——— Barycenter depth

Moment of resonance ○

Min/ Max ●

Barycenter-observer distance

Earth-Moon Distance

Phase of the moon

Barycenter depth

Moment of resonance ○
Min/ Max ●

METHODS FOR USING KUKHAREV REGIONS IN THE ATMOSPHERE, IN SPACE, AND AT THE LEVEL OF THE EARTH'S SURFACE TO OBTAIN ANTIMATTER

CROSS-REFERENCE TO RELATED APPLICATIONS

This patent application is a Continuation-in-Part of U.S. patent application Ser. No. 17/146,832, filed Jan. 12, 2021, which in turn is a Continuation-in-Part of U.S. patent application Ser. No. 16/991,624, filed Aug. 12, 2020, which claims priority to U.S. Provisional application 63/054,923 filed Jul. 22, 2020, all of which are incorporated herein by reference in their entireties.

FIELD OF THE INVENTION

This invention relates to the field of using and predicting gravitational resonance for obtaining and collecting antimatter.

BACKGROUND ART

Basic descriptions of the evidence and formation of Kukharev (i.e., K) regions in the atmosphere and on the Earth's surface have been provided in the parent applications within this patent application family. The use of the present invention in obtaining antimatter is based on knowledge of physical and mathematical models of the occurrence of Kukharev regions resulting from gravitational resonances occurring from the Earth-Moon-Sun system (and similar systems located elsewhere).

Antiparticles (i.e., antimatter particles) are a "mirror image" of the elementary particles that make up the studied part of the universe. There is a positron equal in mass to an electron, but with a positive charge. The antiproton is equal in mass to the proton, but the charge is negative. The neutron is electrically neutral, but also has a double—the antineutron. The antineutron has a negative baryon number, and the neutron has a positive one. In the free state, both particles are unstable; the neutron decays into a proton and an electron, and the antineutron into an antiproton and a positron. Antiparticles do not exist in our world for long, because they are attracted to their "counterparts" and annihilate. During the reaction, particles having a rest mass disappear, and their energy of existence passes into a stream of photons. Theoretical developments that predicted the possibility of obtaining antiparticles are based on the relativistic concept of energy: $E=mc^2$—"energy of existence". In the microcosm, the law of conservation of mass is not fulfilled by default, but the law of conservation of energy is strictly fulfilled. During nuclear decay, particles with a rest mass are formed, and photons without a rest mass are formed. In this case, the total mass of particles having a rest mass may be less than the rest mass of the original nucleus. But what happens if we tell the particles bombarding the target a high energy exceeding the energy of the existence of elementary particles? When colliding with other particles, the energy of motion can be transformed into a stream of photons, or into the formation of new particles having a rest mass. At the same time, according to the rule of symmetry, particles should arise in pairs: proton and antiproton, neutron and antineutron, electron and positron. In other words, the energy of motion can be transformed into the energy of the existence of particles having mass. And the remaining mass of particles and antiparticles during annihilation is converted into a stream of photons. The antiproton was discovered in 1955 by bombarding a copper target with protons accelerated to an energy of 6.2 GeV.

Antimatter is a substance composed of antiparticles. Antimatter nuclei, previously synthesized by scientists, are composed of antiprotons and antineutrons, and the shells are composed of positrons. During the interaction of matter and antimatter, their annihilation occurs, with the formation of high-energy photons or pairs of particles-antiparticles. When 1 kg of antimatter and 1 kg of matter interact, approximately $1.8 \cdot 10^{17}$ joules of energy will be released, which shows the extreme importance of obtaining antimatter as a source of energy.

Antimatter can be used in medicine to diagnose oncological diseases, with the help of antimatter, it is possible to examine the surfaces of semiconductors to determine the "fatigue" of materials and find microdefects in them. But most importantly, antimatter can serve as an energy source for power plants, cars and rockets.

The lower limit of the cost of antimatter is 2.5 million dollars per gram. The upper limit of the cost of antimatter is billions of dollars per gram. Due to the complexity of creation in terrestrial conditions, scientists have currently managed to obtain only milligrams of antimatter (de facto, the bill goes to atoms). Antimatter is a powerful source of energy, but it is extremely difficult to obtain artificially. The present technology of antimatter production is based on Vadim Kukharev's fundamental discovery of the regions of space (Kukharev region), where antimatter can be formed naturally, under the influence of gravitational tidal resonances in the Earth-Sun-Moon System (and by analogy on other planetary systems).

In the prior art, artificial expensive complexes, accelerators, have been used to obtain antimatter, where usually protons are accelerated to high speeds to hit an obstacle (usually atoms of heavy metals), and as a result, antimatter is obtained. The present technology, on the contrary, is based on understanding the work of gravitational waves and the facts of their resonance from several sources. The text provides evidence for the existence of Kukharev gravitons and energons. Bursts of the gravitational field, the facts of which are recorded by gravimeters throughout the planet, are precisely the causes of the formation of Kukharev regions and in turn the work of gravitons or, more precisely, the absorption of energons.

SUMMARY OF THE INVENTION

Antimatter is formed in Kukharev (K) regions at moments of gravitational resonance, said antimatter being collectable according to the methods described herein. The resonance of gravitational tides in turn creates a wave of the protons from a proton cloud within the K region. Such proton waves may be directed towards a metal to create antimatter when colliding with the metal obstacle. The process of creating a proton wave in a proton cloud at the moment of gravitational resonance is identical to the process of creating an electromagnetic Schumann wave in the Kukharev region from electrons. Instead of a wave of protons, waves of other types of charged particles, such as but not limited to electrons, and their collisions with an artificial obstacle, can be used similarly to create antimatter. The antimatter created is then collected in, e.g., a Penning trap (or other vacuum/magnetic trap). It is further possible to use both a proton wave and an electron wave simultaneously at moments of resonance, wherein the target generates both positrons and antiprotons.

The main advantage of the method for producing antimatter according to the present invention is its significantly lower cost.

BRIEF DESCRIPTION OF THE DRAWINGS

The present invention will now be discussed in further detail below with reference to the accompanying figures in which.

For the operation of a satellite in place of an airship (e.g., at an altitude of more than 100 km), the same operational scheme as shown may be used. Under the airship or satellite model, there is a control center that controls the collection of antimatter. In the path of the waves of charged particles (i.e., electrons, protons), there is positioned a target which, upon collision with the charged particles, generates antiparticles (i.e., positrons, antiprotons, etc.), said antiparticles then being collected by an array of antimatter traps as discussed herein.

DETAILED DESCRIPTION OF PREFERRED EMBODIMENTS

There is the following evidence that it is the resonance of gravitational tides that causes Schumann waves (in the Kukharev regions that occur at these moments of time):

1. Physical and mathematical understanding, process model

Imagine that you have liquid (fluid, cloud) made of electrons and other charged particles (which are in the atmosphere).

There is a whole ocean of electrons (electrons enter the atmosphere primarily from the solar wind, so by the way, the power of Schumann resonances is greater in the summer, since the density of electrons in the atmosphere is greater in the summer). This ocean of charged particles in the atmosphere (just like the ocean below of water molecules) is affected by the gravitational field of the Moon, which causes periodic ebbs and flows. At the same time, the movement of the Sun, its gravity, also causes tides and tides in all fluids (only the solar tides are smaller, and weaker, than the Lunar ones).

Now imagine that the two tides will coincide in phase (as during a solar eclipse by the moon, but not only at such moments). This will be the resonance of two tides. And this causes a sharp increase in fluid vibrations, the formation of a standing wave in it. It is only important to understand that for resonance, the phases of the Moon's motion around the Earth and the Earth-Moon system around the Sun also need to coincide. At this moment, two tidal waves of electrons (one wave is "led" by the Sun, the second wave is "led" by the Moon) overlap with each other (i.e., coincide in phase). A resonance occurs and an electromagnetic wave occurs. The place of occurrence of such a resonance is the Kukharev (K) region. For Schumann waves, the Kukharev regions causing the Schumann waves are mainly located in the stratopause (where the surrounding space is constantly heated).

Figure 1:
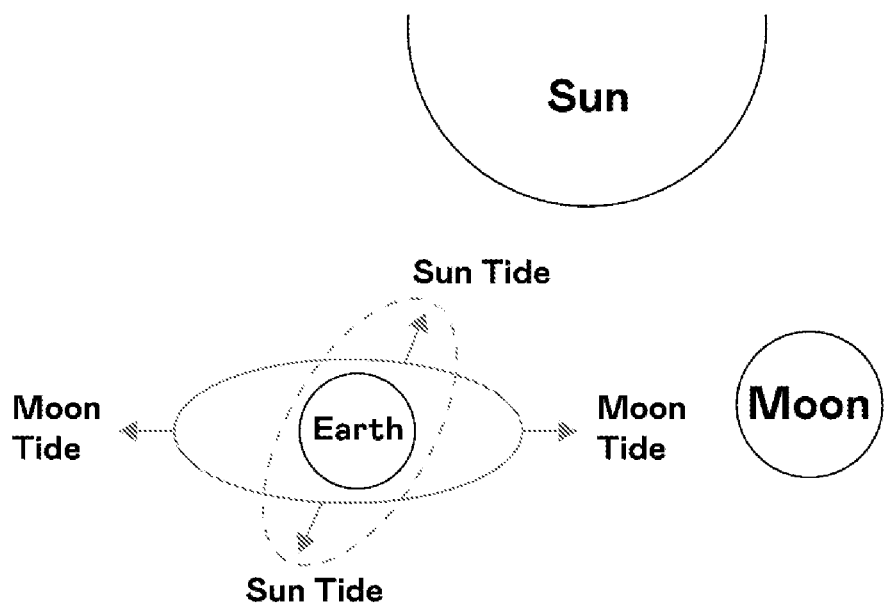
FIG. 1 illustrates a simplified two-dimensional view. The Earth and the Moon are the two main gravitating factors for fluids (liquids, gases) on planet Earth.

A simplified two-dimensional drawing is presented in FIG. 1, showing different tides from the Moon and the Sun, and two gravitating factors (i.e., the gravitational fields of the Moon and the Sun). Instead of the word "Earth" in the figure, for example, it can be written "human cell", because the fundamental influence on the entire fluid is identical.

The Kukharev region is an area that arises as a result of the resonance of several gravitational tides. This is a source of energy, the beginning of standing waves of various kinds. First of all, this is the energy from the "super tide", as a result of the resonance of two or more tides, as fluid components. Secondly, it is resonance at the level of gravitons.

Figure 2:
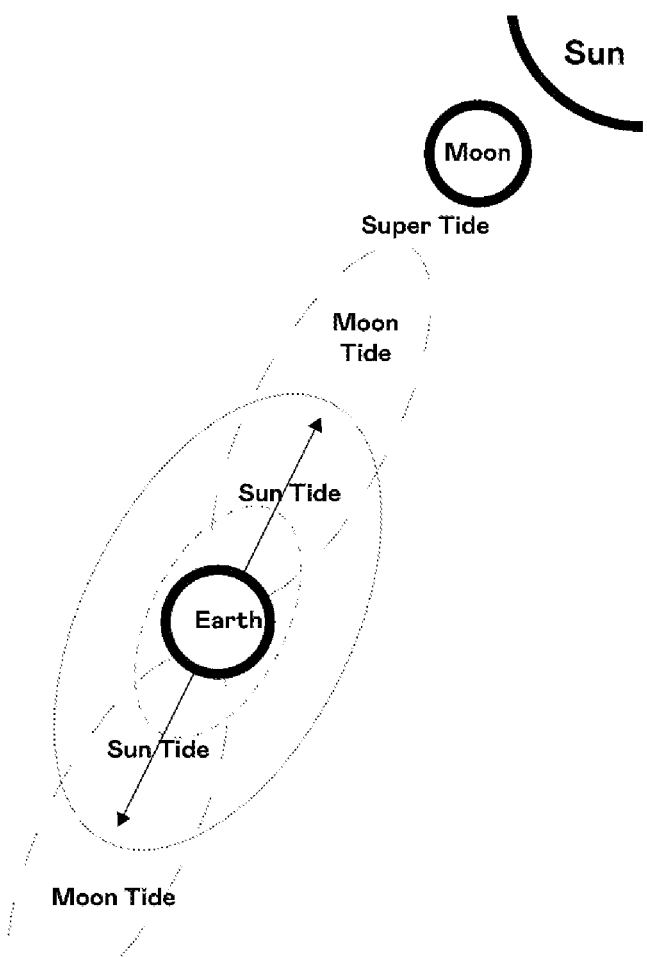
FIG. 2 shows the very simplified two-dimensional representation of how two gravitational tides (one caused by the gravitational field of the Sun, the second caused by the gravitational field of the Moon) "overlap" each other, resonate as a result.

FIG. 2 shows the very simplified two-dimensional representation of how two gravitational tides (one caused by the gravitational field of the Sun, the second caused by the gravitational field of the Moon) "overlap" each other, resonate as a result.

As gravitational factors that create tides at a particular point (and these tides can resonate), one can distinguish the phase of the moon, the depth of the barycenter, the distance from the earth to the moon, the distance from the barycenter to the observer's point (the barycenter is constantly moving and its gravitational field also creates tides), the daily movements of the Sun and Moon, the movement of Venus, Mars, other planets (and even surrounding stars). Different gravitational factors resonate differently and create different amounts of resonance energy.

Figure 3:
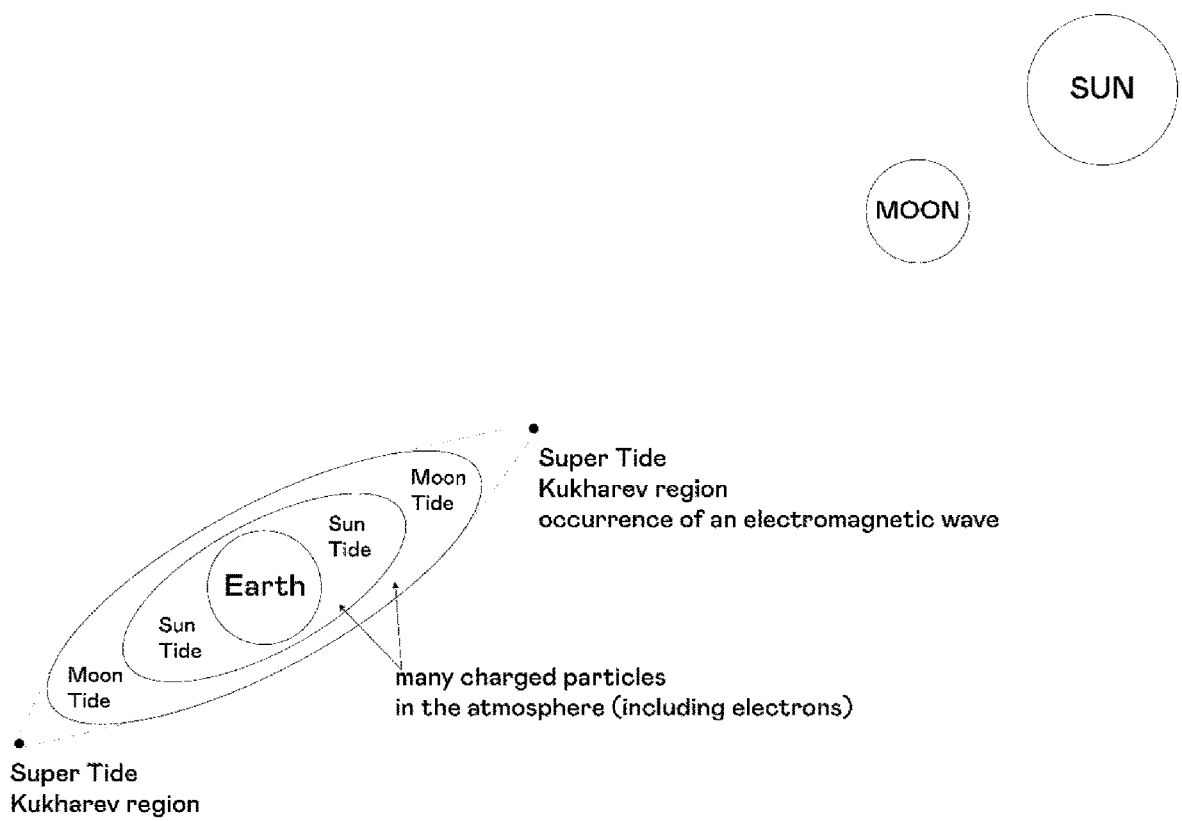
FIG. 3 shows the very simplified two-dimensional representation of how two tides in the fluids of electrons and charged particles in the atmosphere "overlap" each other, as a result they resonate, creating the Kukharev region, from which Schumann waves are generated. one tide is caused by the gravitational field of the Sun, the second is caused by the gravitational field of the Moon. This principle of the emergence of the Kukharev region is valid for all fluids at moments of gravitational resonance (it's just that other types of vibrations arise in other fluids instead of Schumann waves).

FIG. 3 shows the very simplified two-dimensional representation of how two tides in the fluids of electrons and charged particles in the atmosphere "overlap" each other, as a result they resonate, creating the Kukharev region, from which Schumann waves are generated. one tide is caused by the gravitational field of the Sun, the second is caused by the gravitational field of the Moon.

There are different gravitational factors that cause tides. The main factors (they are given below in the graphical calculation of the moments of resonances of gravitational tides): 1) the distance from the Earth to the Moon, 2) the phase of the Moon, 3) the distance from the Earth-Moon barycenter to the observer (the point where we are looking for a superflow), 4) the depth of the barycenter (from the point where we are looking for a superflow). It is clear that there are other gravitational factors, such as the gravitational field of Mars, Venus, stars, and so on, but conceptually they are not so important. Plus, the closer you are in latitude to the Earth-Moon barycenter, the more significant gravitational factors are the diurnal and semi-diurnal changes in the position of the Moon and the Sun.

A single new fundamental physical regularity (the formation of Kukharev regions), which causes different consequences in different environments has been developed. From a fundamental point of view, many applications are possible from understanding the resonance of gravitational tides and the positioning of K regions. There are also gravity jumps (more correctly, jumps in the absorption of Kukharev time energons), which can occur at those moments in time when the main gravitational factors are at their extremes. This application focuses on the collection of antimatter as a direct result of the prediction and calculation of moments of resonance and locations of K regions.

2. Correlation of the moments of time of resonances of gravitational tides with the moments of a sharp increase in the amplitudes of electromagnetic waves according to Schumann harmonics (for the same points of the planet with the same GPS coordinates).

The correlation between the time points of the gravitational tidal resonances and the jumps in the amplitude of the Schumann resonances for specific points of the Earth exceeds 85%. This is a mathematical fact that clearly indicates that one event (the resonance of gravitational tides of a fluid from charged particles) causes another event (the electromagnetic wave of the Schumann resonance). The place of "pumping" energy, the place where two tides resonate within one fluid, is the Kukharev region (and there may be more tides, but two of them are "main"—one tide from the Moon, the second from the Sun, as the most energetically significant).

In about 15% of cases, the "pumping" of the energy of the electromagnetic Schumann wave occurs due to solar wind flows, solar flares. This is because the Kukharev regions arise in an extremely rarefied gas environment, which is also affected (in addition to the gravitational resonance) by fluctuations in the intensity of the solar wind. In addition, the energy of various types of gravitational resonances varies greatly.

In some cases, the concept of an amplitude "jump" is conditional, because when they go one after the other and the resonance energy simply "supports" the electromagnetic wave already existing at a high energy level, the appendix contains many graphs that clearly indicate the correlation of these events. That is, it is statistically reliable for any samples that two chains of events (the increase in the amplitude of electromagnetic Schumann waves and the moments of resonance of gravitational tides) are interconnected, the gravitational resonance of several tides causes a jump in the energy of an electromagnetic wave.

The source of the Schumann waves are thus the Kukharev regions, which arise at the moments of resonances of gravitational tides in the stratopause (as well as higher regions). The text below provides a description of this process, statistical evidence, and a physical and mathematical model of the process.

To put it briefly and simplistically about the source of Schumann waves:

1) Everyone knows that there are Lunar tides (large) on the seas and oceans. The moon causes tides in all liquids and gases.

2) Similarly, there are tides from the Sun in all liquids (but they are much weaker because the Sun is far away, and no one pays attention to these tides).

3) When two tides in the atmosphere (for example, solar and lunar) "overlap" each other (i.e., resonate), then a "supertide" arises, particularly within the Kukharev regions, which is a source of standing waves of different types. The same is identical for other types of fluids.

Kukharev regions in terms of the generation of Schumann waves arise in a discharged ionized gas, the state of which depends on many factors: the intensity of the solar wind, the turbulence of the atmosphere—troposphere—stratosphere. Therefore, the effect of gravitational tidal resonances on the stratopause (where Schumann resonances occur) is different from the effect on typical fluid objects. The duration of natural oscillations of a gas fluid in the stratopause under the influence of the energy of resonances of gravitational tides in the Earth's crust in many cases is much longer than 12 hours. If the duration of the natural vibrations of the ionosphere in the stratopause is a day or more, then the interference of the natural vibrations of the ionosphere will occur from the resonances of gravitational tides in the Earth's crust that differ in time. Accordingly, we see more frequent increases in the amplitudes of spectra in the ionosphere/Schumann resonances compared to terrestrial fluid objects.

Additional gravitational factors can be introduced, such as tides from Mars and Venus and other remote sources of gravity, but these are not very significant tides from a practical point of view. Similarly, the use of the fact that the center of mass of the Earth-Moon does not revolve around the Sun, but around the common barycenter of the masses of the entire Solar System (which is essentially inside the Sun) does not significantly affect the calculations.

The tide is a change in the shape of a compressible body under the influence of the attraction of another body. The tide in absolutely solid bodies does not change the shape of the body, it is manifested by a change in the stress tensor inside the body. Graviton is a particle of the microcosm, where gravity and especially gravitational tides are negligible compared to other physical factors—electromagnetic, strong and weak interaction.

There are two ways to obtain antimatter—passive and active. Passive refers to an antimatter trap which is larger and stationary, waiting for the formation of antimatter due to natural causes. Active refers to the creation of a resonance of the proton fluid to direct the proton wave to a heavy metal plate.

According to the present invention, antimatter is obtained in the Kukharev region, which occurs in a proton cloud high in the atmosphere and quickly annihilates. To avoid annihilation, for example, a Penning trap, which uses electric and magnetic fields to hold antiprotons, may be utilized. Penning traps are already used at antimatter production facilities, and it has previously been shown that such traps can store antiprotons for more than 400 days.

Figure 4:
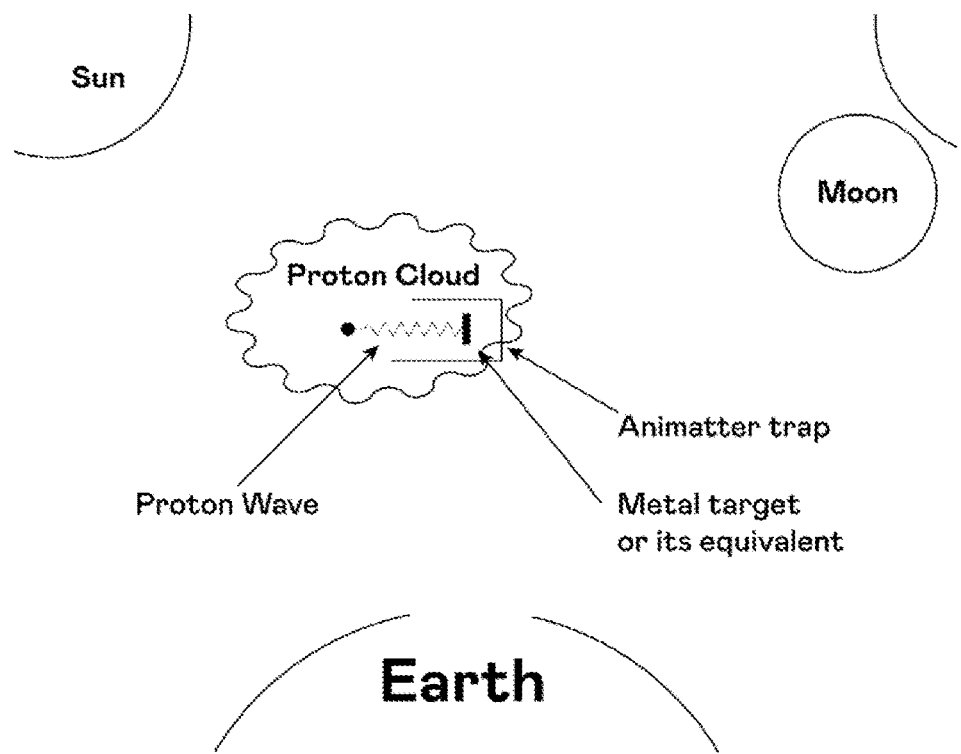
FIG. 4 shows how antimatter arises in the Kukharev regions at moments of gravitational resonance (mainly in proton "clouds") in natural (natural) Kukharev regions high above the ground clouds of charged particles. The resonance of gravitational tides creates a wave of protons, which, when colliding with the right obstacle, creates antimatter. The process of creating a proton wave in a proton cloud at the moment of gravitational resonance is identical to the process of creating an electromagnetic Schumann wave in the Kukharev regions from electrons. Instead of a wave of protons, other waves of charged particles and their collisions with artificial obstacles can be used identically to extract antimatter. Some satellites can see flashes of annihilation when antimatter meets matter.

FIG. 4 shows how antimatter arises in the Kukharev regions at moments of gravitational resonance (i.e., mainly in the form of proton clouds). The resonance of gravitational tides in turn creates a wave of the protons within the proton cloud, which, may be directed towards a metal to create antimatter when colliding with the metal obstacle. The process of creating a proton wave in a proton cloud at the moment of gravitational resonance is identical to the process of creating an electromagnetic Schumann wave in the Kukharev regions from electrons. Instead of a wave of protons, waves of other types of charged particles, and their collisions with an artificial obstacle, can be used similarly to create antimatter.

Antimatter is already formed in the natural Kukharev regions, which is observable by satellites when (previously unexplainable) annihilation flashes are seen, which are the direct result of the annihilation of the antimatter particles formed within such K regions.

The geometric calculation of the resonance moments of gravitational tides shows, first of all, strong resonances. But there are also weaker resonances, and what is surprising here, based on the facts, the existence of gravitons is visible, since the number of resonances at the latitude of Texas is fixed more than at the latitude of Krasnoyarsk, while we know that the Earth-Moon barycenter is closer to Texas than to Krasnoyarsk, and this is evidence that the barycenter is a source of gravitons. At the same time, it is possible that gravitons move along lines of force resembling the earth's magnetic field (but from a barycenter).

Resonance in fluids (especially in large ones) does not occur instantly. The tides begin to resonate, the resonance increases, and then it subsides. This process takes time. Thus some resonances can last for hours, others for milliseconds. The geometric shape of the fluid, its dimensions, viscosity, and density, all matter for the time and course of the resonance.

At the level of Earth's surface, it is also possible to produce antimatter in an identical way. One needs to make an artificial cloud of protons (or their analogues) and wait for a strong gravitational resonance (preferably with gravitons) to form a proton (or electron) wave that can be directed at a metal target.

General Mathematical Calculation of the Moment of Resonance of Gravitational Tides.

The following generalized mathematical model is presented only for very approximate clarity of what is happening in the physical model.

The presented mathematical description shows only one of the possible ways to describe the resonance of tides. But the essence of the emergence of the Kukharev regions is at the same time uniform.

The essential description of the question statement:
1) We have GPS coordinates of some point on the Earth
2) Conceptually, we need to:
  1. Make a three-dimensional coordinate grid
  2. Write the equations of motion of the Sun and the Moon relative to this coordinate system in time
  3. Write the equations of tides at a given point
  4. The coincidence of the time points of several tides will give a resonance. In this case, the phase accounting is calculated separately below. When the phases of the movement of objects coincide, the tides create a "super tide", when the opposite phase "extinguish" each other.

GPS is a satellite system that uses many satellites to provide the user with accurate coordinates.

The complete GPS structure consists of three different segments:
1) The Space Segment—Satellites orbiting the Earth.
2) Control Segment—Stations located near the equator, necessary for controlling satellites.
3) User Segment—Anyone who receives and uses a GPS signal.

Determining coordinates using GPS is based on measuring the distance from satellites to a GPS receiver located on the Earth's surface. This distance to each satellite can be determined by the GPS receiver. The main idea is to solve the reverse serif, which many surveyors use in their daily work. If the distance to three points relative to their own position is known, then it is possible to determine the coordinates of the standing point relative to these three points. From the distance to one satellite, we know that the position of the receiver must be some point on the surface of an imaginary sphere, the center of which is the satellite. Having determined the intersection point of three imaginary spheres, we get the position of the receiver.

There are four unknown quantities for the solution: the coordinates (x, y, z) and the time t of the signal passage. After measuring the signals from four satellites, we get four equations that can be solved, which will allow us to determine these unknown quantities.

A point on the Earth's surface (FIG. 5) can be defined by latitude, longitude and ellipsoidal height. An alternative method for determining the position of a point is a Cartesian (rectangular) coordinate system, using segments along the x, y, and z coordinate axes from the origin or center of the spheroid. This method is primarily used by GPS to determine the position of a point in space.

Satellite system data and satellite orbit parameters are calculated relative to the Earth's center of mass. The origin 0 is located at the center of the Earth's mass;
  axis 0x—intersection of the plane of the original meridian WGS-84 and the plane of the equator;
  axis 0z—is directed to the North Pole of the Earth;
  axis 0y—complements the system to the right coordinate system.

The initial meridian of WGS-84 coincides with the zero meridian determined by the International Bureau of Time (BIN). Therefore, according to the task condition, there are coordinates of some point on Earth (x; y; z) in a three-dimensional GPS coordinate system.

All further equations are written as one of the possible solutions to the general problem of calculating the formation time of Kukharev regions. This problem, as the problem of calculating the moment of resonance of several gravitational tides, can be solved in different ways with different accuracy (for each specific case)

Let's write down the equations of motion of the Sun and the Moon relative to the GPS coordinate system depending on time, considering the trajectories of the Earth's motion around the Sun and the Moon around the Earth close to the circle. The equation of motion is the dependence of coordinates on time.

Simplified dependence of GPS coordinates of the Moon on time:

$$x_{Moon}(t) = a_{Moon} \cdot \sin(-2 \cdot \pi \cdot v_{Moon} \cdot t + \nabla_{Moon}).$$

$$y_{Moon}(t) = a_{Moon} \cdot \sqrt{1 - e_{Moon}^2} \cdot \cos(-2 \cdot \pi \cdot v_{Moon} \cdot t + \nabla_{Moon})$$

$$z_{Moon}(t) = 0$$

Where:
$a_{Moon}$=379 730 km—the large semi-axis of the Moon's orbit relative to the center of mass of the Earth-Moon system;

$$v_{Moon} = \frac{1}{T_{Moon}} = 1{,}118 \cdot 10^{-5} c^{-1} - \text{frequency for the Moon}$$

$T_{Moon}$=89 428 seconds—Lunar day (24 Earth hours, 50 minutes and 28 seconds),
$e_{Moon}$—is an eccentricity—a numerical characteristic of an ellipse showing the degree of its deviation from the circle. Ellipse eccentricity is the ratio of the distance from the focus to the center of the ellipse to the semimajor axis. This property is taken as the definition of eccentricity. $e_{Moon}$=0,0549—eccentricity of the Moon's orbit;
$\nabla_{Moon}$—is the initial phase of the Moon, which depends on the initial moment of observation. It can be accepted for example on the date 14.12.2020 (16 hours 14 minutes 39 seconds). This is the date of the last total solar eclipse, when the phase of the Moon and the Sun coincide. The total solar eclipse occurred at a longitude of 67 degrees 54 minutes west longitude. Since the longitude is counted from the zero, Greenwich meridian, then this will be the initial phase of the Moon at this time.

Simplified dependence of GPS coordinates of the Sun on time is obtained identically:

$$x_{Sun}(t) = a_{Earth} \cdot \sin(-2 \cdot \pi \cdot v_{sun} \cdot t + \nabla_{Sun})$$

$$y_{Sun}(t) = a_{Earth} \cdot 1 - e_{Earth}^2 \cdot \cos(-2 \cdot \pi \cdot v_{sun} \cdot t + \nabla_{sun})$$

$$z_{sun}(t) = 0$$

Where:

$$v_{Sun} = \frac{1}{86400} = 1{,}157 \cdot 10^{-5} c^{-1} - \text{frequency for the Sun}$$

$a_{Earth}$=149 597 868 km—the large semi-axis of the Earth's orbit;
$e_{Earth}$=0.0167086 eccentricity of the Earth's orbit
Next, let's see what's with the tidal forces at a particular point. The tidal force is calculated by the formula:

$$F = F_2 - F_1 = GMm\left(\frac{1}{(r - R_{Earth})^2} - \frac{1}{r^2}\right)$$

Where
M is the mass of the space object that forms the tide (Sun or Moon),
r is the distance from the center of mass of the Earth to the center of mass of a space object,
m is the mass of tidal matter,
$R_{Earth}$ is the radius of the Earth, $$G = 6{,}67 \cdot 10^{-11} N \frac{m^2}{kg^2} - \text{the gravitational constant.}$$

If, on the basis of Newton's second law, we write differential equations of tides at a specific point with GPS coordinates and transform these equations to find the moments of tides (by examining the modulus of the radius vector of the Sun and Moon at the extremum), then we can obtain general equations of the following form:

$$t = \begin{cases} \dfrac{\nabla_{Sun} - \arctg\dfrac{x}{y} + \pi \cdot n}{2 \cdot \pi \cdot v_{Sun}} & \text{for the Sun} \\ \dfrac{\nabla_{Moon} - \arctg\dfrac{x}{y} + \pi \cdot k}{2 \cdot \pi \cdot v_{Moon}} & \text{for the Moon} \end{cases}$$

Where:
k—the number of the lunar tide at a given point with GPS coordinates, taking into account the minima and maxima of the tide amplitudes;
n—solar tide number.

And then it is extremely important to understand that eclipses occur only when the Moon is full, which is on the same line between the Earth and the Sun. This causes a maximum tide in the Earth's crust, but it is not at all necessary that at this moment the phases of the Moon's movement around the Earth and the Sun around the Earth coincide.

Therefore, further it needs to be taken into account separately. That is, it is necessary that the phases of the Moon's motion around the Earth and the Sun around the Earth coincide for the resonance of gravitational tides.

Plus, it is important to understand that if we eventually move on to the three-body problem, then this problem is analytically unsolvable. But in practice, this is not so important, since we have a lot of other ways to understand the place and time of the formation of the Kukharev regions.

The simplest ways to calculate the formation time of the Kukharev regions
1) Geometric method (figure where there are different gravitating factors)
2) Time analysis of the "Kukharev reference area". The point is to choose a sample. For example, at the top in the stratopause, where electromagnetic waves are formed. That is, you can look "up" using a Schumann receiver (at 1 harmonic) and when the amplitude of the oscillations increases (that is, the Kukharev region is formed), then you are inside the resonance of gravitational tides, which affects all fluids. The volume of the resonance occurring simultaneously is quite large, in a number of experiments it was conventionally a ball with a radius of 100 km.

One can make equations with respect to different starting points of reference, but the essence of the technology always remains the same—you calculate for specific points of the Earth (or another planet) the moments of tides from different gravitational factors (together with the phases of motion). When 2 or more tides coincide at one point, this is the moment of resonance.

Statistical Proof of the Existence of Kukharev Regions (in the Stratopause in Terms of Converting Electronic Fluids into Electromagnetic Waves of Schumann Resonances).

The following is a set of graphs comparing the moments of resonances of gravitational tides and the moments of energy jumps of Schumann resonances. There is a clear correlation between these two events.

That is, the resonance of gravitational tides, the moment when several tides "overlap" each other in an electronic fluid, resonate (from different sources of gravity), causes a jump in the energy of the Schumann resonance.

It should be noted that the resonance prediction graph shows the moment of resonances, but the tides may be in the opposite phase, and then there will be no energy jump (this happens in some cases). Solar flares are not taken into account, the gravitational influence of other planets and stars (except the Sun) is also not taken into account in these graphs.

The increase in the amplitude of the energy of Schumann resonances is caused in 85 percent of cases (in most cases) by the resonance of gravitational tides in electron clouds-fluids with the coincidence of the phases of motion of gravitational factors, in 15 percent of cases—by the solar wind, other electron flows from outside the planet.

The correlations below show a connection between the resonance of gravitational tides—a jump in the energy of Schumann resonances. We are not looking at solar flares here, it is not predicted.

Data on the statistics of the energy level of Schumann resonances are provided from open sources and can easily be verified. This is data from GCI's Global Coherence Monitoring System.

Anyone can take any Schumann wave tracking station to check. It is only important to know the GPS coordinates of the tracking station. Next, anyone can calculate (it is important to be accurate to at least an hour) the moments of resonances of gravitational tides and superimpose some moments of time on others to check the correlation. Approximate accuracy of determining the moment of gravitational resonance geometrically—up to half a day (plus or minus 6 hours).

The following is a sequential calculation of the gravitational resonance moments for three Schumann wave tracking stations (with known GPS coordinates). In practice, the coordinates of the observation points can be indicated in calculations with some error, since the volume of the resonance occurring simultaneously is quite large, in a number of practical experiments, the resonance region was conventionally a ball with a diameter of 100 km or more.

TABLE 1

| No | Station | GPS-coordinates |
|---|---|---|
| 1 | GCI002 Hofuf, Saudi Arabia | Latitude: 25° 22' 59.99" N<br>Longitude: 49° 34' 59.99" E |
| 2 | GCI005 Northland, New Zealand | Latitude: 35° 34' 48.00" S<br>Longitude: 173° 58' 12.00" E |
| 3 | GCI006 Hluhluwe, South Africa | Latitude: 28° 01' 60.00" S<br>Longitude: 32° 16' 60.00" E |

There are a couple of gravitational factors that do not resonate with each other—the Barycenter is the distance to the observer (BOD, barycenter-observer distance) with the depth of the barycenter. Because you can't de facto gravitate with yourself. I would also like to note that the two gravitating factors—the phase of the moon+the distance from the earth of the moon usually resonate weakly with each other, since they are mutually related, and at the same time the resonance needs more time to "mature" (up to half a day). All other combinations (intersections) of gravitational factors give strong resonances.

I would also like to note that an interesting fact is that the intersection of two related factors (such as the depth of the barycenter+the distance from the observer to the barycenter) in some cases can "smooth out, reduce" the energy of the usual resonance, if they occur at about the same time.

Not all gravitating factors are listed here. The principle itself is shown here. It is clear that there are other gravitational factors, such as the gravitational field of Mars, Venus, stars, and so on, but they are conceptually not so important. Solar flares and streams of charged particles are also not taken into account.

Resonance can occur not only at the intersection of graphs. The simultaneous extremum (for example, the maximum at one time) of two or more gravitational factors can also be the cause of the resonance of gravitational tides.

Two resonances close in time can "merge" into one (into one perturbation, into one "killer wave", into one jump in the amplitude of the Schumann resonance).

Figure 7:
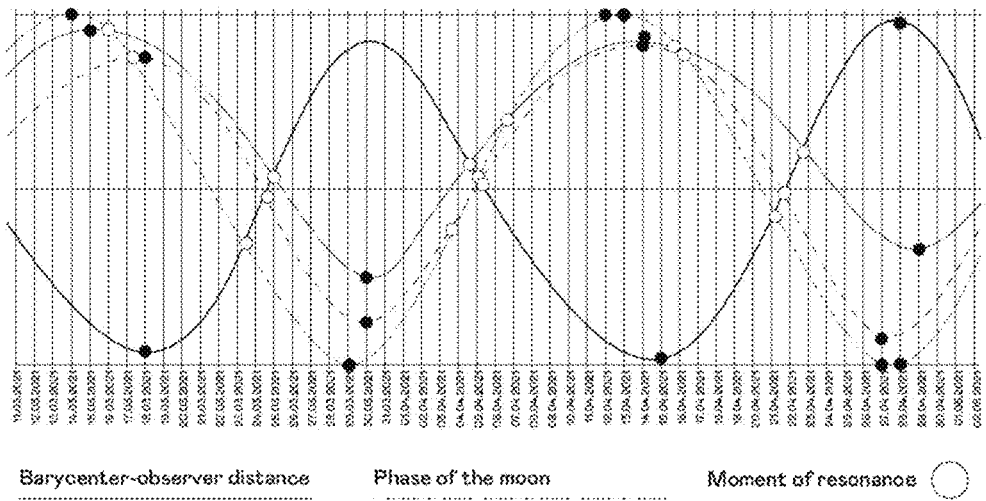
FIG. 7 shows the calculated moments of gravitational tidal resonances for the GCI002 Hofuf station, Saudi Arabia (graphic view). In all calculation charts, the time is given in Greenwich Mean Time. There may be several resonances in one month at the same time, so there may be several pairs of drawings per month (so that specific cause and effect can be graphically shown).
Figure 8:
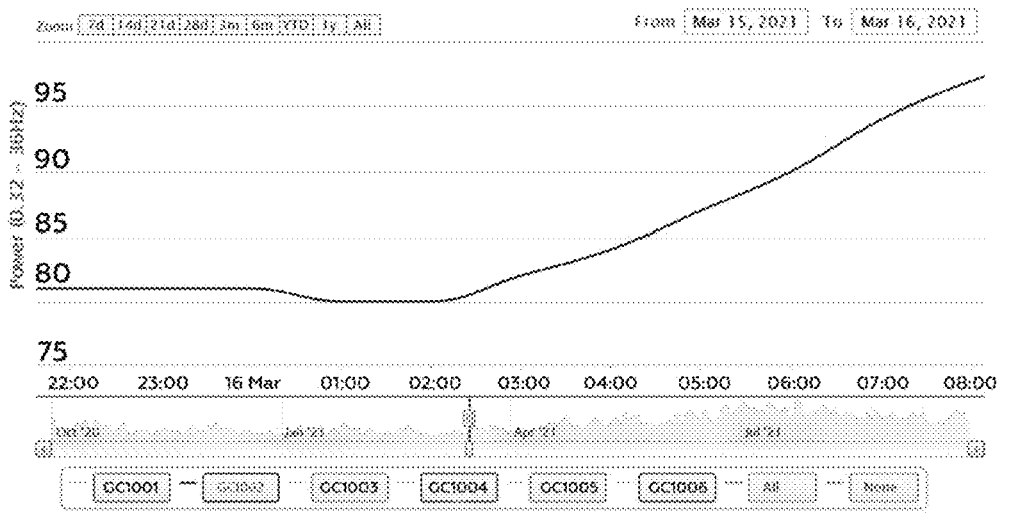
FIG. 8 shows the resonance number 1 (16.03.21) for the GCI002 Hofuf station, Saudi Arabia
Figure 9:
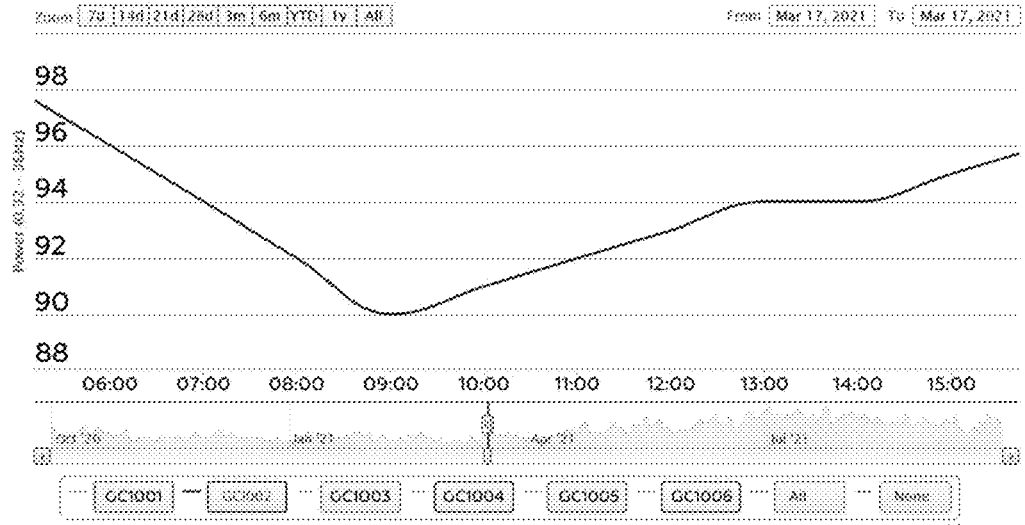
FIG. 9 shows the resonance number 2 (17.03.21) for the GCI002 Hofuf station, Saudi Arabia
Figure 10:
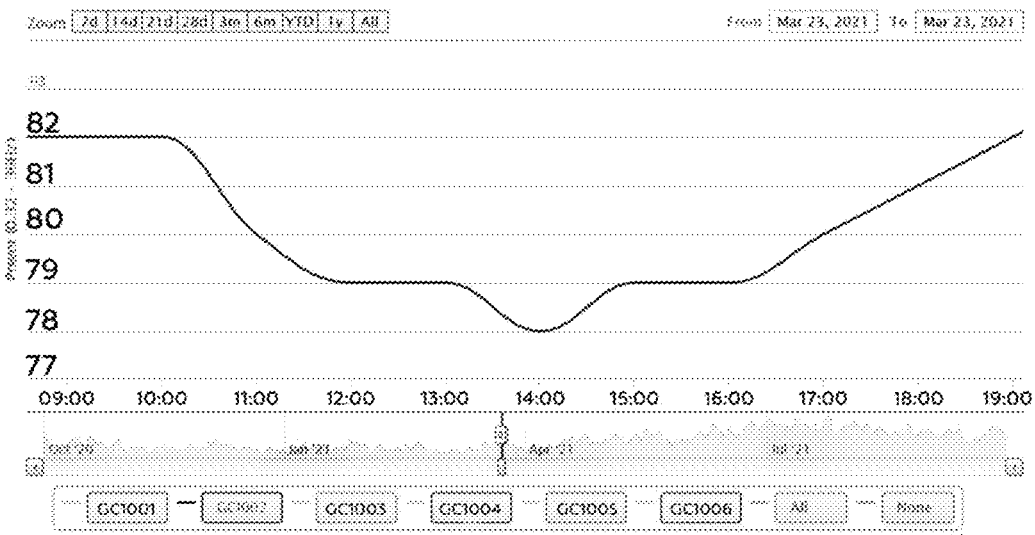
FIG. 10 shows the resonance number 3 (23.03.21) for the GCI002 Hofuf station, Saudi Arabia
Figure 11:
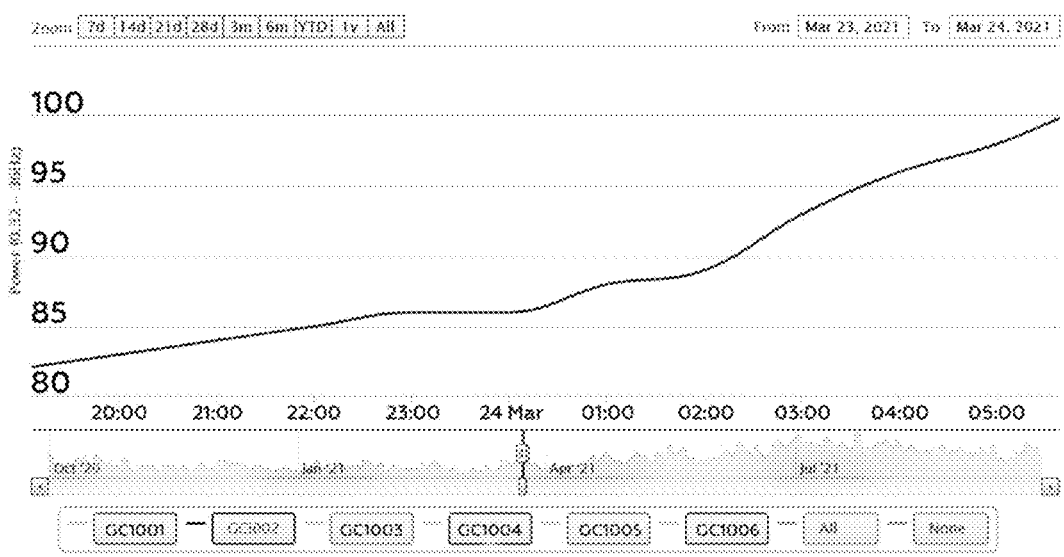
FIG. 11 shows the resonance number 4 (24.03.21) for the GCI002 Hofuf station, Saudi Arabia. One resonance replaces another, the growth of the electromagnetic wave energy continues
Figure 12:
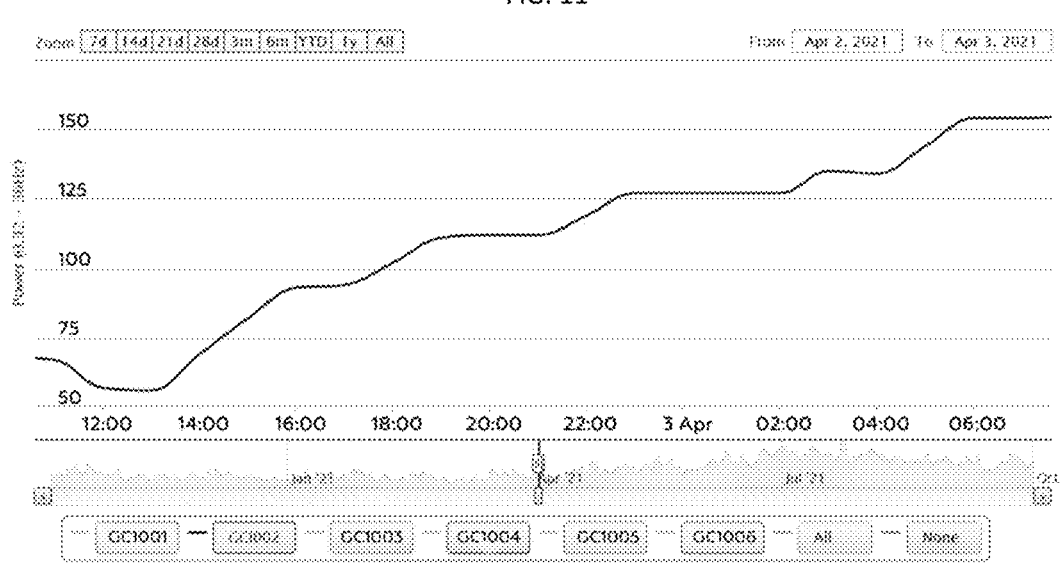
FIG. 12 shows the resonance number 5 (03.04.21) for the GCI002 Hofuf station, Saudi Arabia.
Figure 13:
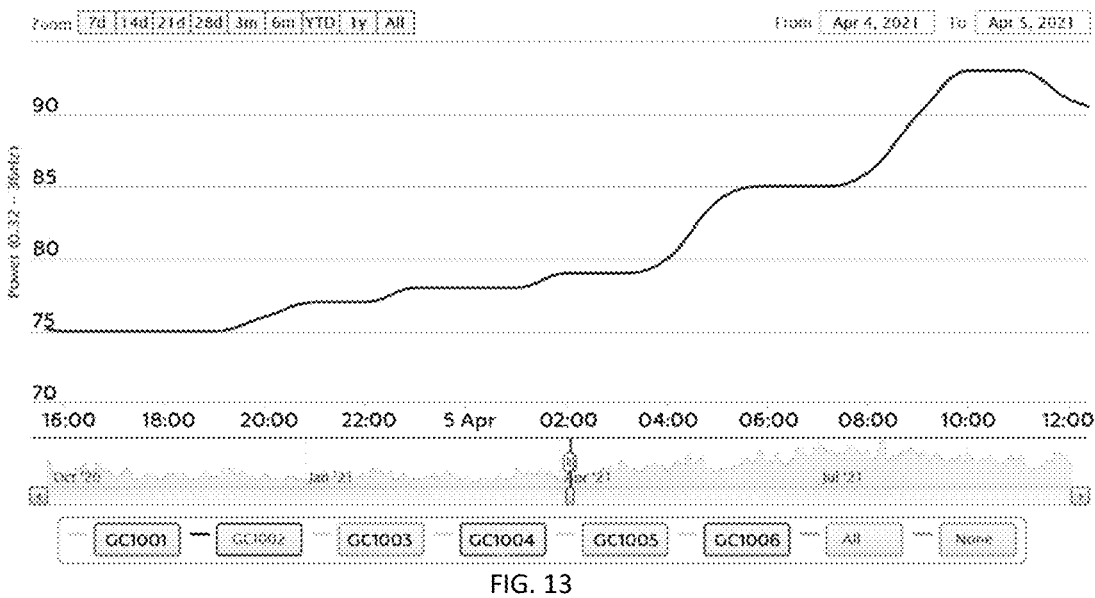
FIG. 13 shows the resonance number 6 (05.04.21) for the GCI002 Hofuf station, Saudi Arabia.
Figure 14:
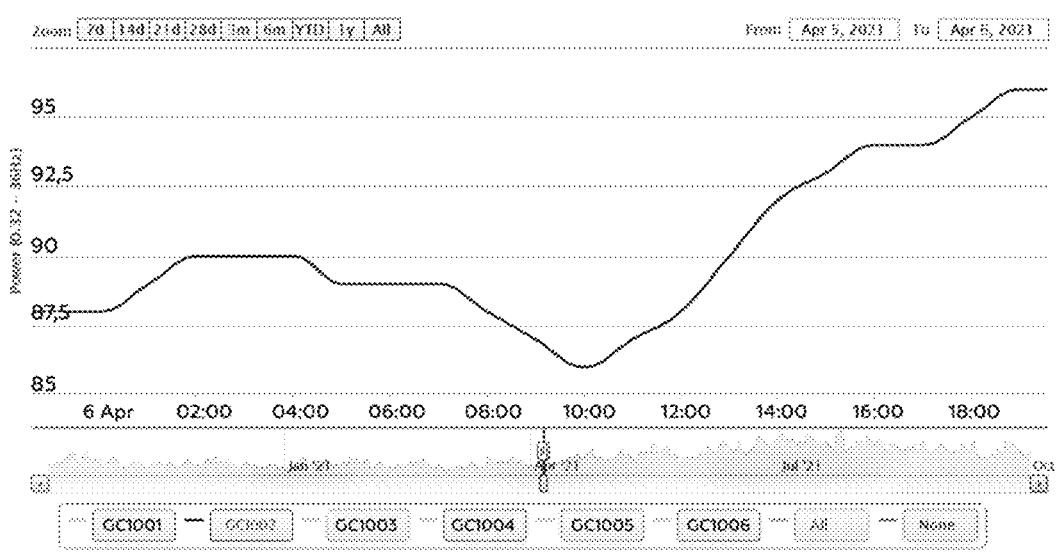
FIG. 14 shows the resonance number 7 (06.04.21) for the GCI002 Hofuf station, Saudi Arabia.
Figure 15:
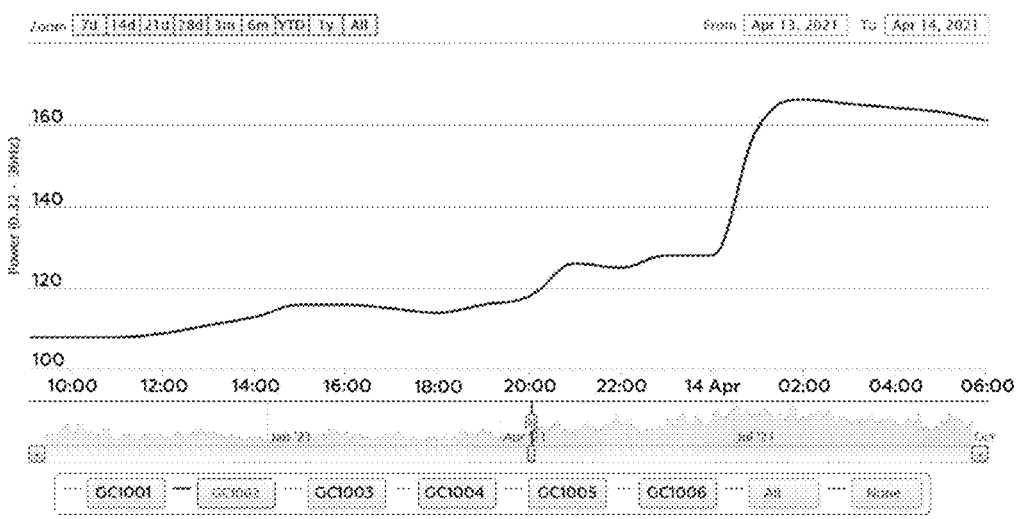
FIG. 15 shows the resonance number 8 (14.04.21) for the GCI002 Hofuf station, Saudi Arabia.
Figure 16:
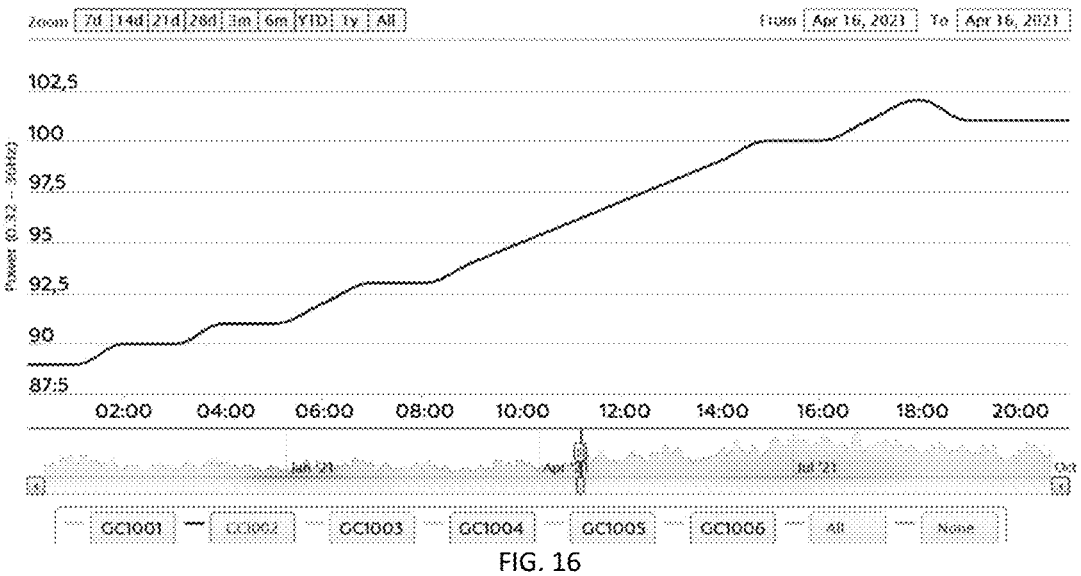
FIG. 16 shows the resonance number 9 (16.04.21) for the GCI002 Hofuf station, Saudi Arabia.
Figure 17:
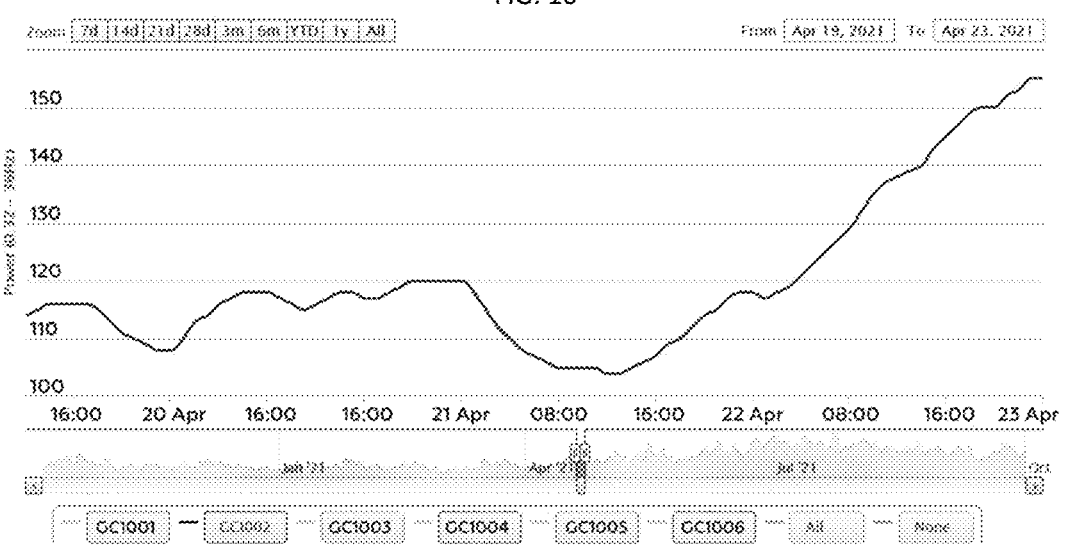
FIG. 17 shows the resonance number 10 (21-22.04.21) for the GCI002 Hofuf station, Saudi Arabia.

FIG. 7 shows the calculated moments of gravitational tidal resonances for the GCI002 Hofuf station, Saudi Arabia (graphic view). FIGS. 8-17 show resonances for the GCI002 Hofuf station, Saudi Arabia, step by step.

And now look at the calculated moments of gravitational tides resonances for the GCI002 Hofuf station, Saudi Arabia (tabular view) and the fact of the growth of the energy (amplitude) of the Schumann wave during observation. You see a clear correlation.

TABLE 2

| No (Resonance number) | Calculated forecast points of the gravitational tidal resonance dates Date | Comment | The fact of the growth of the energy (amplitude) of the Schumann wave at the time of observation |
|---|---|---|---|
| 1 | 16 Mar. 2021 | The calculated forecast of the gravitational resonance coincided with the fact of the growth of the energy of the electromagnetic Schumann wave. | √ |

TABLE 2-continued

| No (Resonance number) | Calculated forecast points of the gravitational tidal resonance dates Date | Comment | The fact of the growth of the energy (amplitude) of the Schumann wave at the time of observation |
|---|---|---|---|
| 2 | 17 Mar. 2021 | The calculated forecast of the gravitational resonance coincided with the fact of the growth of the energy of the electromagnetic Schumann wave. | √ |
| 3 | 23 Mar. 2021 | The calculated forecast of the gravitational resonance coincided with the fact of the growth of the energy of the electromagnetic Schumann wave. | √ |
| 4 | 24 Mar. 2021 | The calculated forecast of the gravitational resonance coincided with the fact of the growth of the energy of the electromagnetic Schumann wave. | √ |
| 5 | 3 Apr. 2021 | The calculated forecast of the gravitational resonance coincided with the fact of the growth of the energy of the electromagnetic Schumann wave. | √ |
| 6 | 5 Apr. 2021 | The calculated forecast of the gravitational resonance coincided with the fact of the growth of the energy of the electromagnetic Schumann wave. | √ |
| 7 | 6 Apr. 2021 | The calculated forecast of the gravitational resonance coincided with the fact of the growth of the energy of the electromagnetic Schumann wave. | √ |
| 8 | 14 Apr. 2021 | This is only a demonstration that the simultaneous maximum (at one time) of two or more gravitational factors can also be the cause of the resonance of gravitational tides. The calculated forecast of the gravitational resonance coincided with the fact of the growth of the energy of the electromagnetic Schumann wave. | √ |
| 9 | 15-16 Apr. 2021 | Combining two resonances. The calculated forecast of the gravitational resonance coincided with the fact of the growth of the energy of the electromagnetic Schumann wave. | √ |
| 10 | 21-22 Apr. 2021 | Combining two resonances. The calculated forecast of the gravitational resonance coincided with the fact of the growth of the energy of the electromagnetic Schumann wave. | √ |

The same clear correlations have been established between gravitational resonances (which create Kukharev regions) for GCI005 stations in Northland, New Zealand and GCI006 Hluhluwe, South Africa. That is, each time the gravitational resonance creates the Kukharev region, which gives energy for the Schumann wave (plus other waves are also formed). The energy of gravitational resonance through the Kukharev region increases the energy of all waves that consist of different particles.

General Fundamental Notes on the Work of Gravity.

In addition to the 4 gravitating factors (the lines of which are shown in the figures for determining the moments of gravitational resonance), there are others, for example, the resonance of two factors associated with the barycenter and the diurnal/semi-diurnal position of the Moon and the Sun, but they are weaker in fact. Therefore, they are not indicated in the figures, only stronger resonances are given there.

Just as for electromagnetic waves, and for migraines, the concept of a mismatch in the phase of the movement of factors in general is not so important, because the strengthening of the super-tide in the head, that the multidirectional tide is the result of one—headache. Identical for electron clouds, the concept of "antiphase of motion" for gravitational factors is less significant for Kukharev regions of electrons (compared to Kukharev regions of liquids).

The barycenter is the source (or one of the important nodes of motion) of gravitons, which should move along lines like the lines of force of the earth's magnetic field, only the central node is the barycenter.

Interference and resonance of waves from gravitons is possible. This is very similar to the frequency of occurrence of flyby anomaly. Plus, the question of the "operation" of the barycenter in systems when the barycenter is constantly located in the space between two objects is very interesting (for example, Pluto and its largest satellite, Charon, rotate around a point almost 600 miles (960 km) above the surface of Pluto)

In general, three groups of gravitating factors can be distinguished:

External gravitational tides (movement of the Sun and Moon)

Movement of the Earth-Moon barycenter

Accumulated voltage in the object (in relation to which we are looking for resonance)

We can also say that there is a periodicity of antiphase of the motion of gravitating factors, but this is increasingly related to fundamental physics.

Figure 5:
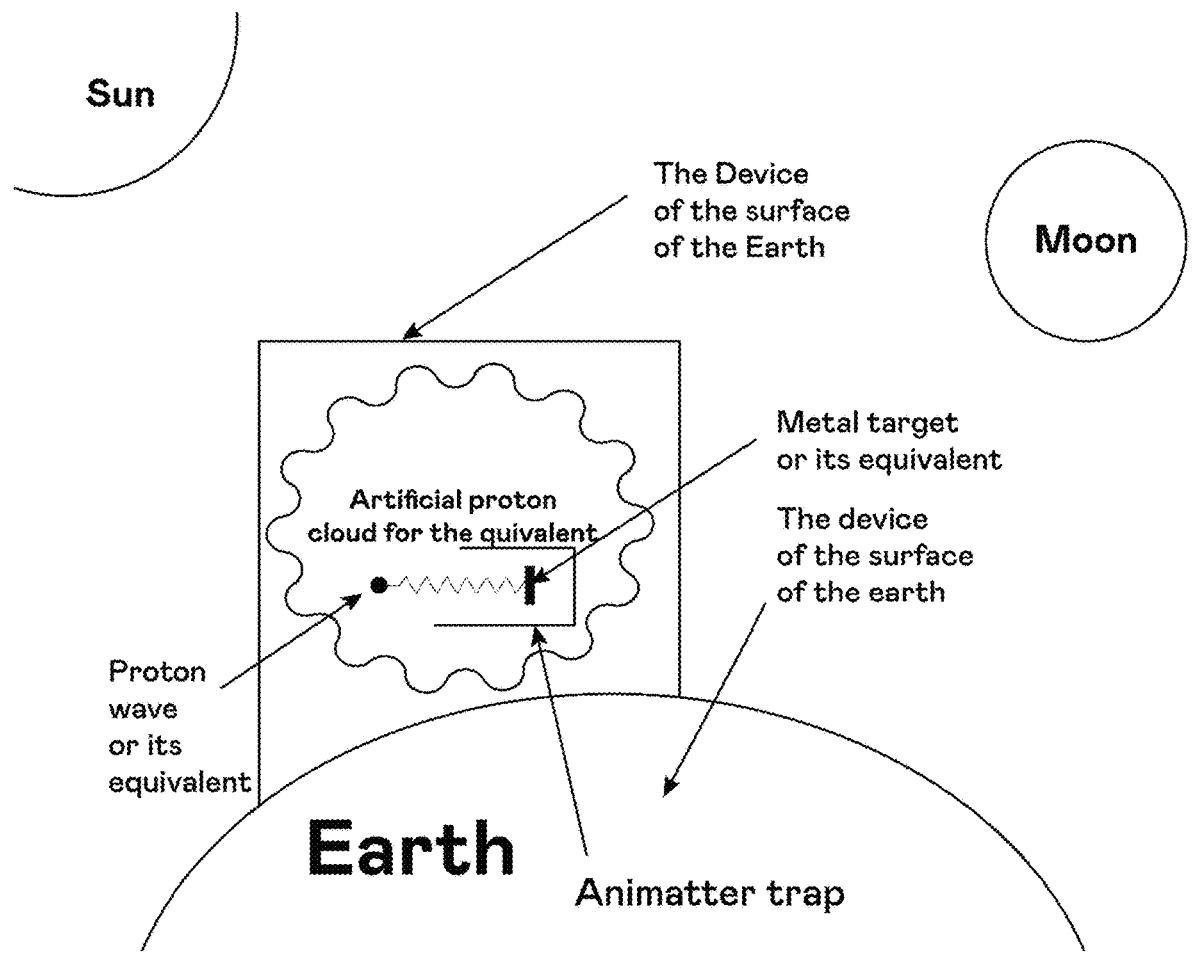
FIG. 5 shows how antimatter can be created in artificial Kukharev regions on the Earth's surface. at the moments of gravitational resonance (including the moments of time when there are bursts of gravity due to the energons of Kukharev's time). You need to create a cloud of charged particles, which at the right time will begin to oscillate, create a wave, on the way of which you need to create an obstacle.
Figure 6:
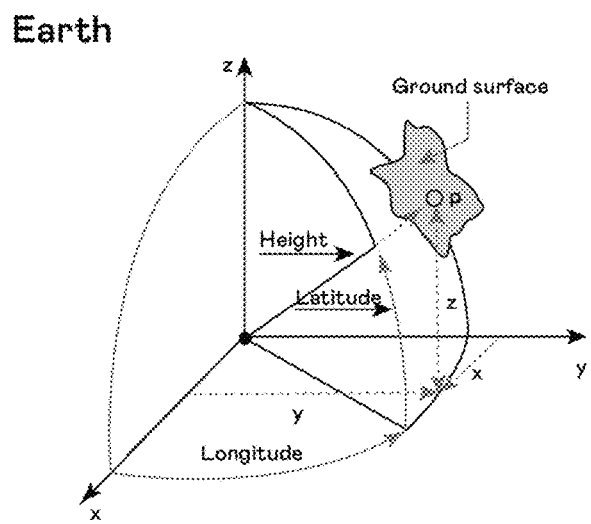
FIG. 6 shows a point on the Earth's surface can be defined by latitude, longitude and ellipsoidal height.

FIGS. 4-5 illustrate examples of antimatter mining according to the present invention. A Penning trap (or any other antimatter/magnetic trap is setup in one or more Kukharev regions, which comprises one or more clouds consisting of protons. When a predicted or measured resonance of gravitational tides creates a proton wave from said proton cloud, a plate comprising one or more heavy metals is placed in front of this proton wave. The collision of the proton wave with the plate forms antimatter/antiparticles. The collision point is better controlled by being positioned inside the magnetic trap. Due to such clouds of protons (as well as clouds comprising other charged particles, e.g., electrons) being present in the upper atmosphere and elsewhere, the resonance forms a vibration which, in turn, creates the movement of the charged particles. The most preferred times for mining antimatter are, therefore, the moments of the occurrence of solar flares, i.e., when many different particles fall from the Sun into the Earth's atmosphere.

The numerous perturbations on the Sun, e.g., flares and dark spots on the Sun, are also likely at many points to be due to the resonance of gravitational tides.

Resonance is probably possible at the level of gravitonic waves, when the resonance of gravitational tides leads to a local change in the gravitational potential. There are a number of satellites (NEAR, Rosetta, Galileo) that have acquired "extra" speed after gravitational maneuvers near the Earth, beyond calculations.

The 79 moons of Jupiter form a huge hodgepodge of gravitational tidal resonances, which apparently support the great red spot. But to simplify it in the future, you can take the 4 largest satellites of Jupiter, calculate the location of the barycenter of the general system (with Jupiter) and compare the location of the barycenter and resonances with the location of the red spot. The dark spot of Neptune (an anticyclone in methane fluids-Neptune clouds) is also probably the result of the resonance of gravitational tides.

Characteristically, as already shown above on planet Earth, the resonance of gravitational tides always leads to energy jumps in the amplitude of Schumann resonances (from emerging Kukharev regions), but at the same time atmospheric pressure/temperature is constantly changing—that is, this is also the process of formation of a typical cyclone/anticyclone. The only question is the size of the gravitational resonance energy. On Jupiter, the gravitational resonance energy is clearly greater than on Earth, respectively, there is a large spot constantly. On Neptune, resonances appear and disappear (as on Earth)

The structure of Mercury is probably a consequence of the constant resonances of gravitational tides with the Sun. Constant stress-strain states "washed out" all the fluids, all the upper layers, leaving only essentially a solid core, which is more than half of the entire diameter of the planet, proportionally five times larger than similar terrestrial parameters.

Interestingly, the main elements of the composition of oil are carbon (83.5-87%) and hydrogen (11.5-14%). In addition, oil contains: sulfur in the amount of 0.1 to 1-2% (sometimes its content can reach 5-7%, in many oils there is practically no sulfur); nitrogen in the amount of 0.001 to 1 (sometimes up to 1.7%). Both oil and some other minerals apparently formed in the earth's mantle for many millions of years due to constantly occurring gravitational resonances in the Kukharev regions inside the Earth's mantle. Titan (one of the largest satellites of Saturn) has 100 times more oil and gas than on Earth, which is caused by similar reasons (Jupiter has 64 satellites and there are colossal gravitational resonances).

Giant vortices on Venus are also likely a consequence of the resonance of gravitational tides.

Flashes and spots on the sun are in some sense identical to the process of formation of the desert belt on earth. Just because the sun is a fluid in its purest form, we can observe it online. At the same time, the process of formation of stress-strain states due to the resonance of gravitational tides is more complex. Simply put, it is possible to liken the earth-moon barycenter to the sun-Jupiter barycenter.

In the future, it will be interesting to calculate the resonances of gravitational tides for systems of the galaxy-star, galaxy-galaxy, black hole-star type. It is important to check the possibility that such systems are sources of ultra-energetic cosmic radiation, identical to how the resonance of gravitational tides creates Kukharev regions in the Earth-Moon system in the stratopause (and in some other places) that create electromagnetic waves of the Schumann resonance. In addition, the stress-strain state of the scale of galaxies can create various inhomogeneities, voids, such as void Volopas.

The correct formulation of an interesting problem would be an abstraction from the magnetic field, from the case when the barycenter of two bodies is inside one of the bodies, and accordingly a "pure" problem of this kind—what is so physical at the level of gravitons happening in the barycenter of two bodies, because of which the bodies rotate around it? (using the example of the Pluto-Charon barycenter). It resembles a two-body problem, but the more statistics we collect on the Kukharev region, the easier it will be to solve it. First of all, you need everything by flyby anomaly. It is extremely important to draw all the lines of gravitons flows. The problem is complicated by the fact that we immediately have to work with macrostatistics, we cannot find resonances, relatively speaking, of two atoms (there is not enough resolution of current devices). Plus, it is clearly felt that as soon as we come to the need to understand conditionally how 1 gram of matter emits gravitons, then this process should be inextricably linked with the process of determining the characteristics of time energons (Kukharev's energons (time bosons), Copyright 2016), and for this process the invention may require free access to orbital gamma-ray telescopes and redirecting them for a number of relevant experiments.

In general, the Pluto-Charon barycenter directly forces us to introduce some kind of dynamic lever rule for it at the level of gravitons. The classical rule of the lever states that the lever (barycenter) is in equilibrium if the sum of the moments of forces applied to it is zero. Here it is necessary to consider one moment of time (and then integrate) when the barycenter is a "stationary" body.

About 78% of all lightning discharges are concentrated in the tropical and equatorial zone (from 30° north latitude to 30° south latitude). This is a fact. It is explained by the fact that the resonances of gravitational tides most often form Kukharev regions in this area high in the atmosphere, which actually provoke lightning discharges.

Next, let's look at some examples of sprites (lightning that occurs in the upper atmosphere). Data on the facts of the appearance of sprites are taken from open sources (JOURNAL OF GEOPHYSICAL RESEARCH: ATMOSPHERES, VOL. 118, 6607-6632, doi:10.1002/jgrd.50459, 2013).

TABLE 3

| No | Date | Latitude | Longitude |
|---|---|---|---|
| 1 | Aug. 27, 2009 | 16.07°N | 83.51°E |
| 2 | Sep. 24, 2013 | 8.41°N | 81.76°E |
| 3 | Aug. 30, 2014 | 27.4°N | 109.6°E |

Figure 18:
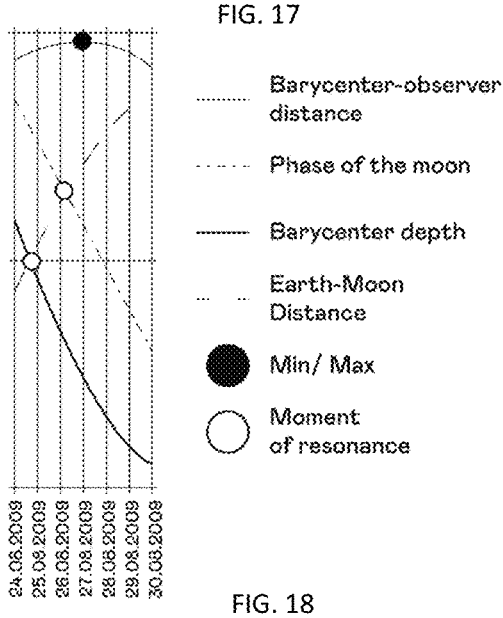
FIG. 18 shows the resonance of gravitational tides that caused the sprite Aug. 27, 2009 (16.07° N, 83.51° E)
Figure 19:
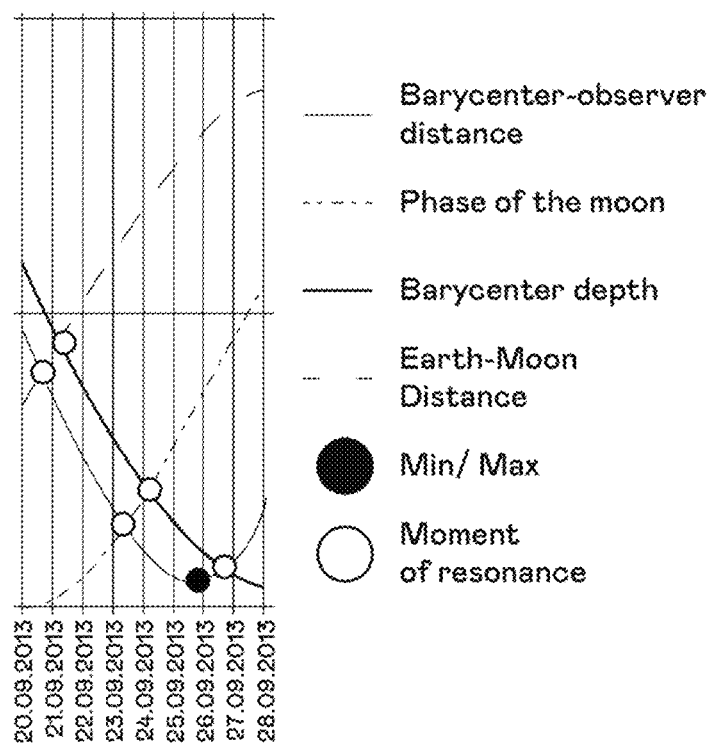
FIG. 19 shows the resonance of gravitational tides that caused the sprite Sep. 24, 2013 (8.41° N, 81.76° E)
Figure 20:
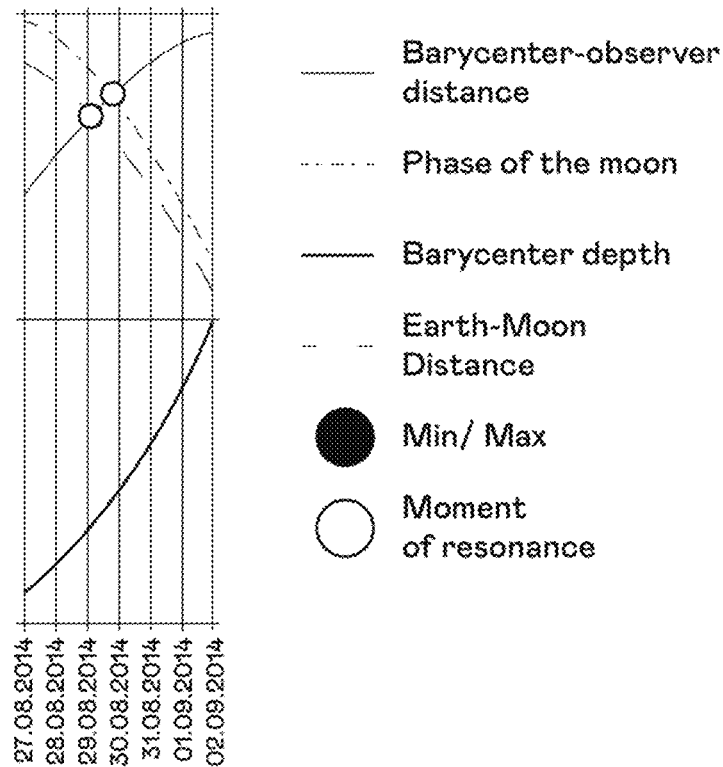
FIG. 20 shows the resonance of gravitational tides that caused the sprite Aug. 30, 2014 (27.4° N, 109.6° E)
Figure 21:
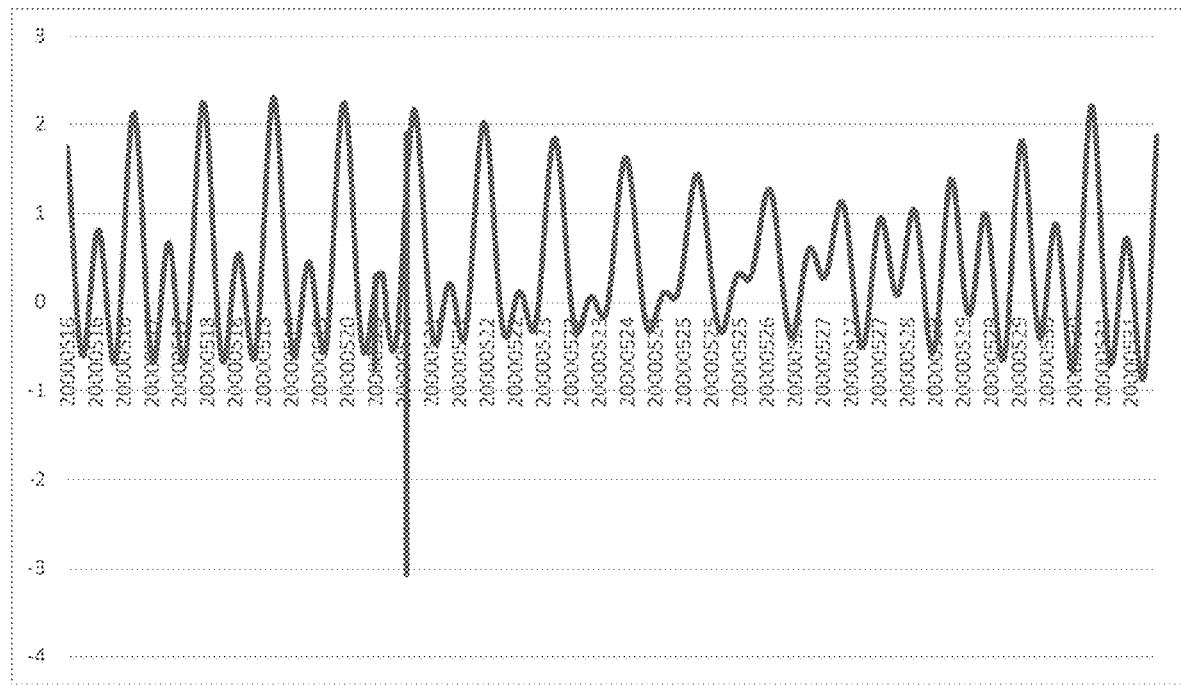
FIG. 21 shows the gravitational field fluctuations. You see the full analog of "flyby anomaly" only at ground level. The Kukharev region consists of gravitons. May 20, 2000, Kyoto, Japan.
Figure 22:
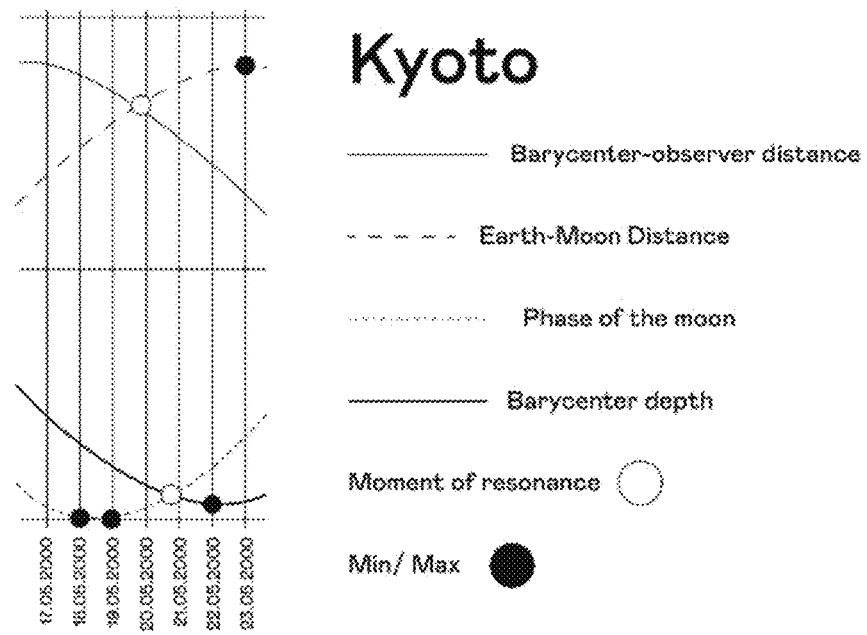
FIG. 22 shows resonance formation from gravitons. May 20, 2000, Kyoto, Japan
Figure 23:
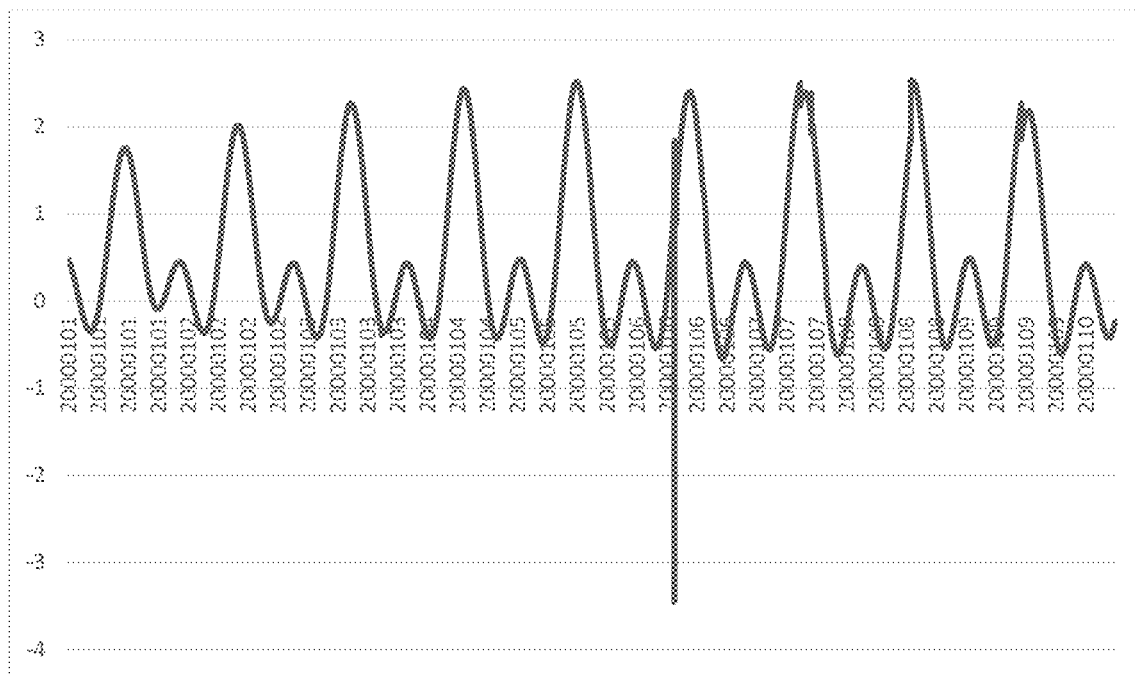
FIG. 23 shows the gravitational field fluctuations (Kyoto Tracking Station). You see the full analog of "flyby anomaly" only at ground level. The Kukharev region consists of gravitons. Jan. 6, 2000.
Figure 24:
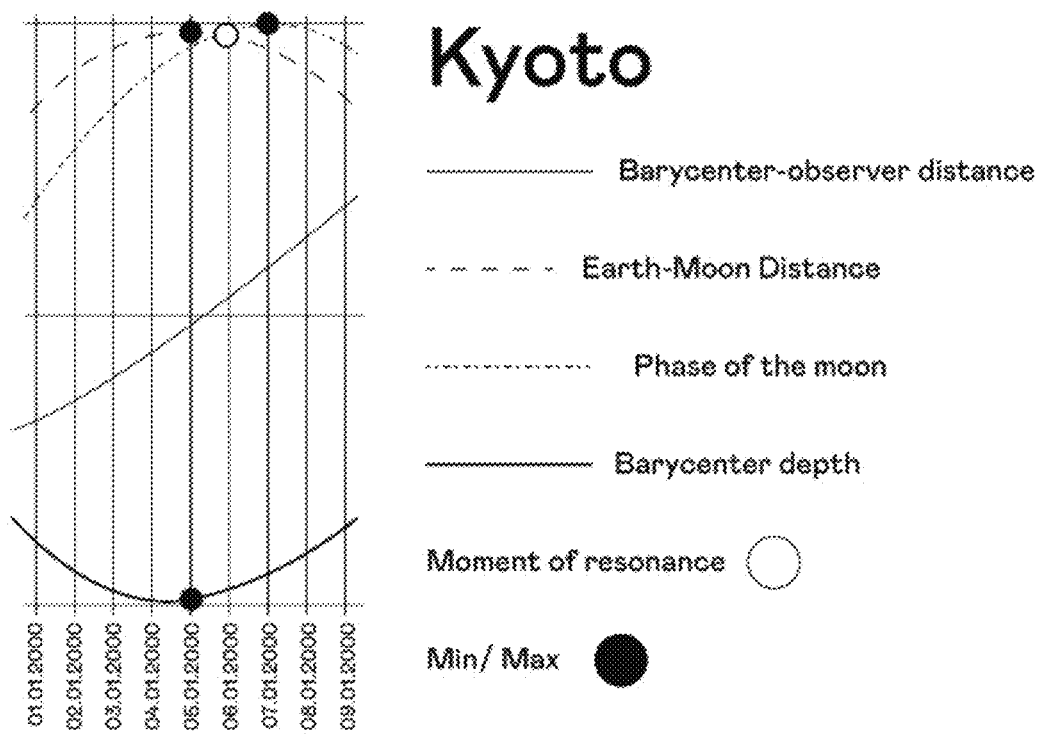
FIG. 24 shows resonance formation from gravitons. Jan. 6, 2000.
Figure 25:
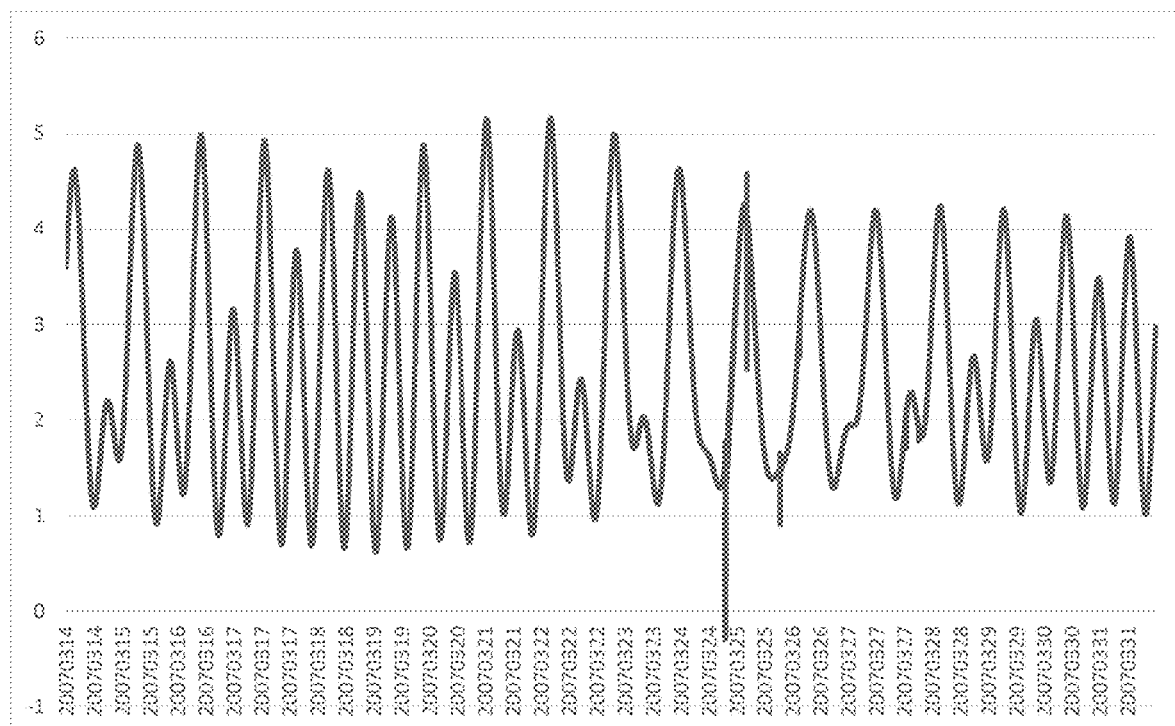
FIG. 25 shows data from Kamioka Earth Gravity Field Tracking Station in Japan (Latitude 36.42530N; Longitude 137.30840 E). You see the full analog of "flyby anomaly" only at ground level. The Kukharev region consists of gravitons. Mar. 24, 2007.
Figure 26:
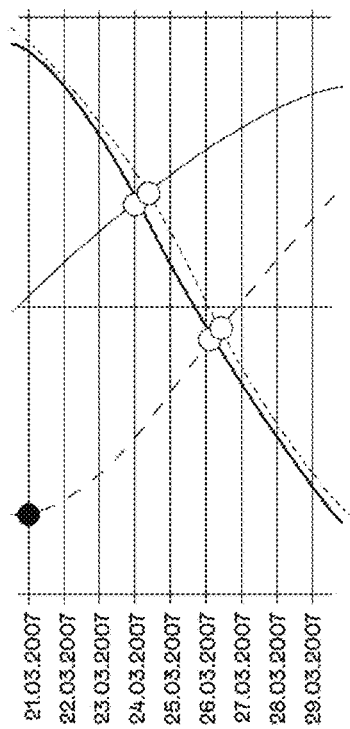
FIG. 26 shows resonance formation from gravitons. Mar. 24, 2007.
Figure 27:
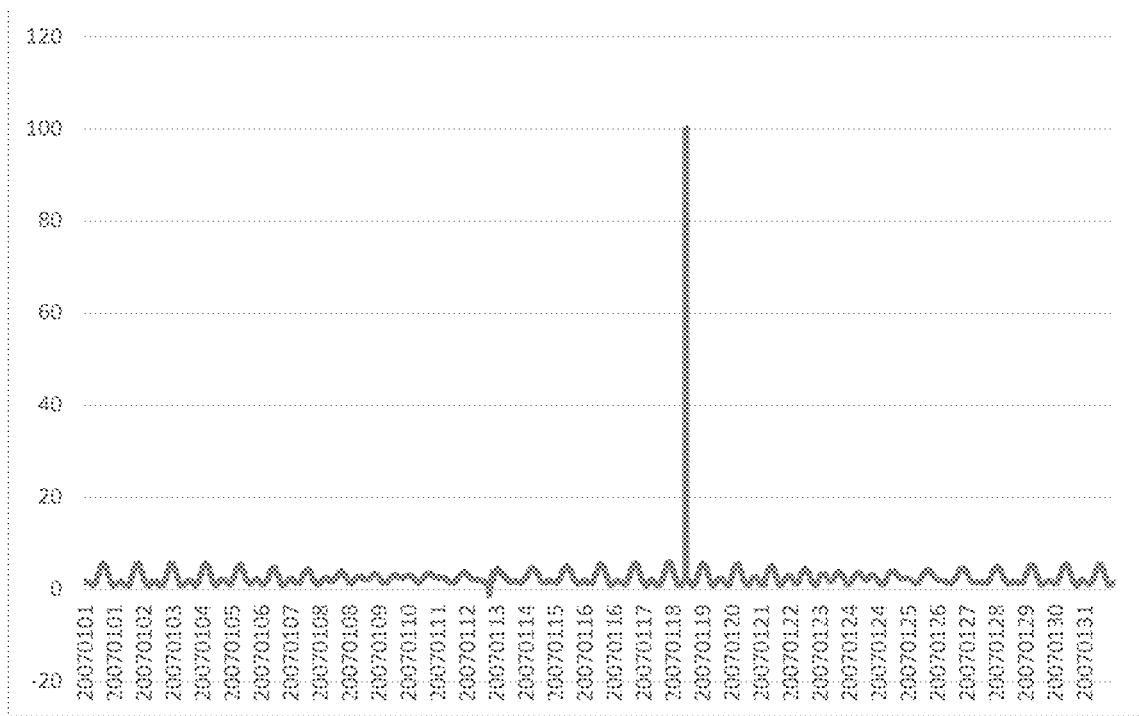
FIG. 27 shows a sharp jump in gravity. Kamioka Earth Gravity Field Tracking Station in Japan (Latitude 36.42530N; Longitude 137.30840 E).
Figure 28:
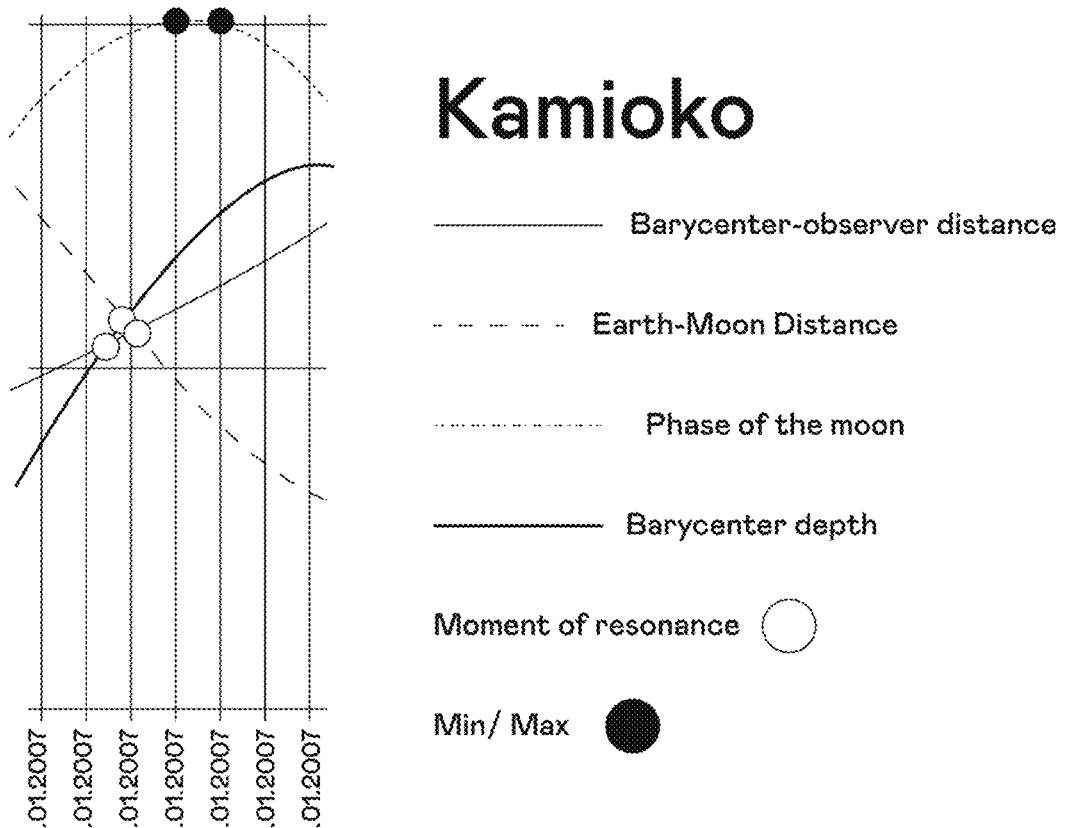
FIG. 28 shows reasons for the gravity jump
Figure 29:
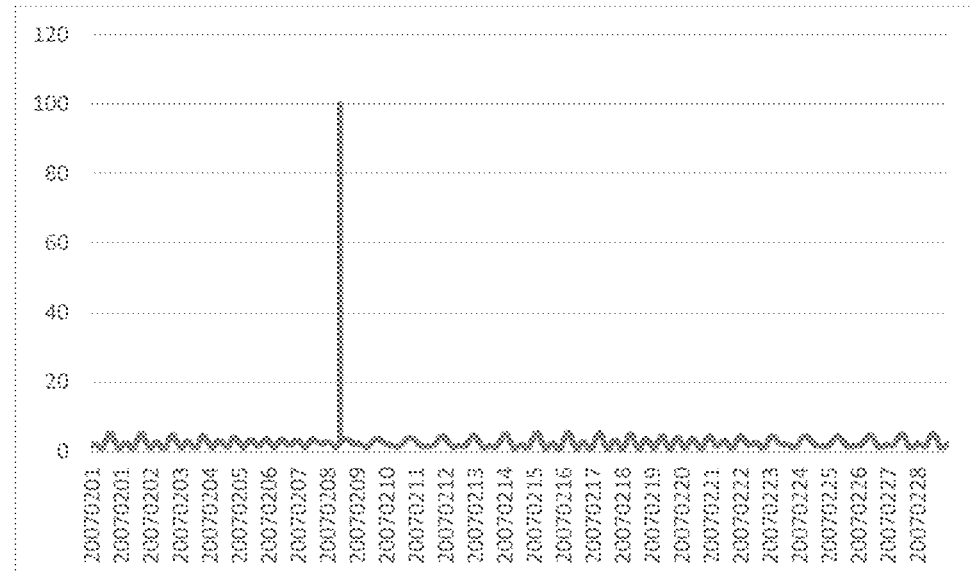
FIG. 29 shows a sharp jump in gravity. Kamioka Earth Gravity Field Tracking Station in Japan
Figure 30:
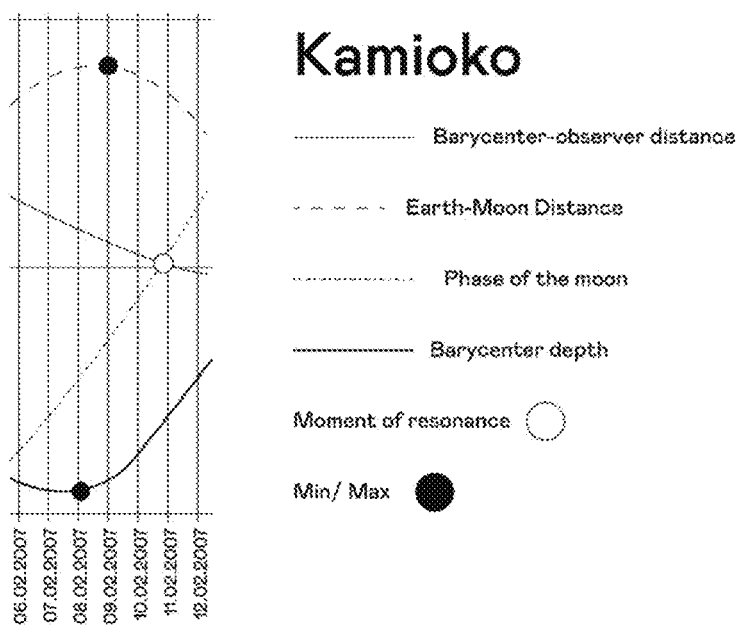
FIG. 30 shows reasons for the gravity jump
Figure 31:
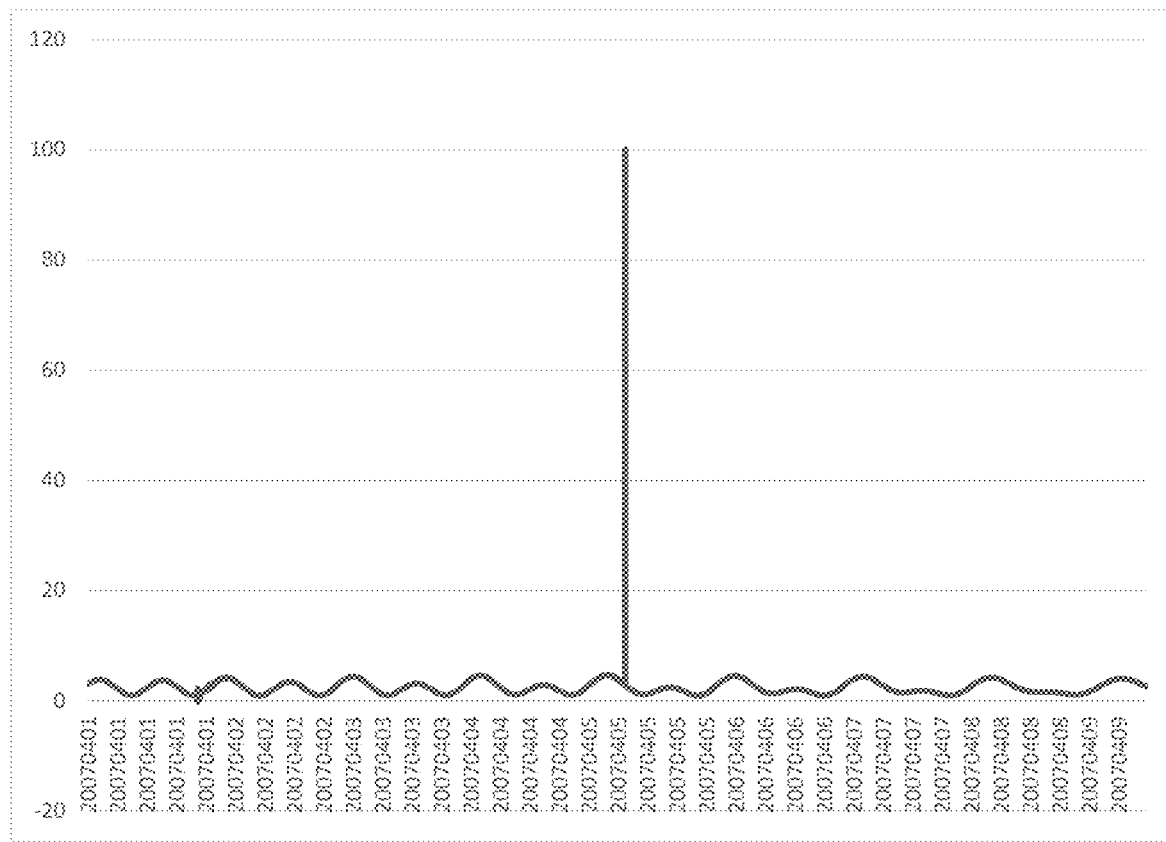
FIG. 31 shows a sharp jump in gravity. Kamioka Earth Gravity Field Tracking Station in Japan
Figure 32:
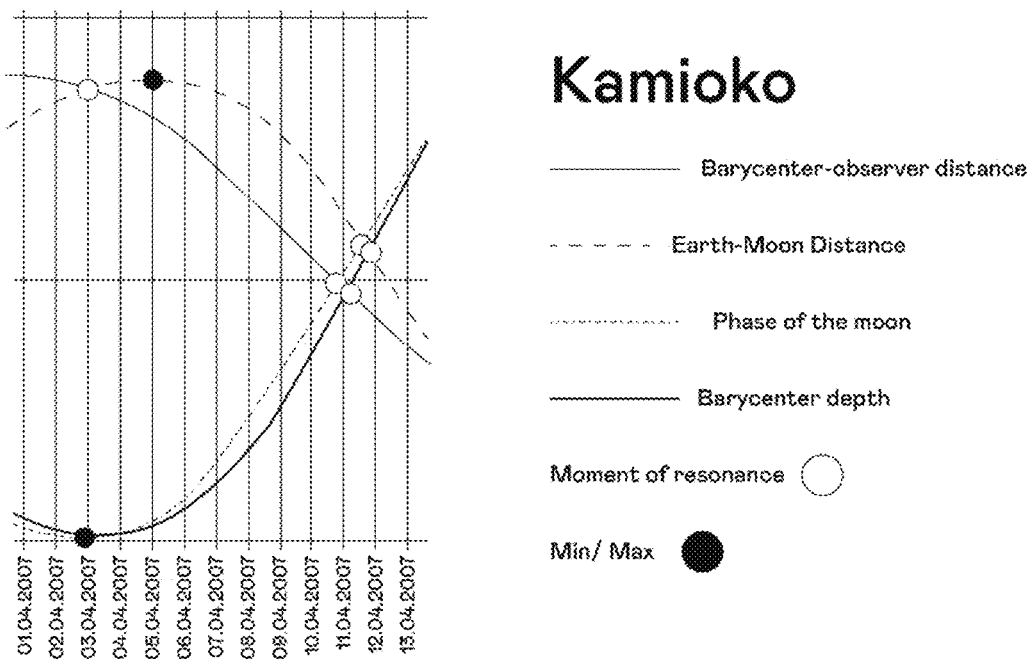
FIG. 32 shows reasons for the gravity jump
Figure 33:
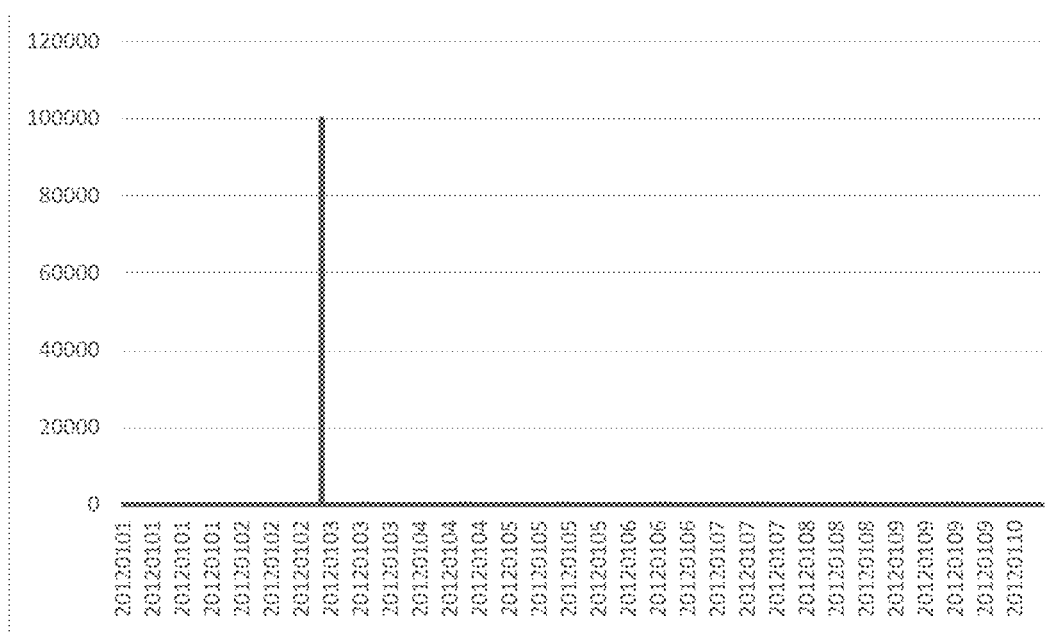
FIG. 33 shows a sharp jump in gravity. Station: Hsinchu, Taiwan (24,7926N, 120,9855E)
Figure 34:
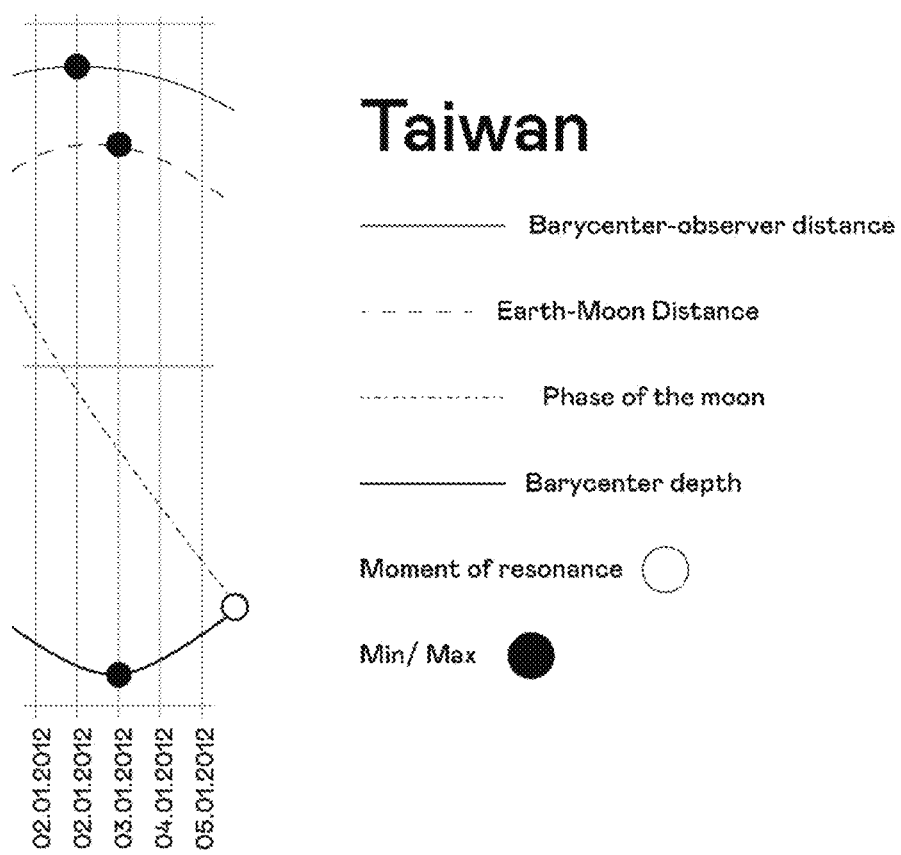
FIG. 34 shows reasons for the gravity jump
Figure 35:
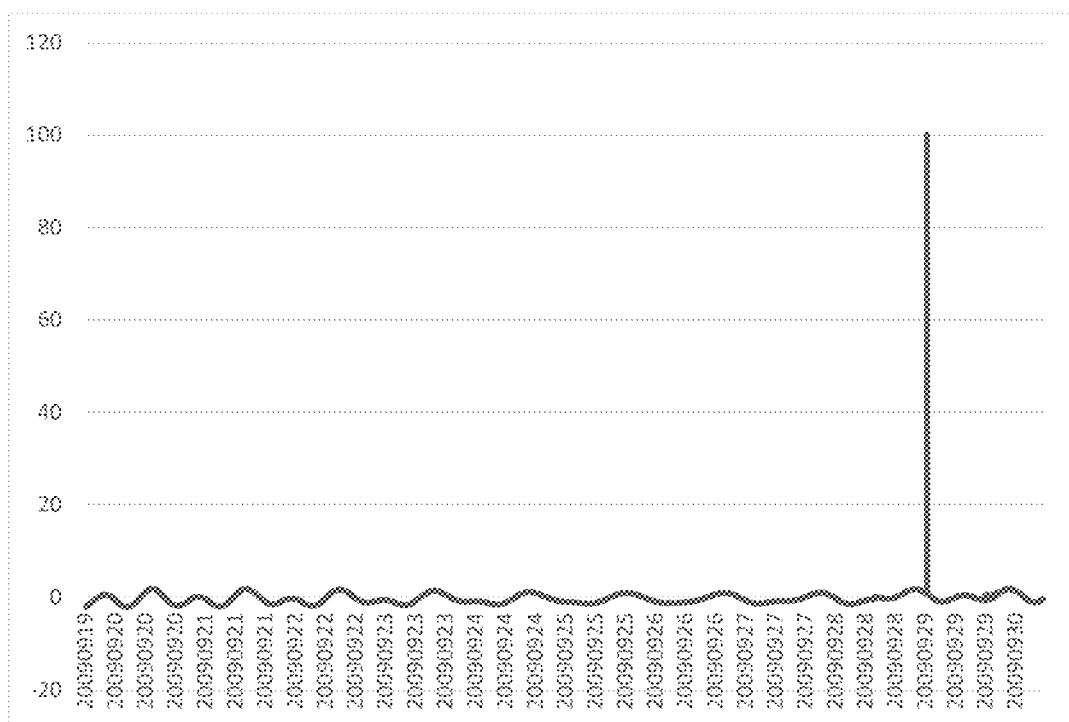
FIG. 35 shows gravity jump at a tracking station in Japan, Kamioka Station (09.2009)
Figure 36:
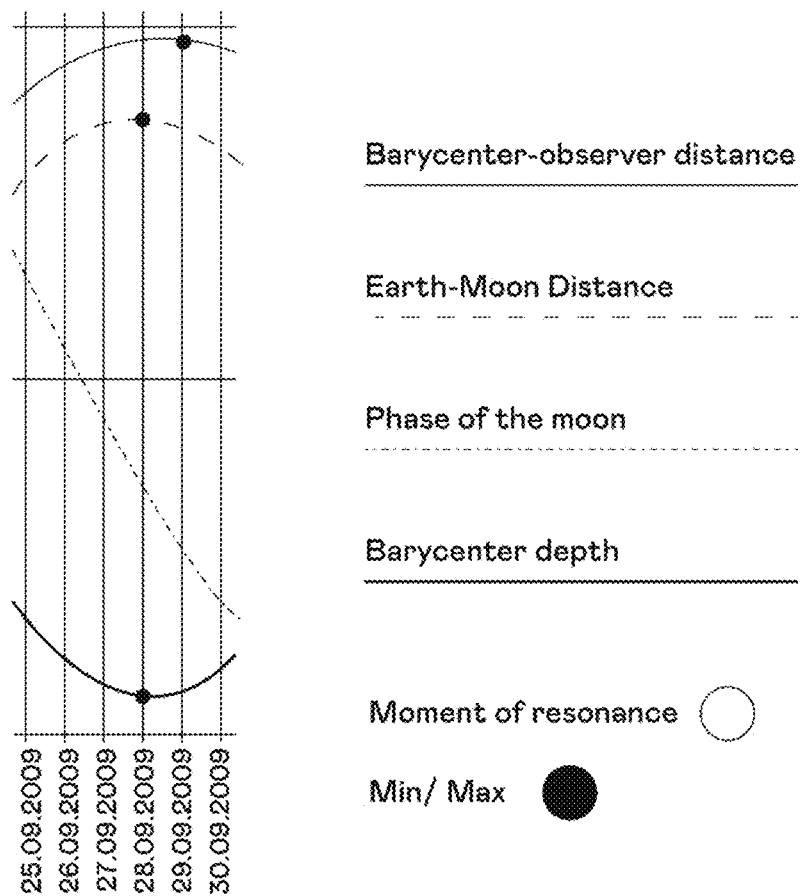
FIG. 36 shows the reasons for the gravitational jump at a tracking station in Japan, Kamioka Station. A typical "tug of war" between different centers of energons. EMD at maximum, BD at minimum. "Battle" of two centers of absorption of energons (the Moon and the Earth-Moon barycenter FIG. 37. Shows the gravity jump at a tracking station in Vena, December 2006 (48.2493N, 16.3579E)
Figure 37:
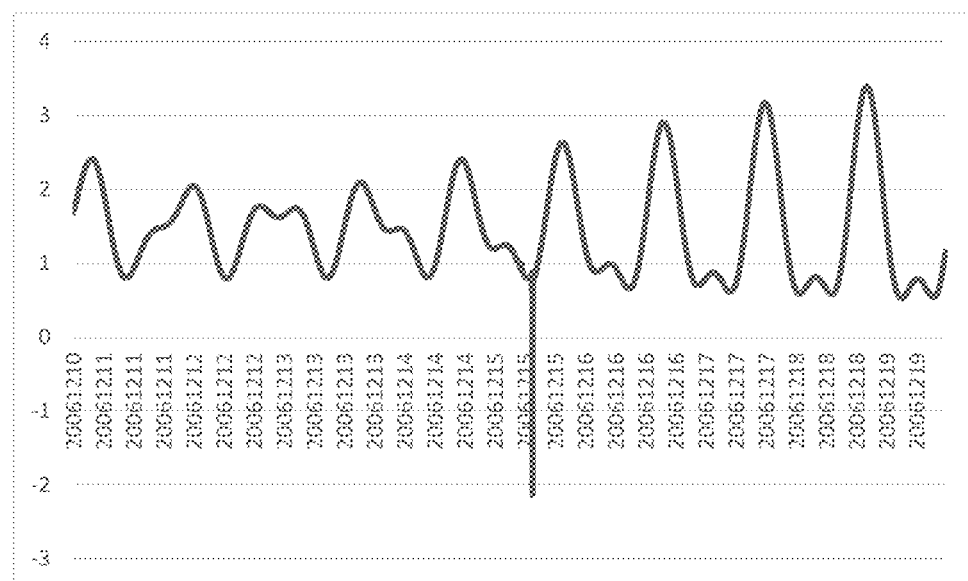
Figure 38:
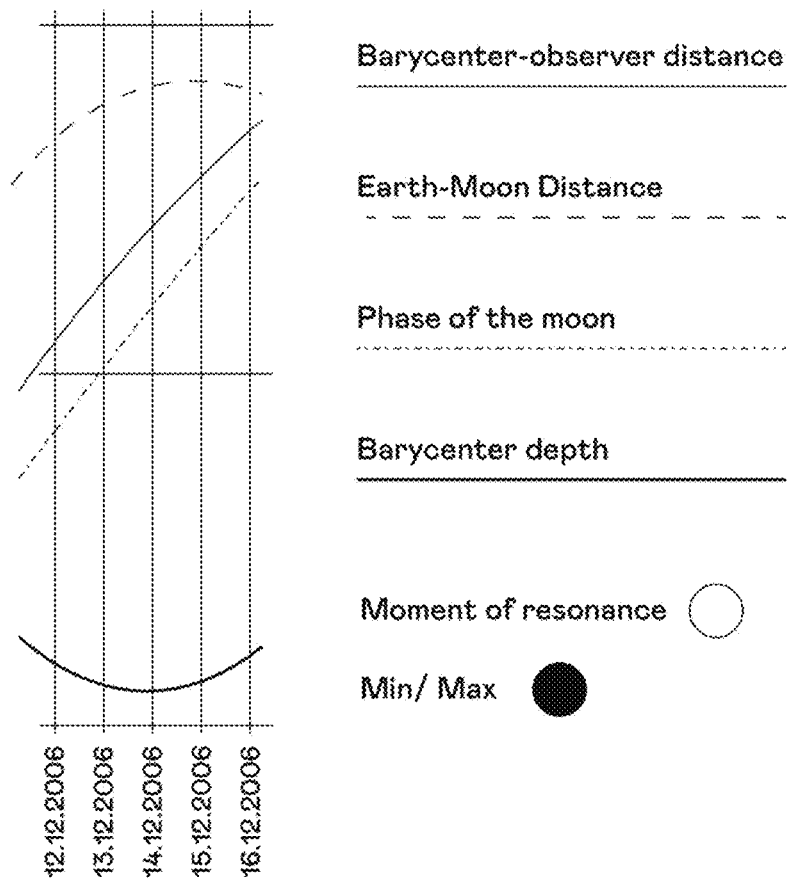
FIG. 38 shows the reasons for the gravitational jump at a tracking station in Vena (December 2006)
Figure 39:
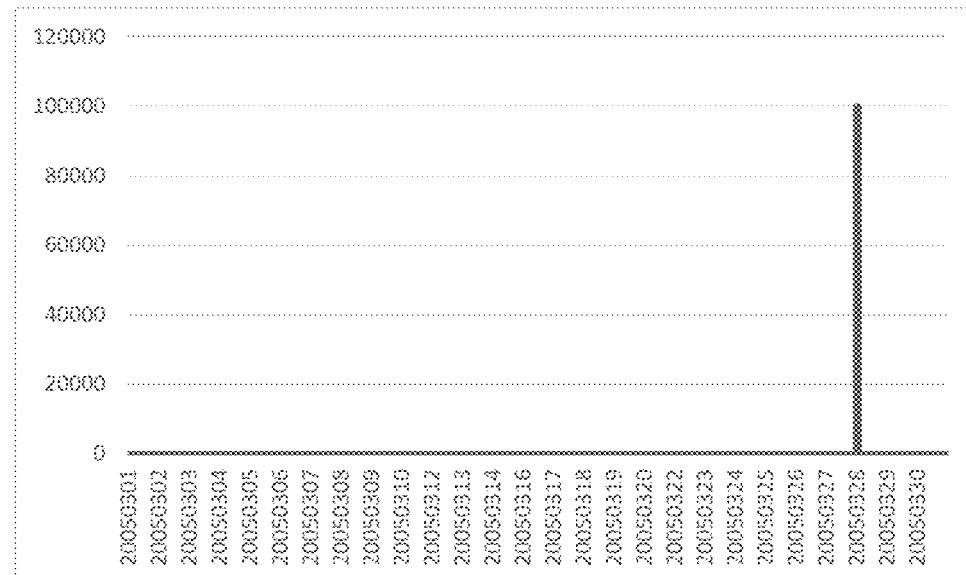
FIG. 39 shows the gravity jump at a tracking station in Vena (March 2005)
Figure 40:
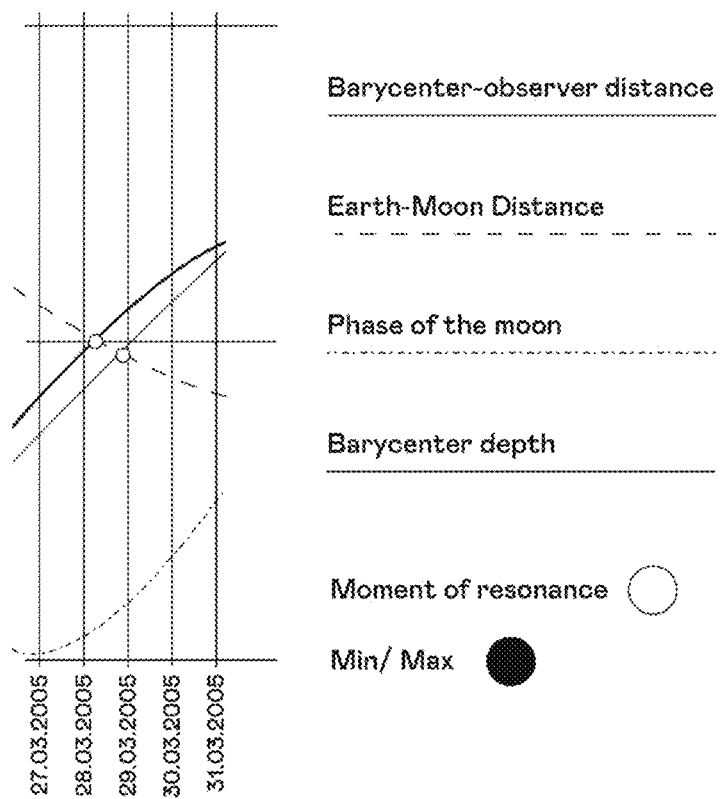
FIG. 40 shows the reasons for the gravitational jump at a tracking station in Vena (March 2005)
Figure 41:
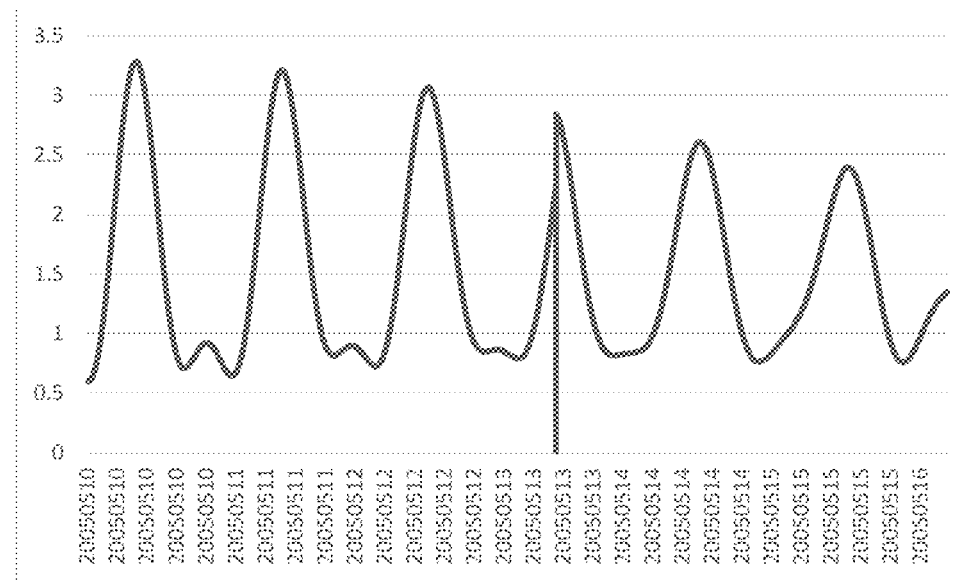
FIG. 41 shows the gravity jump at a tracking station in Vena (May, 2005)
Figure 42:
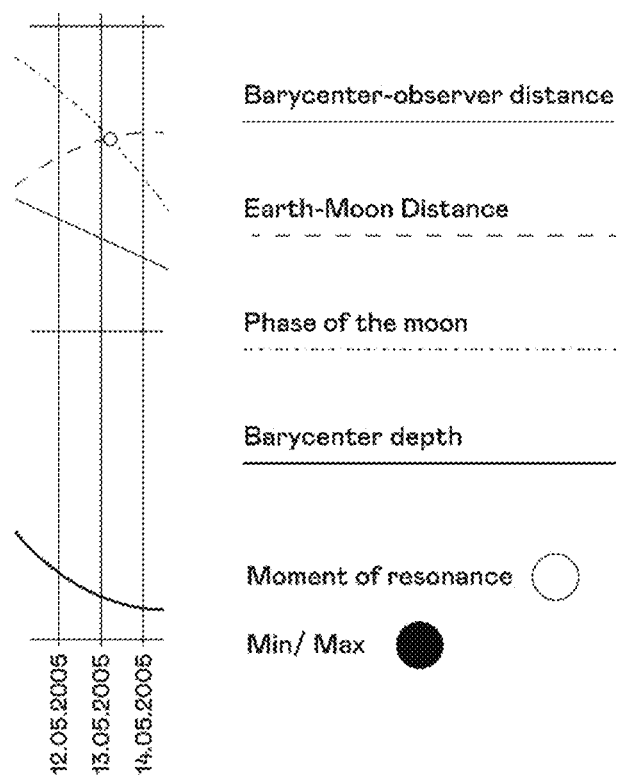
FIG. 42 shows the reasons for the gravitational jump at a tracking station in Vena (May, 2005)
Figure 43:
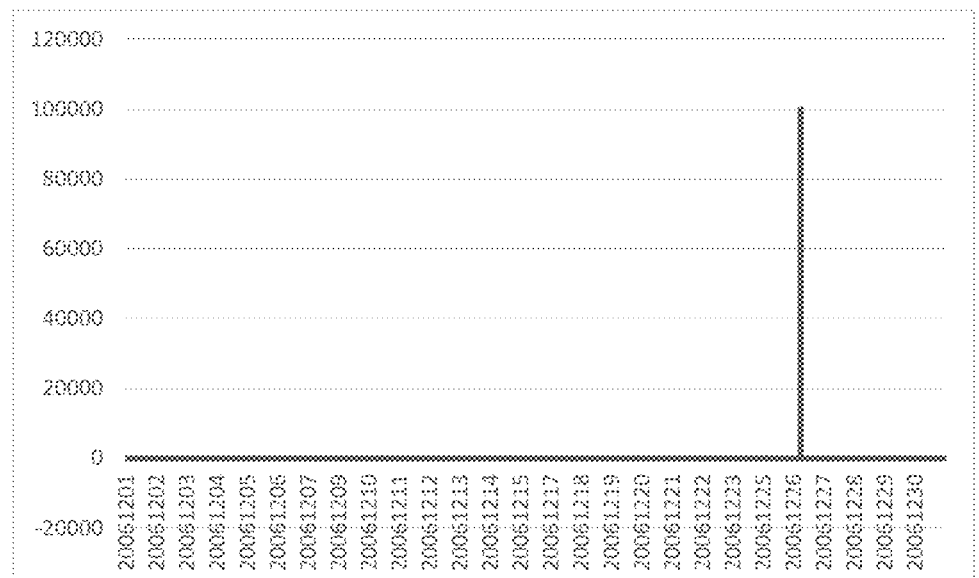
FIG. 43 shows the gravity jump at a tracking station in Vena (December 2006)
Figure 44:
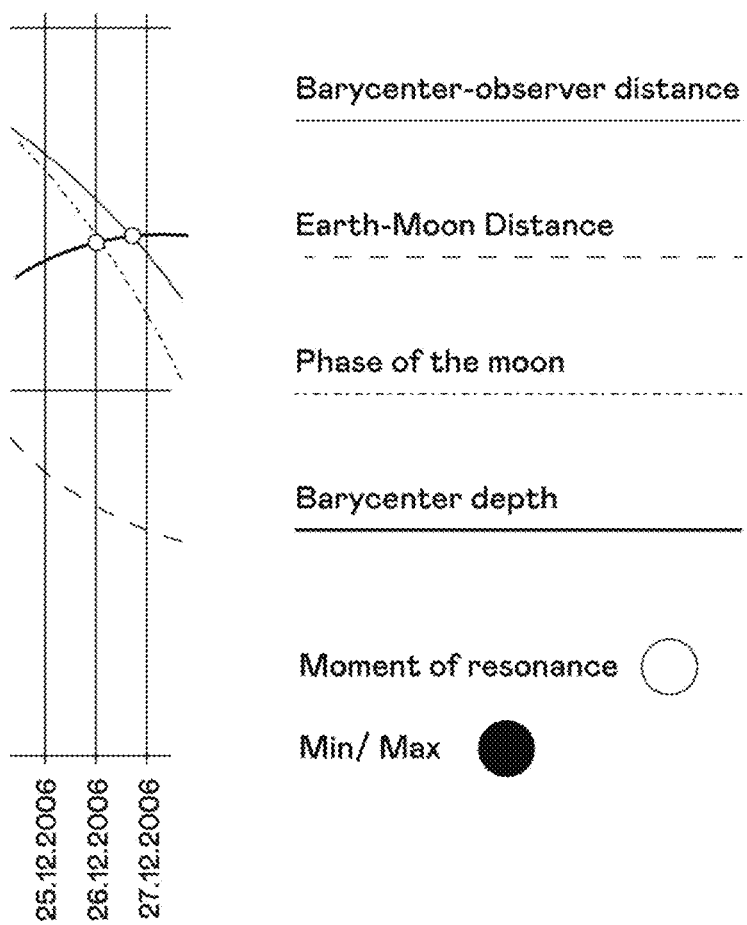
FIG. 44 shows the reasons for the gravitational jump at a tracking station in Vena (December 2006)
Figure 45:
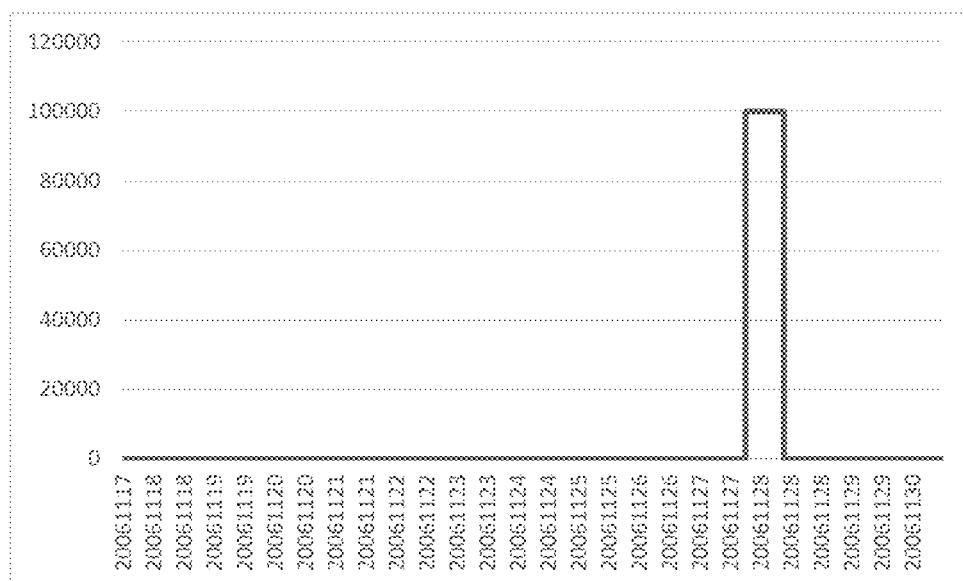
FIG. 45 shows the gravity jump at a tracking station in Vena (November 2006)
Figure 46:
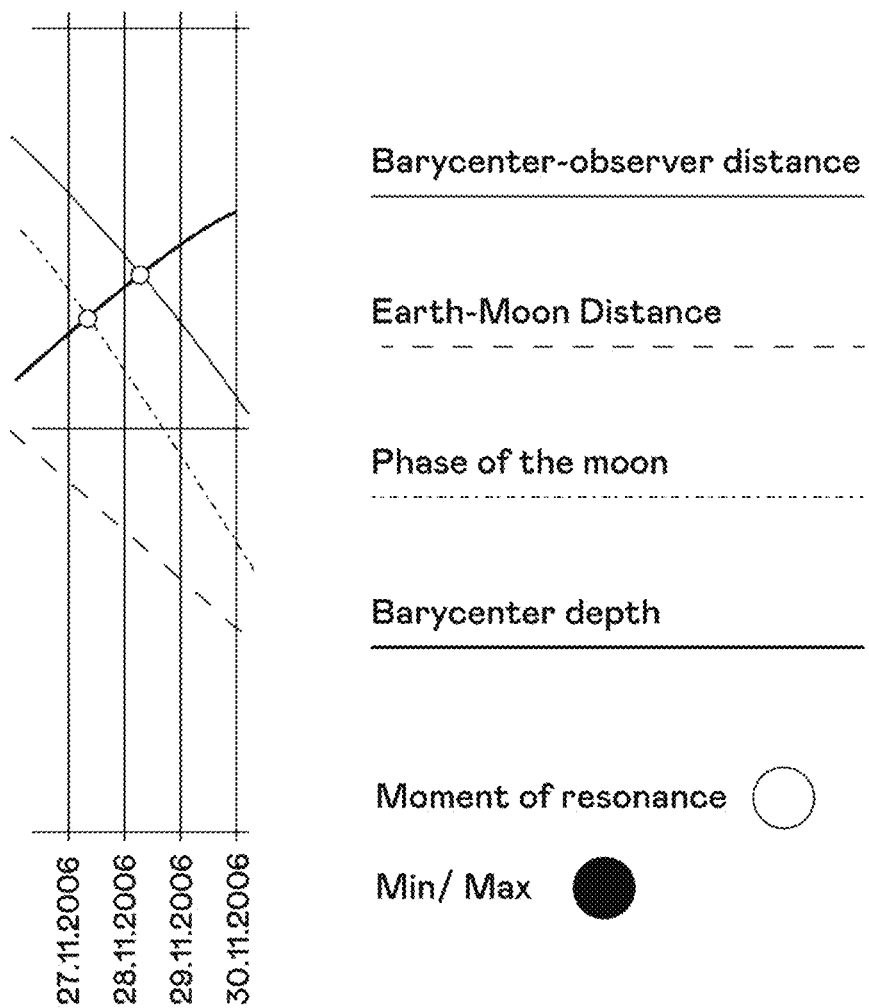
FIG. 46 shows the reasons for the gravitational jump at a tracking station in Vena (November 2006)
Figure 47:
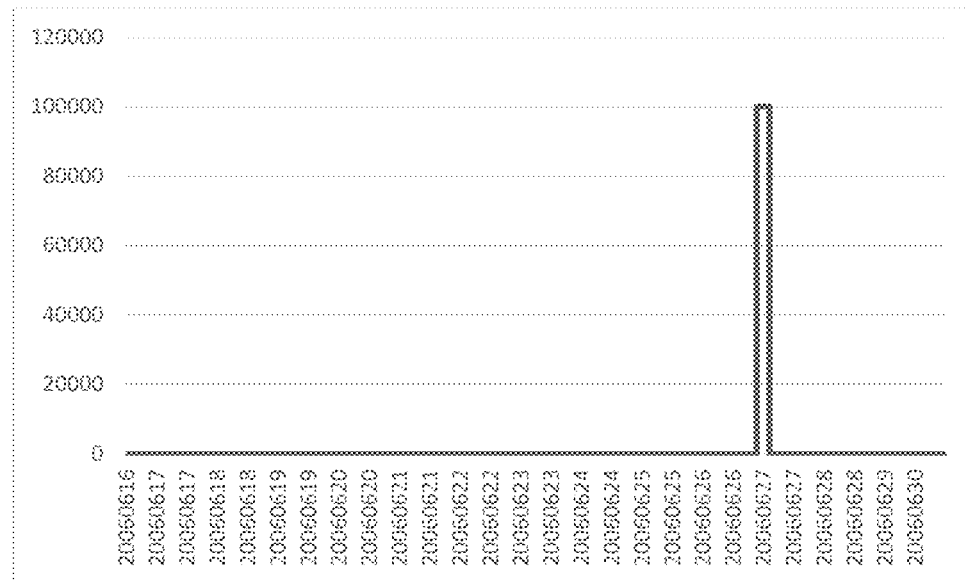
FIG. 47 shows the gravity jump at a tracking station in Vena (June 2006)
Figure 48:
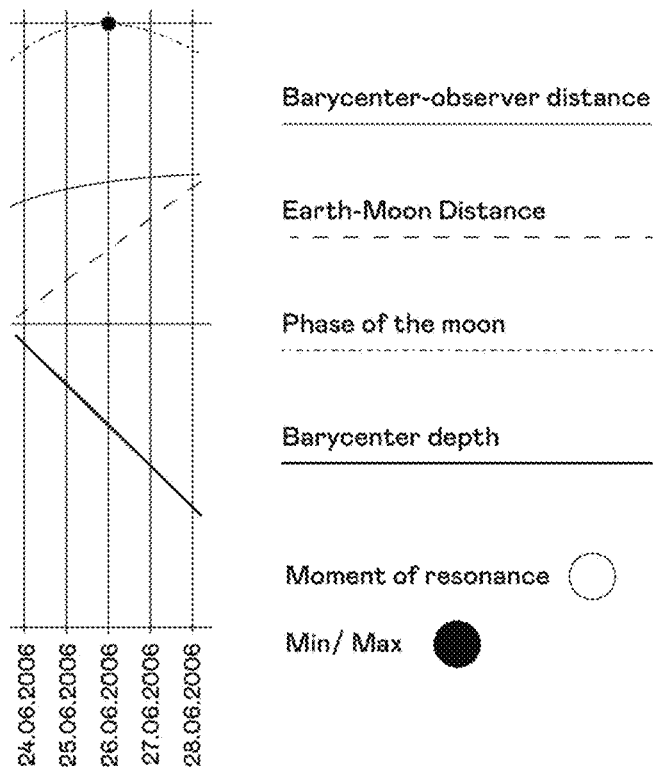
FIG. 48 shows the reasons for the gravitational jump at a tracking station in Vena (June 2006)
Figure 49:
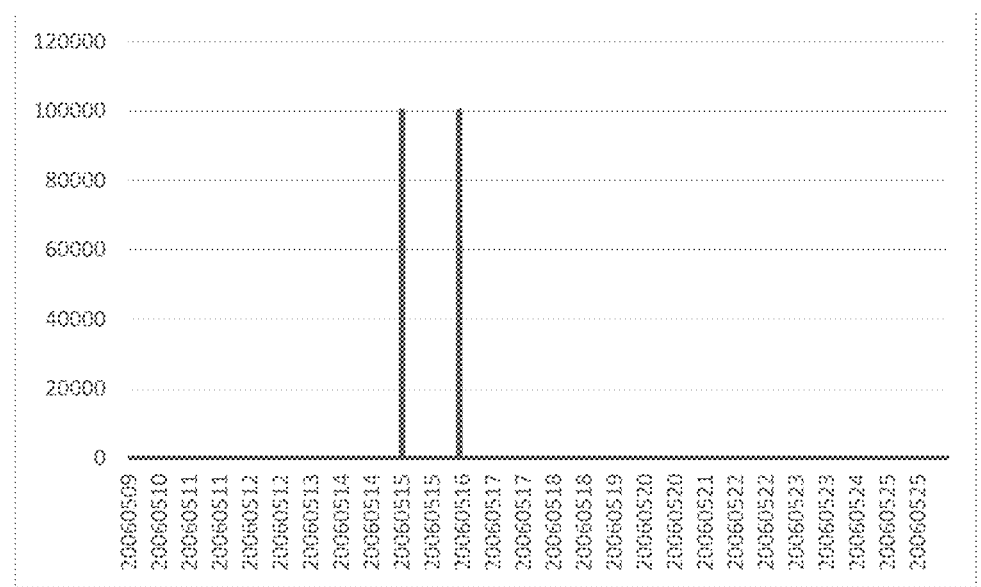
FIG. 49 shows the gravity jump at a tracking station in Vena (May 2006)
Figure 50:
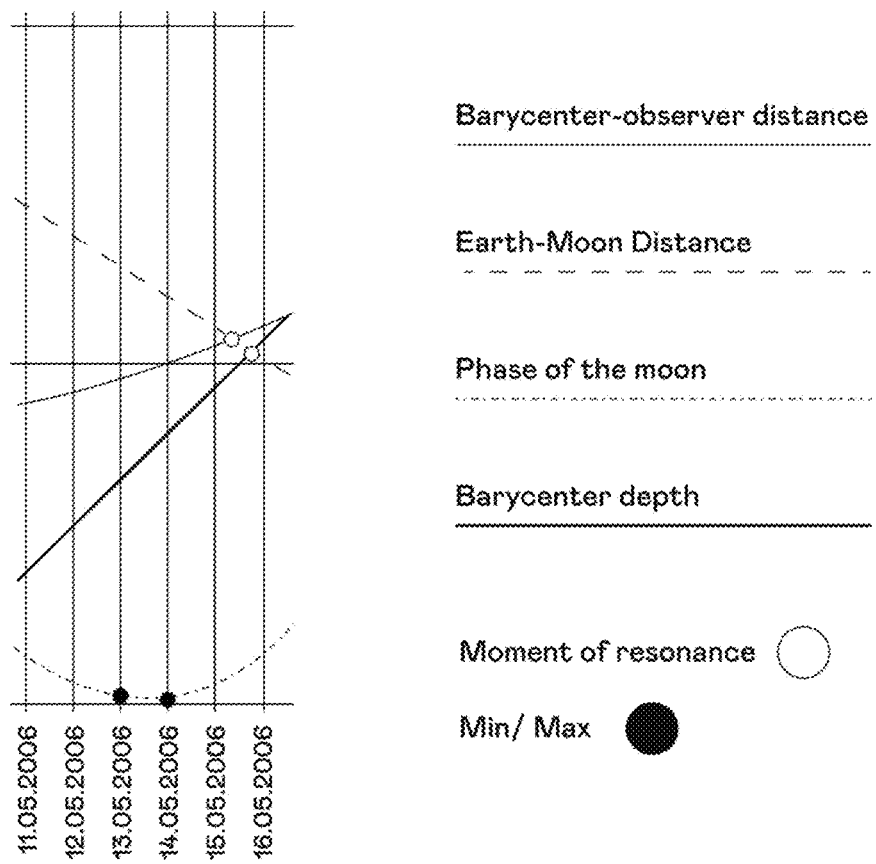
FIG. 50 shows the reasons for the gravitational jump at a tracking station in Vena (May 2006)
Figure 51:
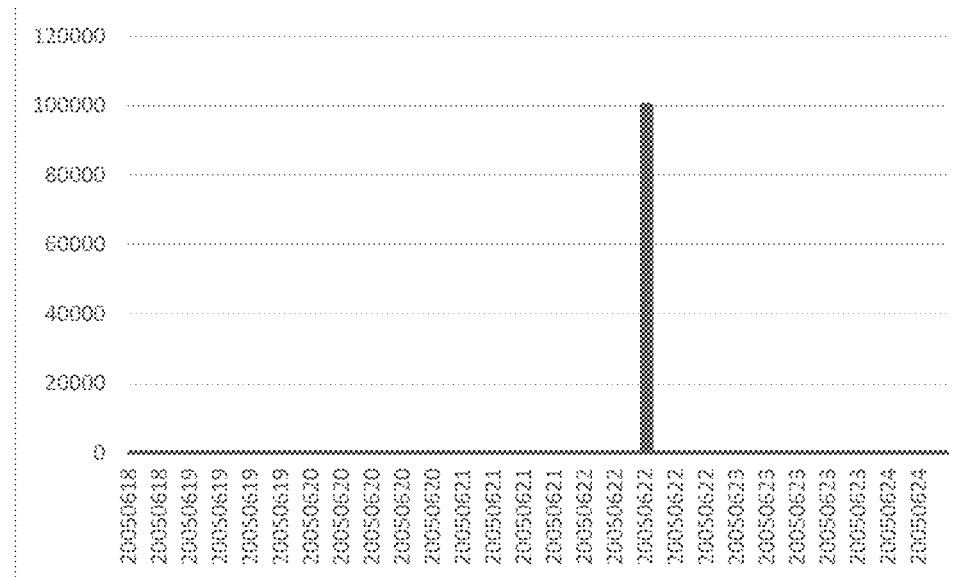
FIG. 51 shows the gravity jump at a tracking station in Vena (June 2005)
Figure 52:
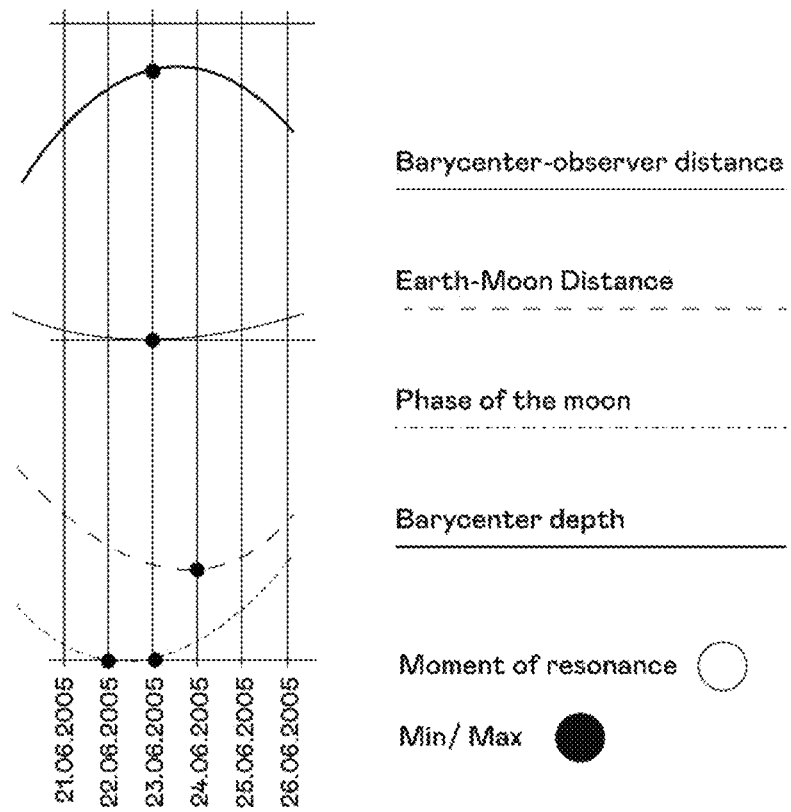
FIG. 52 shows the reasons for the gravitational jump at a tracking station in Vena (June 2005)
Figure 53:
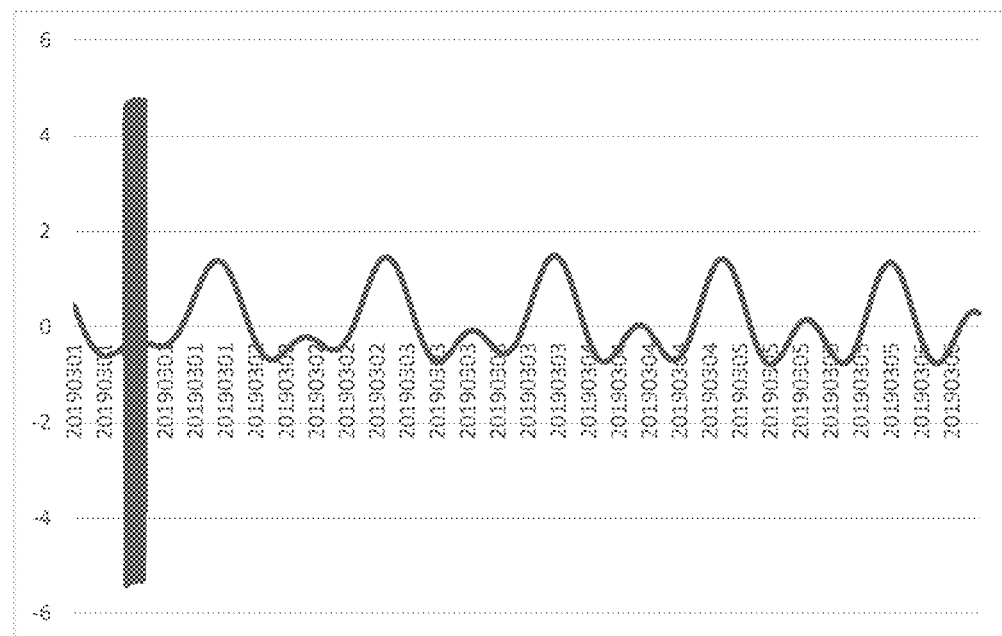
FIG. 53 shows the gravity jump at the IGETS tracking station in Germany (Zugspitze, N, Latitude (deg): 47.4207; E, Longitude (deg): 10.9847) in March 2019.
Figure 54:
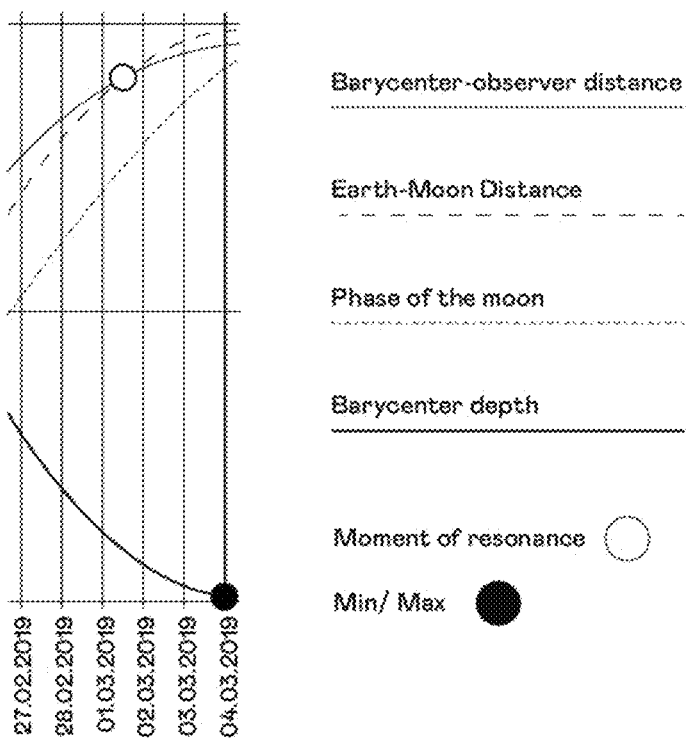
FIG. 54 shows the reasons for the gravitational jump in Germany in March 2019 (gravitational resonance on March 1)
Figure 55:
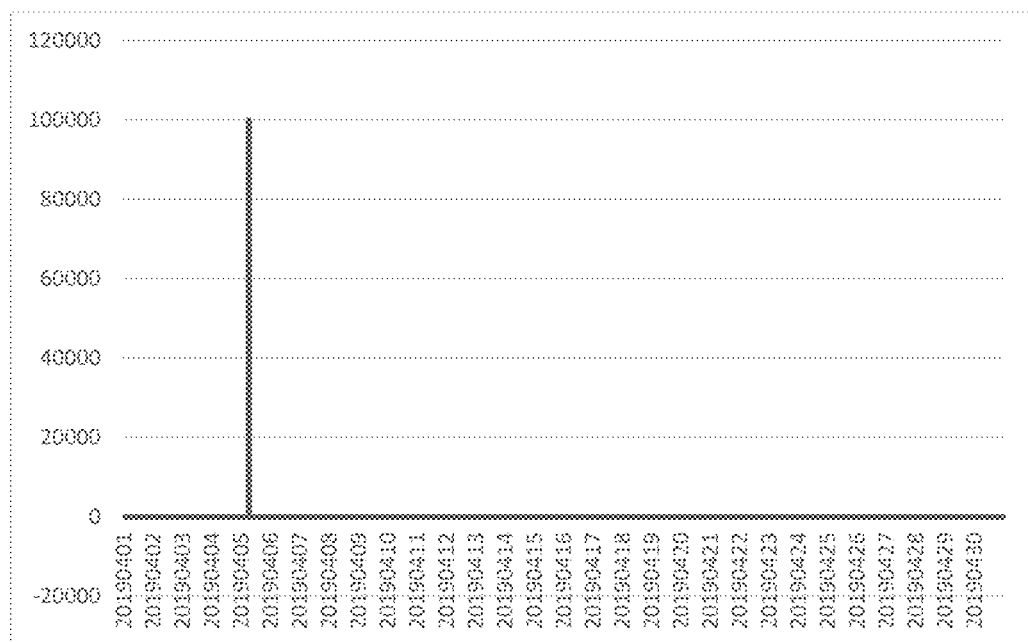
FIG. 55 shows the gravity jump at the IGETS tracking station in Germany in April 2019.
Figure 56:
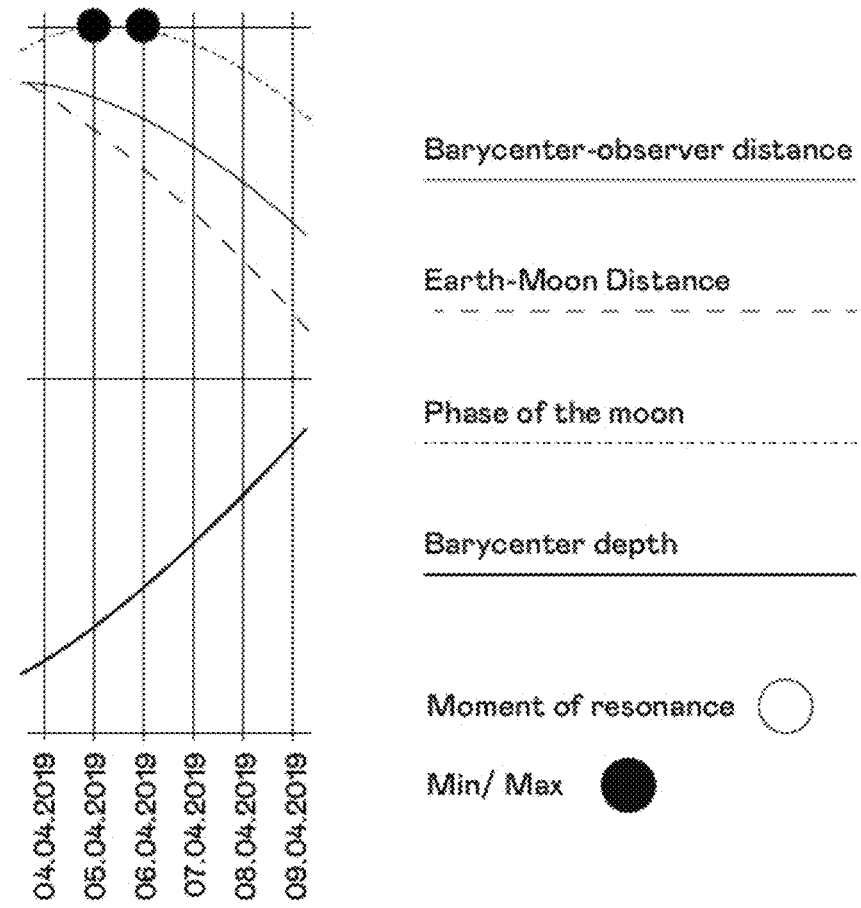
FIG. 56 shows the reasons for the gravitational jump in Germany in April 2019 (BOD at maximum)
Figure 57:
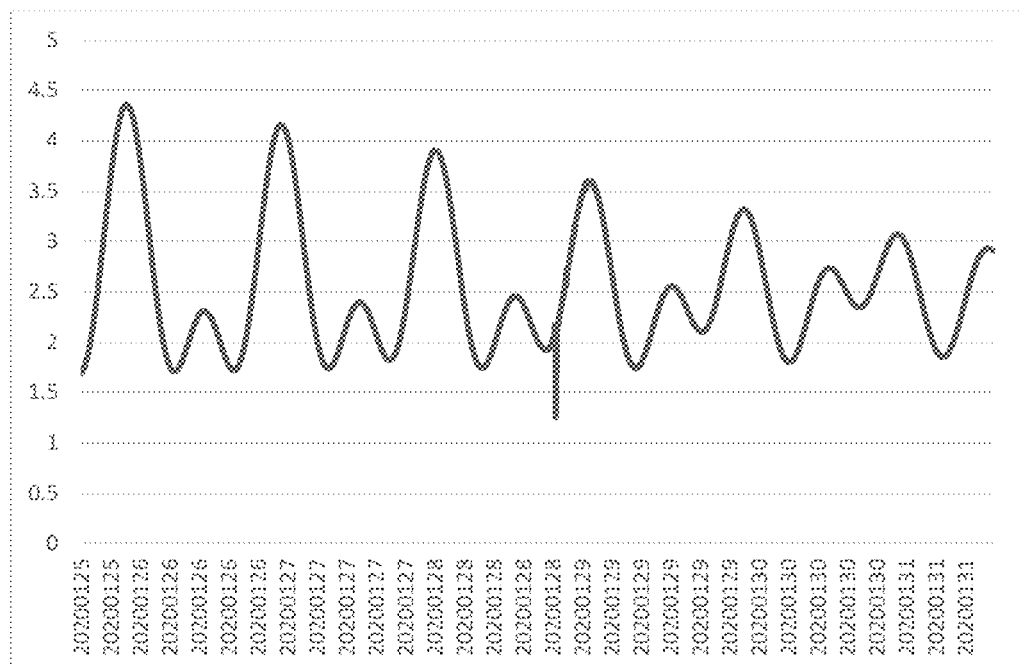
FIG. 57 shows the gravity jump at the IGETS tracking station in Germany in January 2020.
Figure 58:
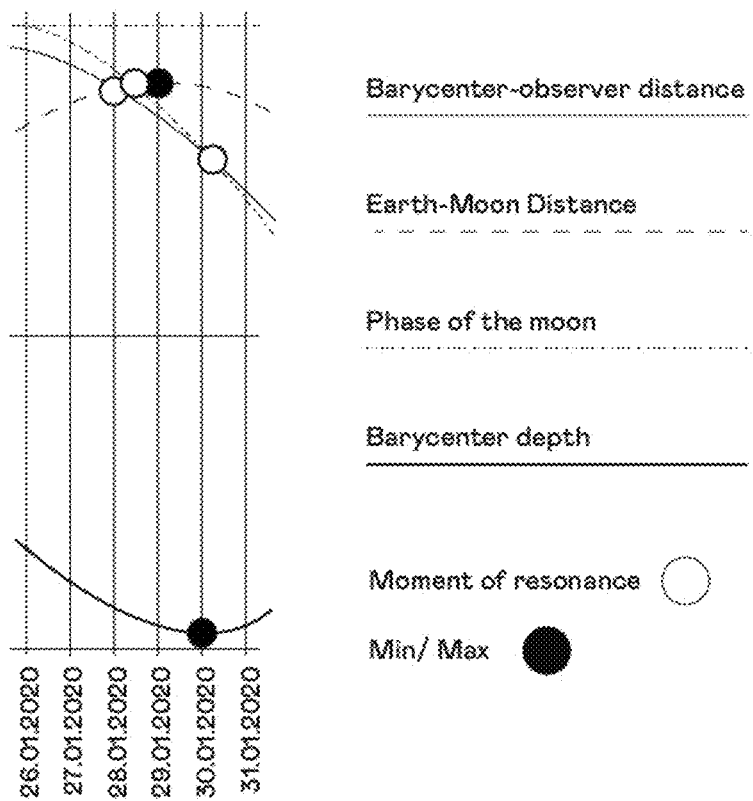
FIG. 58 shows the reasons for the gravitational jump in January 2020.
Figure 59:
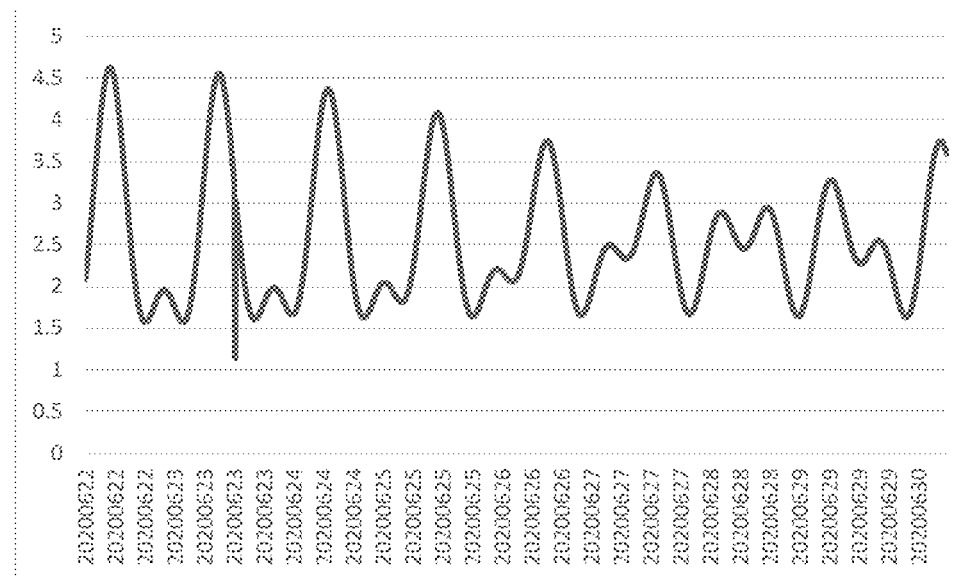
FIG. 59 shows the gravity jump at the IGETS tracking station in Germany in June 2020.
Figure 60:
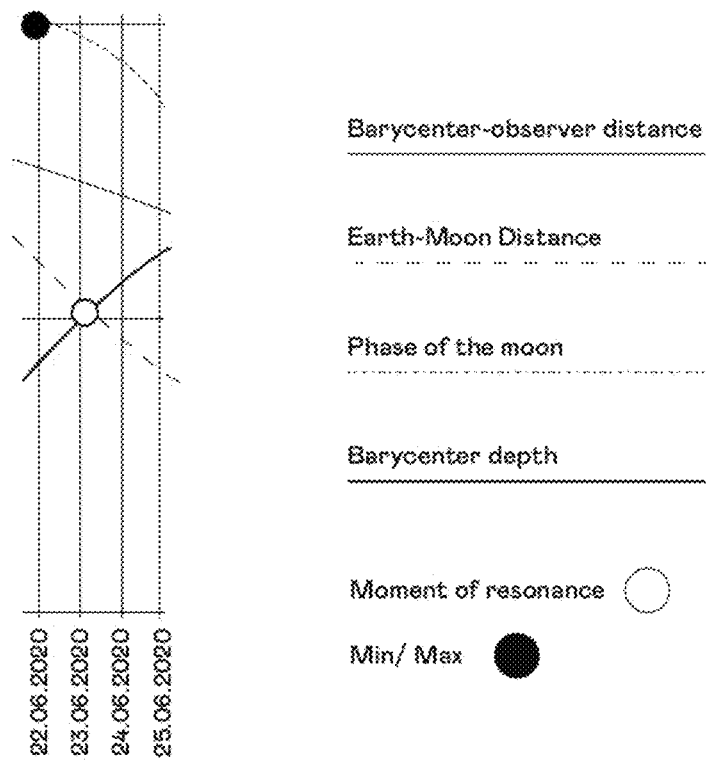
FIG. 60 shows the reasons for the gravitational jump in Germany in June 2020.
Figure 61:
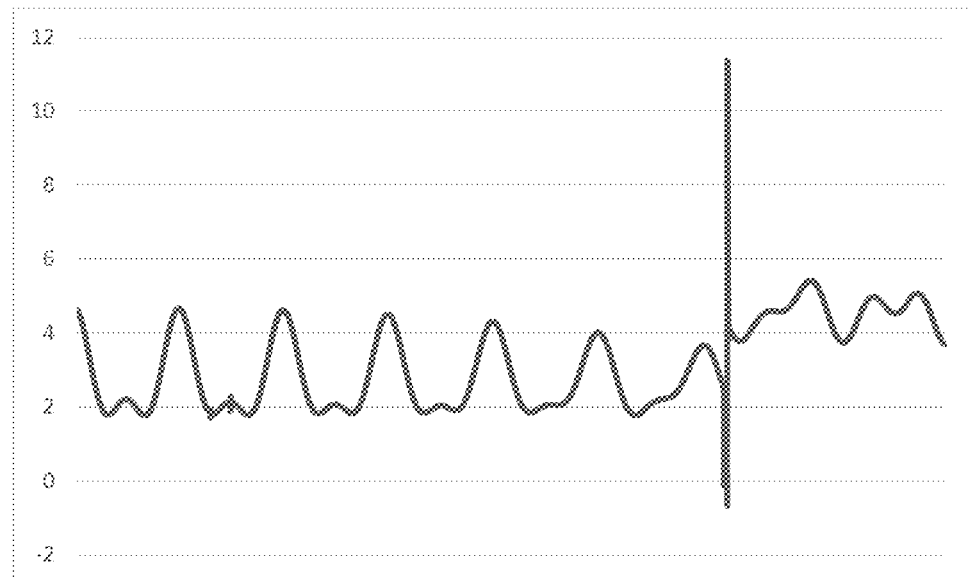
FIG. 61 shows the gravity jump at the IGETS tracking station in Germany in December 2020.
Figure 62:
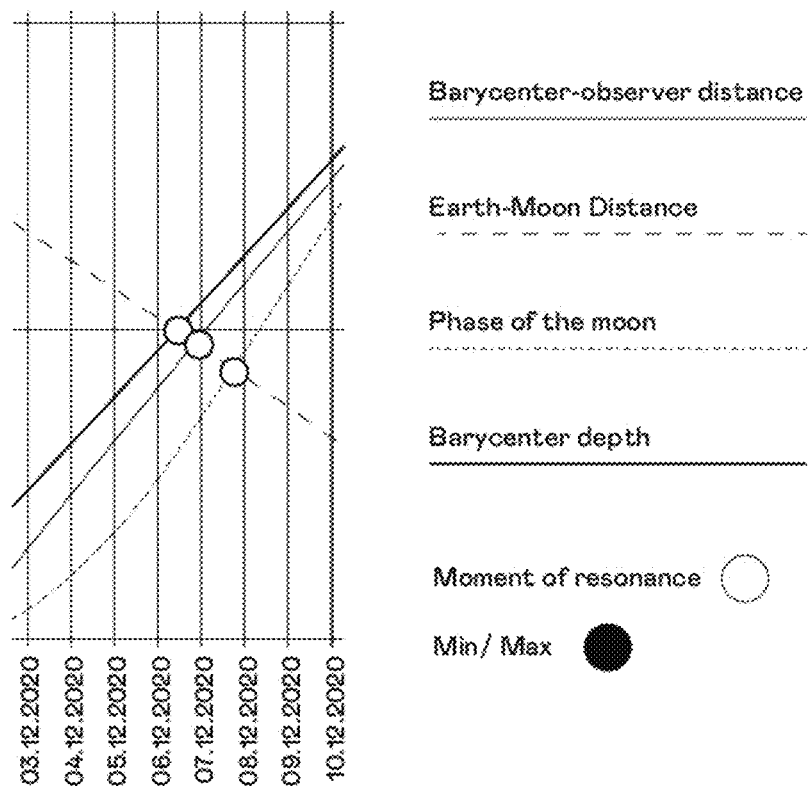
FIG. 62 shows the reasons for the gravitational jump in Germany in December 2020.

And now look at their causes—the resonances of gravitational tides (FIG. 18-20).

Dynamics of the angular velocity of the Earth (and other planets) around the Sun, the Sun around the Galactic core, our entire galaxy around the center of galaxies are all evidence of the existence of tension at the level of gravitational potentials in the Kukharev regions consisting of gravitons.

The Sun moves at a speed of about 220-250 kilometers per second around the center of the Galaxy and makes a complete revolution around its center, according to various estimates, in 220-250 million years. Kukharev regions—responsible for the existence of the transfer of a "portion" of sometimes positive and sometimes negative angular momentum through the surface layer of the atmosphere, which leads to long-period irregularity of the Earth's rotation. Similarly for the movement of the Sun, Galaxy, and so on. Planets move from one gravitational resonance to another, just as cyclones move from one Kukharev region to another. That is, planets (with stars) at the level of gravitons form distortions of the Kukharev region and this "keeps" the planets in "their" places in orbits.

An abstract remark. When radically prolonging a person's life, it must be borne in mind that entropy slows down all biological processes to a standstill. That is, entropy performs the function of inertia brake. As the energy level decreases, entropy increases. Physically, this follows from the fact that as the volume increases, the energy of the process that arose in the original volume inevitably dissipates. It is known that the Sun not only generates photons, but also various types of electro-magnetic fields. The nature of electromagnetic fields is known-the interaction and interconversion of magnetic and electric fields. At the same time, it does not matter what the magnet or conductor is moving—as a result, an electric current arises/that is, the movement of electrons in the conductor. A necessary condition for the occurrence of an electric current (more precisely, an electromagnetic field—is the movement of a magnet relative to a conductor or a conductor relative to a magnet. But what about the Sun then? Rather, with any star—emitter of electromagnetic fields. After all, it is known that the Sun, unlike planets, has many magnetic advantages, which nevertheless generate electromagnetic fields/radiation/in a wide frequency range when interacting with plasma. Thus, the Sun (and all the stars) is a kind of complex generator of electromagnetic fields/a kind of symbiosis of many familiar technologies for exciting electromagnetic waves. And first of all, the stars should be generators of time energons (copyright Vadim Kukharev 2016). Based on this, dark matter (Kukharev's energons) is at rest, because it has reached the maximum of inertia in its development/Entropy/and stopped/or rather practically stopped its development and interaction with ordinary matter, except for the gravitational interaction/. At the same time, Einstein's postulation about the speed of light as the speed limit applies only to matter (and Kukharev's energons are particles of "pure" energy). In the early stages of stars and galaxies, they behave like active wave particles, then they lose the ability to emit energy (dark matter stage), but having mass inhibit the development of the material part of the Universe/However, the energy potential of dark matter 10 billion years after the Big Bang is close to exhaustion. The entropy of the Real Universe-Dark Matter system tends to a minimum (and not to a maximum in the heat death model).

The main (strongest) gravitational factors for various systems of three bodies are presented in the table.

In addition to them, there are also "weak" gravitational factors, such as, for example, daily and half-day fluctuations, but statistically they are less significant than the main ones listed. When graphically calculating the moments of resonances, of course, it is necessary to normalize the scale of the graph.

TABLE 4

|  | The system of three bodies "Sun-Earth-Moon" | The system of three bodies "The Core of the Galaxy is the Sun-Earth" | The three-body system "The center of the local supercluster - The Core of the Galaxy - the Sun" |
|---|---|---|---|
| The main gravitational factors | Moon Phase (for Earth) | Earth Phase (for Sun) | Sun Phase (for The Center of the Galaxy) |
|  | Earth-Moon Distance | Sun-Earth Distance | Distance The Center of the Galaxy is the Sun |
|  | The distance from the observer on Earth to the Earth-Moon barycenter | Distance from the observer on the Sun to the Earth-Sun barycenter | Distance from the observer at the center of the galaxy to the barycenter "Sun - Center of our Galaxy" |
|  | Depth of the Earth-Moon barycenter | Depth of the Sun-Earth barycenter | Depth of the Galactic Center-Sun barycenter |

The Kukharev regions of gravitons are energetically more "profitable" points where planets/stars tend to go. Points of change of the gravitational potential. The movement of large masses in orbits at the same time resembles the movement of hurricanes \ tornadoes \ Jupiter's big spot (which was explained above). Hence one of the consequences—Milankovich cycles are also caused by the formation of Kukharev regions from gravitons. The Tropic of Cancer and the Tropic of Capricorn on Earth are defined as the latitude at which the Sun is directly overhead at noon on the days of the summer and winter solstices, respectively. But the angle of this tilt changes from about 22° to 24.5° over 41,000 years-in other words, the angle of the earth's axis changes over millennia. In fact, the belt of deserts on Earth (which just lies in the Tropics of Cancer and Capricorn) is formed by just a higher frequency of resonances of gravitational tides in these places (and the frequency of resonances is associated with the location of the Earth-Moon barycenter according to the above histogram). Another Milankovich cycle involves the shape of the Earth's orbit, which changes from elliptical to more circular and back ("Eccentricity") over longer complex periods of 95, 125 and 400 thousand years. The third Milankovich cycle involves the oscillation of the orbital axis and the movement of the orbital plane itself-sometimes the Sun is closest to the Earth during the summer solstice, but now it is closest during the winter solstice (perihelion). These periodic movements (known as "Precession") have a complex periodicity of about 19-24, 000 years. All these cycles are caused by the formation of different Kukharev regions, which are points of "attraction".

Energon-time bosons (Kukharev time bosons, energy-time bosons) and Kukharev regions of gravitons. Evidence of their existence and related technologies.

The following are brief practical proofs of the existence of Kukharev time bosons and Kukharev regions from gravitons. The theoretical description of the Kukharev time bosons was given back in 2016 (the copyright was posted in the Library of Congress of the USA). The existence of these physical phenomena implies the possibility of the existence of a number of technologies, which are also described below.

The text given below, among other things, translates Einstein's general theory of relativity to the quantum field level.

The Kukharev region of gravitons is a local intensity/fluctuations of the gravitational field that occurs at moments of gravitational resonance due to the resonance of waves from gravitons from several sources. The consequence of this is, for example, flyby anomaly. Further, a number of examples are provided to show the facts of such oscillations at the level of the planet Earth and their interpretation (just as the above comparison of gravitational resonances with Schumann waves in the Kukharev regions of charged particles in the stratopause and in the atmosphere/space as a whole is given above).

Prerequisites for the introduction of new particles and fields into physics:
  the facts of experiments on quantum entanglement refute the theory of relativity (the transfer of information between entangled particles occurs much faster than the speed of light, this has been confirmed many times);
  a significant mass in the universe is invisible (dark matter, invisible particles), which until now has not been explained;
  electrons and photons in all theoretical physics "conditionally" are both a wave and a particle (classical experiment about interference, double-slit experiment), but it is more logical to assume that a photon is only a particle, while "waves" from other particles/fields act on it (and in the double-slit experiment, a de facto addition of two forces is observed). The same applies to other elementary particles, which are "both particle and wave";
  Known black holes are at room temperature, which is extremely low given their enormous mass and energy
  the interference of gravitational waves at the moments of gravitational resonance creates "Kukharev's regions" (this is already a proven fact, description in another patent), which forces us to look in more detail at the interaction of gravity and pure energy, the very essence of understanding gravity.

Quantum entanglement is a situation when particles are on the same "wave" of energons. Like two walkie-talkies on the same radio frequency. This just shows the connection of Kukharev's energons (relatively speaking, pure energy) with the material world.

The concepts of "energon", "graviton" and "mass" are quite conditional. In general, it is easier to consider all these different forms of energy.

A possible description of entropy is simply the density of an elastic energy-boson field. Or you can say this field itself. Imagine an energy-bosonic field in the form of seawater, with its properties such as compressibility and gravitational turbulence, which is based on the concept of seawater density. The energy-boson field equalizes the parameters in a closed system, since it is more energetically advantageous for the substance to align (diffusion process). Allegorically, this process is identical to the process of changing the spins of electrons in a magnetic field.

When calculating gravitational resonances, it is important to remember about calculating the order/degree of coincidence of the phases of motion of gravitational factors. Plus, we must remember that when two tides are in opposite phase, they extinguish each other, and if the phases coincide, then this is a super tide. Plus, it should be understood, for example, that the Kukharev region in the stratopause can have two sources of energy—1) the resonance of macrofluids of their air molecules and charged particles (from which Schumann waves arise) under the influence of gravitational tides 2) resonance at the "lower" level of gravitons and energons.

General Theoretical Part.

Dark matter is energons at rest (up to light and zero speeds). Dark energy is energons in the superluminal state (one can also imagine/imagine dark energy simply as a kind of interaction between energons at rest). In those places of the studied galaxies where there is a cluster of objects with a large mass, there are a large number of small clusters of dark matter (absorbed sublight energons).

In the presence of a real mass, the energons slow down and coagulate around it, this attracts even more energons, thus strengthening the force of gravity near the mass.

Electrons (and other elementary particles), particles that fly through the waves of the ocean energokom, hence the two slit experiment (when an electron and a particle and a wave).

One and the same object (with the same atomic structure) in different gravitational fields (for example, on Earth and on Jupiter) affects different number energokom, so the object weighs differently.

Energons at rest can be bound to mass, real objects. The attractive and repulsive behavior of energons depends on their local density. The mass of the energons can be negative.

Usually spatial symmetry is called the letter P, symmetry with respect to time reflection is called the letter T, and symmetry with respect to the replacement of a particle with an antiparticle is called the letter C. There is a CPT theorem that the theory of elementary particles should be invariant with respect to CPT transformations. It is known that strong electromagnetic interactions are invariant with respect to all these transformations separately, while weak interactions are not. This happens precisely because weak interactions work with time energons.

Three formulas may be referenced—the elementary magnitude formula, the Shenon formula, the Boltzmann entropy formula. It's all the same. About the connection of entropy and energy. Any process (biological, physical) is stopped by entropy as a brake.

Einstein imposed a ban on instantaneous long-range action. But this is for the substance. Not for energy. Any ordinary particle in the physical sense has mass and cannot have a speed greater than light. Quantum entanglement is the transmission of a signal precisely by the time energons (dark energy).

Planets are energy clusters that absorb energons. Stars (and black holes) are generators of energons (what we call dark energy). We do not consider the question of what is a real mass here (although it is probably easiest to consider a ring-closed (rotating) Energon as an elementary source of independent mass.

The problem of two bodies is reduced to flows (streams) of energons and absorption of energons. Every body is looking for a more energetically advantageous position. Any object (mass, clot of energy) tends to a more energetically advantageous location. The barycenter is a node of the flow of energons.

The equivalence of gravitational and inert masses at high speeds is the equivalence of the constant passage of particles of matter through the flow of energons. Or, if you like, the same density of energons per unit mass.

In February 1960, the director of the Paris Observatory, A. Danjon, noticed a fact —after registering a bright flash on the Sun, a slowdown in the rotation of the Earth by 0.85 milliseconds per day was recorded. This can be interpreted as the participation of energons in the moment of rotation of the Earth.

At the end of January and July, the Earth rotates faster (the day is shorter by 0.001 s), and in April and November—slower. The January cycle is shorter than the July one. Such seasonal accelerations and decelerations of the Earth's rotation speed are associated with flows of energons, gravitons and resonances associated with the barycenter of our galaxy.

The correct question is: why can't light (photons) fly away from a black hole? Answer: because it is energetically more profitable to stay there.

At the beginning of its formation, the Earth rotated around its axis much faster—the day lasted about 6 hours. 530 million years ago, a day on Earth lasted 21 hours, and 400 million years ago, a day lasted 21 hours and 30 minutes. 200 million years ago, the day was already close to our time 23 hours. And the older the Earth gets, the longer the day becomes—every 100 years it slows down its rotation around its own axis—by about 46 seconds. The slowing down of the Earth's rotation is probably due to a gradual decrease in the amount of energons that the Sun generates. The sun loses about 179 trillion tons of its mass annually.

On the issue of the emergence of the Earth's magnetic field. The proposed picture of the world is as follows. Shortly after the birth of the Earth, the flows of energons from the Sun and the barycenter of our Galaxy caused it to rotate, the mantle and other layers also began to rotate like a dynamo and a magnetic field arose.

Time energons can be used as a working fluid for engines. You can push off from them in the same way as ships push off from water, and planes from air. The easiest way to start (taking into account the current level of technology) is with pulsed magnetrons or their analogues. The impulse is needed as much as possible, and the frequency is also needed to "stir up" the energons (identical to how air is pumped into a turbojet engine).

The absorption flow is generally constant, but the flow of energons and signs of energy benefits from the Sun must constantly move the Earth behind itself, show the direction of movement. Gravity is the process of absorption by the Earth (an energy clot, a denser essence of energons) of "gas" from energons in the surrounding world.

Stars generate exactly dark energy (superluminal energons), which cool down (slow down) unevenly.

Exceeding the speed of light (where quantum entanglement occurs due to energons) should be considered as a "separation" of an object (mass, energy clot) from the energons of time (that is why the classical equations of relativity show zero time).

Theoretical final forecast (based on the existence of Kukharev time energons and the above theory): in the readings of gravimeters on Earth, we should see peaks (jumping up and down) in the growth of gravity on Earth at those moments when:

The moon is at its maximum deviating values (relative to the Earth)

The Earth-Moon barycenter is at its maximum deviating values (relative to the Sun). It is the density of the energy flux from the Sun at these moments that moves (directs) the Earth-Moon barycenter around the Sun. This is a solution to the two-body problem. Imagine a ship that is constantly being told to adjust its course a little bit (at some points in time). And the energons say (show) the ship has more energetically advantageous routes for absorbing streams from the Sun.

You are at the moment of the new moon on the Moon-Sun axis and the energy benefit vector should grow situations related to the position of the mass barycenter (extreme positions of the Earth-Moon barycenter when it moves relative to different stable centers)

The reason for the absorption of the Earth as a fluid energy clot is the mutual attraction of the absorbing mass of energons and absorbed energons around the planet earth. The number of absorbed energons is different in different orbits. Due to absorption, every dense body is surrounded by a layer of condensed vapors and gases. The absorption of time energons should not be uniform. From time to time, "trickles" of energons should "break through" at nodal moments of time, when the "energy" benefit of the transfer becomes too obvious. How streams in a narrow place dramatically accelerate the speed.

It is very important from the point of view of understanding the work of time energons to understand that they "work" (from the point of view of the perception of modern devices) primarily at those moments in time when astronomical objects are in "extreme", "marginal" values. For example, when the distance between the earth and the moon is maximum. It is clear that a huge amount of work is still needed here from the fundamental point of view of physics. It is necessary to find out the force lines of graviton flows, how the "nodes" of gravitons in barycenters work, and so on. But it is when (a basic example) conditionally one object "tries" to "fly away" from another (the Moon from the Earth, the Earth from the Sun, the Sun from the Center of the Galaxy, and so on) that the energons "speak" to this object (push, show) that energetically there is a more profitable place to go. And there is a "correction" of the course.

It is important to remember Einstein's principle of equivalence of mass and energy, to translate it into a "pure" form, where the Earth is an energy "clot" that flies across the ocean of energons of different densities and speeds.

There are objective limits to the accuracy of modern gravimeters, "small" adjustments of the earth's orbit associated with resonances and the work of the energons of the galactic center level (which affect the earth), we can simply not track. It is easier to track them at the level of the Sun/solar system by taking the distance to the center of the galaxy as a constant (in resonance graphs, this can be represented as a line parallel to the abscissa axis). Plus, estimates of the distance from the Sun to the center of our galaxy are "floating", there are limits to modern telescopes.

Next, objective open data of gravimeters from the International Geodynamics and Earth Tides Service IGETS for different points of the earth points to the same conclusions. And time after time, you can see evidence of the existence of the Kukharev region from gravitons that create fluctuations in the gravitational field. Pairwise comparisons of gravity jumps and their causes are shown in FIGS. 21-62.

Clear dependencies are visible-evidence of the existence of energons and gravitons:

1. Resonance at the level of gravitons (tides from gravitons). A complete analog of flyby anomaly on the surface of the Earth. Gravity goes down sharply (in more rare cases, it goes up, but the jump itself is fundamental). This is the resonance of tides from gravitons.

2. A sharp change in gravity. The moment of the new moon. The force vector is directed along the Moon-Sun axis and, accordingly, gravimeters only pick it up at points along this axis. It can be interpreted as the general work of energons, or resonance at the level of energons, a super tide from the Moon and the Sun together.

3. A sharp change in gravity. This is the work of the Earth-Moon system of two bodies. It occurs at those moments when the Moon goes to the maximum distance from the Earth. One can imagine the flows of energons passing through the barycenter, which are stretched like ropes at this moment.

4. A sharp change in gravity. These are jumps identical to point 3, only for the Earth-Sun system (or, more correctly, the Sun-Barycenter Earth-Moon). When the energons of the Sun show the Earth-Moon barycenter, it is much more energetically profitable to fly.

For a specific point of the planet with specific GPS coordinates, in this case, not only the new moon itself is important, but also the fact that the Moon is directly "overhead" (the main thing is perpendicular or proximity to it). Because if you are at a certain point and see the new moon, but the Moon is conditionally, for example, 5 degrees above the horizon, then you should understand that the vector of the energon force will be directed "sideways" and, accordingly, local gravimeters (which actually measure gravity locally "perpendicular up") will not notice (or weakly notice) gravity fluctuations. The correlation of the Moon's distance from the earth with gravity jumps shows the "work" of the energons in the two-body problem (there is nothing to resonate there). Moreover, the power of energons (we can eliminate them by gravity jumps) is much stronger than the resonances of tides from gravitons.

In fact, the graviton can be considered in some sense as a weaker flow of energons.

What happens when a person rides a subway train that slows down sharply? A person drifts, he falls, because all the atoms of his body are "attached" to specific energons (and waves from them), the energons continue to "move" further at the same speed, and the person is no longer there. There is a rupture of the analogue of quantum entanglement. Human atoms are rearranged for other energons. Inertia resembles quantum entanglement. Only specific units of a single mass and specific energons are "entangled", linked here We know that the faster you move, the more time slows down for you.

The right question is: what does it mean to move faster? Answer. This means that you are going through more and more energons. What happens to the energy at the same time? The answer is given by the photon. Photons can travel billions of kilometers from distant stars and galaxies before we see them. Why, according to the theory of relativity, for a photon (or a body flying at the speed of light and higher), time stops, and energy goes to infinity? Because in this state (at this speed), the object itself becomes an analogue of energons. And he himself already "works, exists" at the level of the general ocean of energons, where there are currents, levels of different densities, generators (stars, black holes) and receivers (planets, people, real mass).

A very interesting correct question is how the human body absorbs (if it absorbs) energons. After all, the growth of entropy with age stops biological processes. The Periodic table shows us a set of chemical elements that essentially consist of the same atoms. The differences between chemical elements are only in the number of atoms. Similarly, it is likely that at the level of time energons, there may be different stable elements, there may be its own periodic system.

The technology of using gravitational resonances can also be used for inertial separation in different production. The whole point is to organize different fluids at moments of gravitational resonance.

Total: We live in an ocean of time energons, which can have a negative mass. They can have different speeds and different densities at different points in the universe. The movement of planets/stars (real mass) is caused by the "pressure" of bound energons, which "tend" to energetically more favorable locations. Black holes, stars (and maybe even planets in some cases, especially if there is a process of mutual absorption) should act as "generators" of time energons.

In stars and black holes, there is a transformation of real mass into time energons, so the universe is expanding. Planets absorb energons, fly through the ocean of them. It's all about the desire of the energons to occupy an energetically more advantageous place. The "profitability" of a place is determined by the different density of energons. There are many "streams" of different energons in one common ocean. Analogs of "Gulfstreams" can flow through the barycenters of different planetary systems.

Bursts of the gravitational field can in some sense sometimes be considered resonances of extremes, a tug of war. For example, at those moments when the Earth-Moon Distance (EMD) is at its maximum and the depth of the barycenter (BD) is at its minimum, or when the Earth-Moon Distance is at its minimum and the depth of the barycenter is at its maximum. Sometimes one extreme (for example, the minimum Barycenter-observer distance (BOD)) enough by itself to cause a jump in gravity.

There are cases of double resonance at one moment (Kamioka 21\04\2019) when two pairs of flows (EMD-PM, BD-BOD) intersect, which also cause jumps.

It is important not to confuse the resonance of gravitational tides from macrofluids (in the atmosphere, for example, from charged particles and air particles) with the resonance at the level of gravitons \ energons (although they may coincide in time and place). I would also like to note that when the energons "start" working so that our devices see it, depending on their "efforts" sometimes it takes some time (usually no more than a day according to current data) before we see their work in real change. Plus, of course, there are factors (like other "currents") that can "interfere" with the work of energons.

Extremely complex processes begin when the lines of gravitational factors move almost parallel, that is, their phases are approximately equal.

In the future (for supercomputers), it is important to constantly calculate the resultant force of energons (actually, the movement of the planets is almost like a constantly calm movement, therefore)

In some cases, gravitational factors can create flows of energons (upward jumps of gravity) at those times when they are close in phase (the curves are parallel and almost parallel). Or there may be cases when the distance from the observer to the barycenter is maximum simultaneously with the maximum of the Moon phase. The extremes (maxima\minima) of the phases of the Moon are also significant in themselves.

It is also important to constantly remember about the plane of the ecliptic, about the fact that modern gravimeters have technical limitations, about where the actual vector of the energon force will be directed.

There are moments when the maximum phase of the moon (new moon) at the same time you have (for certain points) the minimum depth of the barycenter and then conditionally Moon reduces the flow of absorption emergono for a particular point on the Earth (gravity goes down)

In General, we have in the system Earth-Moon-Sun clearly visible:
  Generator of energons (Sun)
  The moon, as the absorption center of energons
  Earth as a center of absorption of energons
  The Earth-Moon barycenter (inside the Earth) as a center of absorption of energons
  The barycenter of our Galaxy (significant primarily for the Sun), as an energon generator From the point of view of a stationary observer, the constant jumps of gravity are extremely interesting at those times when, relative to the observer, the Earth-Moon barycenter is at its extreme values (minimum or maximum distance). The whole movement of the bodies resembles alternating tug-of-war in different directions. Or you can imagine moving gas flows in the form of rivers that periodically intersect with each other.

The number of resonances will be different for different points of the planet Earth. The vectors (or planes) of the Sun's propagation of energons around itself also play a role. Just like the vectors \planes of the energons that come from neighboring stars, the barycenter of the galaxy.

The emergence of the very concept of the "plane of the ecliptic" is quite interesting. After all, for planets that revolve around the Sun, this actually indicates the locations of more energons.

The graphs of gravitational factors are constructed according to Greenwich Time.

It is more correct to assume that dark matter, dark energy, photon, graviton are all the same thing. These are all different forms of the energon of time, its different speeds and states, flows. Graviton is simply the absorption of energons. Think about how a photon travels billions of light years (due to what).

The light explosions that are visible via some satellites (for example, the Lomonosov satellite) are visible annihilations of antimatter occurring from the natural areas of Kukharev (with the exception of sprites, which the Kukharev areas also create but via a different mechanism, as described herein). Based on the data provided in the parent application, the most active natural Kukharev regions are formed in the stratosphere (about 50 km above the surface) and above 100 km (where temperature anomalies are visible). At the same time, the places of contact of the Earth with the Van Allen radiation belts (especially in summer) contain the largest number of charged particles and, economically speaking, are also preferrable.

After selecting the location for calculating/estimating the formation of a Kukharev region (e.g., high in the atmosphere, or on the surface of the Earth), a target of heavy metal atoms, or a similar substance, is placed in the path of charged particles originating from the K region. Such targets may comprise, e.g., standard metal targets made of millimeter-thick gold (as the most effective metal used in terrestrial experiments).

To collect antimatter, cooling (i.e., braking) of naturally or artificially formed antiparticles can be performed. The dimensions of the target as a whole can be any that are economically available.

To collect and retain antimatter, vacuum traps, magnetic traps, conventional Penning traps, Penning traps embedded inside Ioffe-Pritchard traps, Penning-Malmberg traps, or similar traps may be used.

As such, antimatter, antiprotons, positrons (i.e., antielectrons), antihelium, antihydrogen, antineutrons, antineutrinos, antideutrons and other antiatoms and antiparticles are obtainable and collectable, depending on the type of wave of charged particles and the type of target.

Methods of direct antimatter production are described below.

1. Production of antimatter in the atmosphere and space (i.e., above the Earth's surface).

The strongest areas of Kukharev are formed in the stratopause (i.e., at a floating height of about 50-55 km above the Earth's surface), as well as above about 120 km (e.g., where temperature anomalies are present). In both of these areas, gravitational resonances accelerate the flows of charged particles located within the areas (e.g., electrons, protons, etc.). Local temperature spikes occur as a result of such acceleration of charged particles, which are located in conglomerations within these areas.

For such areas in the stratopause (i.e., K regions located in the stratopause), a high-altitude stratospheric airship or satellite may be utilized to house a target (e.g., a millimeter-thickness plate of gold, or other metal, or an analog) with which high-energy waves of the charged particles collide. The collision of such particles (during moments of gravitational resonance) with the target leads to the production of antimatter particles. The antimatter particles then are stably collected using one of several known standard traps for collecting antimatter (e.g., vacuum trap, magnetic trap, etc.).

Thus, the K region and gravitational resonances (as well as the ability to predict/estimate the same) serve as natural charged particle accelerators for the stream of charged particles required to form antimatter. Such substitution in the antimatter mining process removes the previously required cost relating to the need to spend a large amount of energy for artificial proton accelerators. The substitution thereby removes the astronomical costs for even 1 gram of antimatter (i.e., millions of dollars). By utilizing the knowledge about K regions and the energy of natural gravitational resonances in the K regions, time- and prediction-based models are created to form antimatter without the need for charged particle accelerators. Antimatter particles emerge naturally in K regions during gravitational resonances; however, antimatter particles can further be formed artificially by additionally positioning a metal obstacle/target within K regions. In turn, the powerful electromagnetic and proton waves formed at moments of gravitational resonance create accelerated streams of the charged particles, which can be directed at the metal obstacle. Upon collision, antimatter is produced and collected using one or more antimatter traps.

Figure 65:
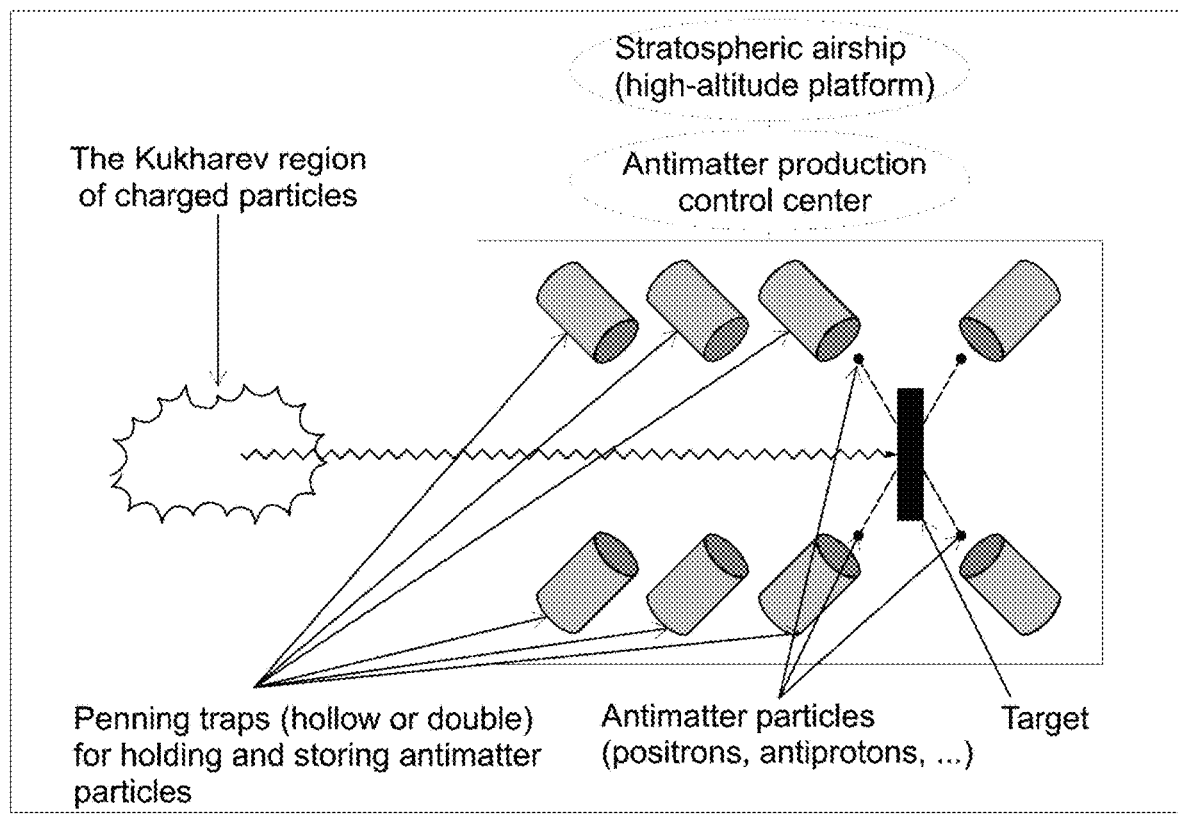
FIG. 65 shows an exemplary diagram of the present invention wherein a high-altitude stratospheric airship rises to the stratopause (i.e., a height of 50-55 km above the Earth's surface), wherein the strongest Kukharev regions arise, and wherein electron and proton waves are generated.

FIG. 65 shows a diagram illustrating a high-altitude stratospheric airship rising, for example, to the stratopause (altitude of 50-55 km), where the strongest Kukharev regions arise (within the Earth's atmosphere), and where electron and proton waves are naturally generated. Under the airship, there is a control center that controls the collection of antimatter. In the path of generated waves of charged particles, there is an artificial target. Upon collision of the charged particle wave with the target, antiparticles (e.g., positrons, antiprotons, etc.) are formed and collected by one or more antimatter traps. For the operation of a satellite (i.e., the same method but at an altitude of more than 100 km), the same operational scheme may be used.

2. Production of antimatter on the surface of the Earth.

A cloud of charged particles or plasma is formed, as well as a similar metal target in a projected path of the charged particles or plasma. These elements are held in anticipation of a predicted/estimated gravitational resonance. At the moment(s) of the gravitational resonance, a standing wave is formed within the formed cloud of charged particles or plasma. The standing wave in turn collides with the metal target to form antimatter, which is then collected using one or more antimatter traps. Thus, the method is the same as the method for collection above the Earth's surface, except that the cloud of charged particles must be artificially formed.

The creation of such an electronic or ion cloud is carried out by Emission. Emission is the phenomenon of the emission of particles from the surface of bodies (solid, liquid) into a vacuum when energy is transmitted to them. Such a body itself is referred to as an emitter. Physical effects on the body can be exerted in various ways: by heating, irradiation with light, bombardment with accelerated electrons and various atomic particles, a strong electric field, or mechanical action. At the same time, the following types of emissions arise: thermoelectronic; auto-electronic; secondary-electronic; ion-electronic; photoelectronic.

Thermionic emission is the phenomenon of the emission of electrons by the surface of a solid (i.e., emitter) when it is heated. Auto-electronic emission is the phenomenon of emission by a strong external accelerating electric field by the surface of the emitter of electrons that have passed through a potential barrier by tunnel transitions. Experience shows that at arbitrarily low temperatures, but in strong electric fields of the order of 106-108 V/cm, electron emission is observed, rapidly increasing with increasing field strength. Secondary electron emission is the emission of electrons from the surface of a body when it is bombarded with electrons. The body being bombarded is referred to as a secondary electron emitter, or target. Ion-electron emission occurs when the target is bombarded with ions accelerated by an electric field. Photoelectronic emission is performed using the energy of a powerful laser beam.

The electron cloud resulting from the emission accelerates to high energies at the moment of gravitational resonance. However, the ground-based creation of electronic clouds, at least partially comparable to those present in the stratopause, is more expensive due to the cost of creating the cloud of charged particles.

Proton emission, or proton radiation (also known as proton radioactivity), is a rare type of radioactive decay in which a proton is ejected from the nucleus. It allows one to obtain a cloud of protons, which can then be affected by a gravitational resonance. Proton emission may originate from high-lying excited states in the nucleus after beta decay, or it may originate from the ground state (or a low-lying isomer) of very proton-rich nuclei. For a proton to leave the nucleus, the proton separation energy must be negative—hence, the proton becomes unbound and tunnels out of the nucleus in a finite time. Proton emitters are usually produced by nuclear reactions, using linear particle accelerators. Examples of proton emitters are cobalt-53 isomer, various isotopes, iron-45, zinc-54, and others.

Methods for using the antimatter collected are described below.

The obtained antiparticles may be used directly at the location of their production to form antihydrogen (i.e., the bound state of the antiproton and positron and the simplest stable antiatom). Antimatter stability is important for additional convenience to transport the accumulated antimatter (for example, from the stratopause down to the Earth's surface, and along the Earth's surface).

"Ready-made" antiprotons can be directed to a xenon jet. After the collision of antiprotons with the nuclei of this gas, electron-positron pairs arise, and some positrons can combine with antiprotons to form antihydrogen atoms. There may be many options, but the general concept is the same—to use a powerful energy flow from electrons and protons of the natural Kukharev region so that it creates antimatter when colliding with different types of targets. Antimatter is then either immediately collected in various traps and/or capsules, or it is first processed (e.g., into antiatoms) and then collected in a similar manner, for delivery to an end user.

It is possible to use different means of slowing down antiparticles, i.e., different braking and cooling systems. The usual means for this are dipole and quadrupole magnets to avoid scattering. Electric and magnetic fields can be used for deceleration, stochastic cooling, and electronic cooling cascades. It is also possible to use rods made of solid lithium with an applied high-gradient magnetic field. For example, standard antiproton accumulator complexes resemble hydraulic systems—antiprotons are collected in a collector ring with a large receiver (i.e., funnel), and the storage ring can be compared to a reservoir where antiprotons accumulate and eventually are released in the form of clear, well-defined conglomerates.

Various types of antimatter traps are discussed below.

Figure 63:
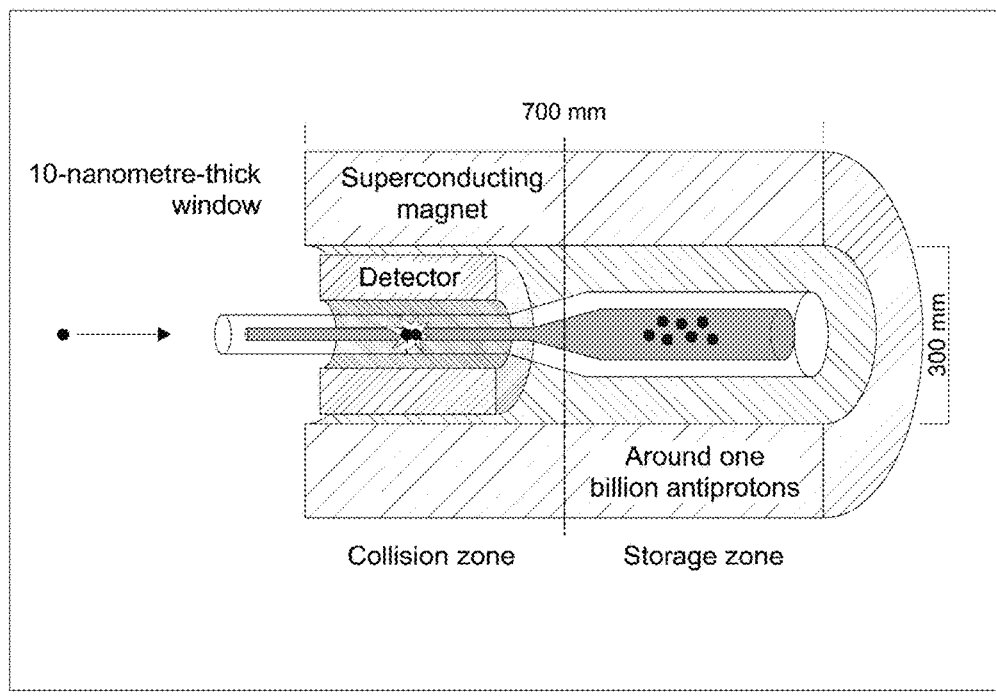
FIG. 63 shows a Penning trap utilized according to the present invention. Such traps are like tiny particle accelerators. Inside them, the particles move in a spiral, while magnetic and electric fields keep them from colliding with the walls of the trap.

Charged antimatter particles, e.g., positrons and antiprotons, can be stored in Penning traps (see FIG. 63). Inside a Penning trap, the particles move in a spiral direction, while magnetic and electric fields prevent the particles from colliding with the walls of the trap.

Figure 64:
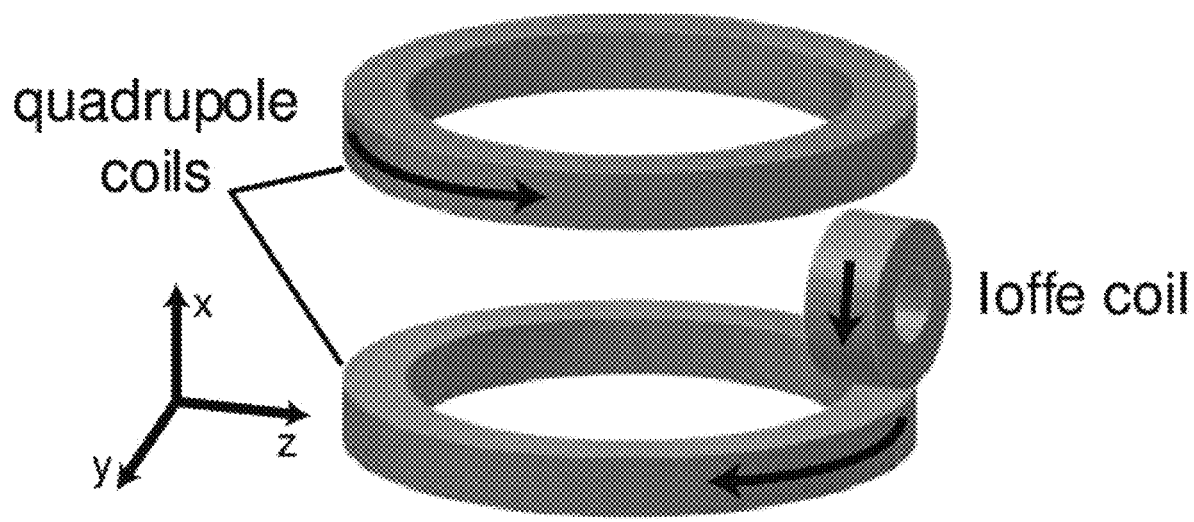
FIG. 64 shows a standard Ioffe trap utilized according to the present invention. Such traps work by creating a region of space with an inhomogeneous magnetic field. A small region in which the local minimum of the magnetic field is located acts as a trap for antiparticles, since the magnetic field increases in all directions from the central region.

Penning traps do not work for neutral particles such as antihydrogen (which can also be collected at the antimatter production site, as described above). Since antihydrogen particles have no charge, they cannot be confined by electric fields produced by Penning traps. Instead, such particles are held in Ioffe traps (see FIG. 64), which operate by creating a region of space with an inhomogeneous magnetic field. A small region in which the local minimum of the magnetic field is located is where the antiparticles are collected, since the magnetic field increases in all directions from the central region.

Storage of the produced antimatter and its transportation (from the stratopause down and along the Ground) can be carried out in capsules BASE (Penning trap inside the hole of a superconducting magnet, reinforced for stable transportation) and PUMA (two-zone trap inside a superconducting solenoid magnet, which is emptied to an extremely high vacuum and cooled to four degrees above absolute zero, while the generated field can hold antiprotons, preventing them from contacting the substance for long periods of time).

Various types of targets/obstacles are discussed below.

Thin plates of gold, platinum, copper, lead, various foils, and various radioisotopes and ions (e.g., beryllium ions) can be used as the targets for collision of electron and/or proton flows. It is further very important to regulate the amount of antimatter produced so as not to annihilate the entire antimatter production and assembly complex.

Target metals are diverse: copper, gold, platinum, lead, etc. New materials and alloys have also been proposed and tested. For example, alloys of aluminum, titanium, tungsten, and rhenium have been tested as metal targets.

The best results were obtained when using thin plates made of gold and platinum as targets, when irradiating them with powerful energy particles or laser beams. But there is an alternative to noble metals, for example, it is proposed to use liquid lead as a heat-resistant target for bombardment with high-power photon beams.

If gold or platinum is used as the target in the path of charged particles, then one can roughly consider the size (area) of the target and the number of antiparticles obtained as proportional. The thickness of the gold/platinum is typically about 1 mm (in the form of a plate).

The quality of antiparticle production also depends on several factors, and there are no general criteria for evaluating different targets. The goals of production workers are diverse, e.g., some are required to provide a powerful stream of positrons, and others need to provide an economical installation. In general, all imaginable types of targets can be used—gold, lead, ions, clouds of protons, various alloys, and liquid metals (in particular, liquid lead). In fact, liquid metal turns out to be more stable under an energy shock since it is already in liquid form. For a solid target, a powerful flow of electrons or protons is dangerous since it may lead to destruction, cracking, deformation, etc.

The production of intense positron beams is limited by the target's resistance to thermomechanical loads that occur in it when a powerful primary electron beam falls. The maximum peak power that a solid target can withstand is, according to current data, about 2.1012 GeV/mm2 per pulse. One of the possible solutions to this problem is the use of a liquid lead alloy target. Preheated to ~300°, the alloy is pumped through the target using a special pump. The conversion target is a complex system operating in a vacuum at high temperatures.

A single new fundamental physical regularity (the formation of Kukharev regions), which causes different consequences in different environments. From a fundamental point of view, all these lines are the same (one reason is the resonance of gravitational tides). Plus, there are also gravity jumps (more correctly, jumps in the absorption of Kukharev time energons), which can occur at those moments in time when the main gravitational factors are at their extremes.

TABLE 5

| No | Element (fragment) of the Kukharev region | What we observe (what is the de facto Kukharev region and what this region creates). | Practical benefits of using the Kukharev region |
| --- | --- | --- | --- |
| 1 | Electron | Electromagnetic wave of the Schumann resonance | Getting free electricity in the Kukharev regions. Prediction of blue lightning, elves and jets. Aircraft warning about lightning activity. Vadim Kukharev's application for a U.S Pat. No. 63/054,923, "Technology of obtaining free electricity at moments of gravitational resonances", PCT/IB2020/057606. The copyright of Vadim Kukharev's discovery is also registered with the Library of Congress (Copyright 1-9054879141). |
| 2 | Proton | A wave of protons. This wave is high in the atmosphere when it collides with other particles, antimatter particles can create, which immediately annihilate. | Collection of antimatter particles in the Kukharev regions using Penning Traps or their analogues |
| 3 | Water molecule | Rogue_wave (killer waves in the seas and oceans) | Warning to ships (above water and underwater) about the danger in a specific place at a specific time. Another patent application and copyright by Vadim Kukharev |
| 4 | Air molecule | Acoustic waves. Changes in atmospheric pressure and temperature at the moments of resonances of gravitational tides. Lightning bolts, blue lightning, elves and jets (here interaction together with electronic clouds together). Formation of cyclones and anticyclones, changes in atmospheric pressure and temperature. Thunderstorm belt between the southern and northern tropics. | Using a sound wave as an energy source. Warning to aircraft and other interested parties to avoid turbulence and thunderstorm zones. Weather prediction. Vadim Kukharev's application for a U.S Pat. No. 63/054,923, "Technology of obtaining free electricity at moments of gravitational resonances" |

TABLE 5-continued

| No | Element (fragment) of the Kukharev region | What we observe (what is the de facto Kukharev region and what this region creates). | Practical benefits of using the Kukharev region |
|---|---|---|---|
| 5 | Ozone layer particles | Destruction of ozone holes near the Earth's poles at the moments of gravitational resonances | Accumulation of statistics to address the issue of preservation of the ozone layer by certain impacts |
| 6 | Quarks, basic particles | "Clumps" of elementary particles at moments of gravitational resonance | Scientific experiments at the Large Hadron Collider |
| 7 | Human cells (which mostly consist of water) | Migraines, female menstruation, various abnormal cell fluctuations. Heart attacks and strokes (due to the formation of blood clots and vascular ruptures). Jumps in blood pressure in humans. Electromagnetic radiation affects blood clotting, creating blood clots, torn vessels, increasing the risk of heart attacks and strokes. In addition to the formation of blood clots, "excessive" fluctuations in the gravitational field these days can generally "rock" cells, having a bad effect on health, which should be seen in statistics. | Targeted removal of unnecessary cells (cancerous, old, sick) through the creation of directed radiation at cells with the same oscillation frequency at moments of gravitational resonance. Vadim Kukharev's application 17/146,832 for a US patent and its copyright. A way to radically prolong a person's life. |
| 8 | Mercury as a secondary fluid to the deposit of sulfide gold. Other secondary fluids in the main minerals | Geochemical anomaly (elevated mercury vapor) at the moment of resonance of gravitational tides. Similarly, for many other secondary fluids in the search for minerals according to the patent | A way to quickly and cheaply search for mineral deposits. Kukharev Vadim U.S Pat. 16/71152 |
| 9 | Graviton (together with the energon of time (a particle of vacuum energy, Copyright 2016, Boson of Time - Kukharev Boson)) | Flyby anomaly. Dynamics of the angular velocity of the Earth (and other planets) around the Sun, the Sun around the core of the Galaxy, our entire galaxy around the center of galaxies. Milankovich cycles, | More accurate calculation of the motion of spacecraft, Getting energy and electricity in the Kukharev regions Patent application of Vadim Kukharev 16/991,624 "Technology for obtaining free electricity at moments of gravitational resonances" |
| 10 | Fluids inside animals and plants | Consequences like increased egg production at the moments of resonance of gravitational tides, changes in plant growth | Forecasting of material accounting for farms |
| 11 | The whole planet Earth | Deserts in those places where the constant resonances of gravitational tides "pushed out" all the water. A belt of thunderstorms (lightning) in places where resonances of gravitational tides occur more often. Formation of oil, gas and other minerals in the Earth's mantle | Better understanding of geological processes |
| 12 | The Sun | Flashes, sunspots, prominences | Updating statistics for the safety of space satellites and spacecraft, weather forecast |
| 13 | Jupiter, Neptune | Jupiter's Great Red Spot, Neptune's Dark Spot. Any large permanent vortex on Neptune, Jupiter, Venus is primarily a consequence of the fact that the resonance of gravitational tides from several sources leads to the formation of giant Kukharev region at altitude, accompanied by pressure drops. It is identical to how on Earth the Kukharev region in the understanding of patterns in the stratopause (this is from another patent application by Vadim Kukharev) leads to a pressure drop and the formation of electromagnetic Schumann waves. Just on Jupiter/On Neptune, this pressure drop is much greater, which is why vortices are formed. And the resonances of gravitational tides constantly "pumps" energy into these vortices. | Assistance in the scientific understanding of patterns in the universe |
| 14 | Galaxies and constellations | The stress-strain state due to the resonances of gravitational tides at the level of galaxies can create "voids", squeezing out stars. Just like on earth, more frequent resonances of gravitational tides associated with the barycenter led to the creation of a strip of deserts (places from where the resonances squeezed out all the water) | Assistance in the scientific understanding of patterns in the universe |

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for collecting antimatter, comprising:
   estimating a location of a K region, said K region comprising one or more conglomerates of charged particles,
   determining an onset of a predetermined period of a gravitational resonance, said onset initiating an acceleration of said one or more conglomerates of charged particles,
   positioning a target within the K region in a direction of movement of said charged particles during said period of gravitational resonance, said charged particles colliding with said target due to said acceleration, said colliding forming a plurality of antimatter particles, and
   collecting said antimatter particles generated by said colliding via one or more antimatter traps,
   said one or more antimatter traps and said target being located on an airship or a satellite unless said K region is located on a surface of the Earth.

2. The method according to claim 1, wherein said acceleration creates two or more waves of said charged particles, said two or more waves coinciding at a single point.

3. The method according to claim 1, wherein said K region is located in a stratopause and said one or more antimatter traps and said target are located on a high-altitude airship.

4. The method according to claim 1, wherein said K region is located in a stratosphere and said one or more antimatter traps and said target are located on a stratospheric airship.

5. The method according to claim 1, wherein said K region is located in an ionosphere and said one or more antimatter traps and said target are located on a high-altitude airship.

6. The method according to claim 1, wherein said K region is located on a surface of the Earth, wherein said one or more conglomerates of charged particles are artificially formed.

7. The method according to claim 1, wherein said target comprises metal.

8. The method according to claim 7, wherein said metal is gold.

9. The method according to claim 7, wherein said metal is platinum.

10. The method according to claim 7, wherein said metal is lead.

11. The method according to claim 7, wherein said metal is copper.

12. The method according to claim 1, wherein said one or more antimatter traps are vacuum traps.

13. The method according to claim 1, wherein said one or more antimatter traps are magnetic traps.

14. The method according to claim 1, wherein said one or more antimatter traps are Penning traps.

15. The method according to claim 1, wherein said one or more antimatter traps are Penning traps embedded within Ioffe-Pritchard traps.

16. The method according to claim 1, wherein said one or more antimatter traps are Penning-Malmberg traps.

17. The method according to claim 1, wherein said antimatter particles comprise antiprotons, positrons, antihelium, antihydrogen, antineutrons, antineutrinos, and antideuterons.

18. The method according to claim 1, further comprising immediately providing said antimatter particles as catalysts for a nuclear reaction, said nuclear reaction including fission and synthesis processes.

19. The method according to claim 1, further comprising immediately performing an annihilation of said antimatter particles with matter particles, said annihilation providing an instant energy.

20. The method according to claim 1, wherein said antimatter particles within said one or more antimatter traps comprise bound antiprotons and positrons, said bound antiprotons and positrons forming a stable antihydrogen atom.

* * * * *